United States Patent [19]
Rowan

[11] Patent Number: 5,341,229
[45] Date of Patent: Aug. 23, 1994

[54] HOLOGRAPHIC DISPLAY SYSTEM

[76] Inventor: Larry Rowan, 3440½ Caroline Ave., Culver City, Calif. 90230

[21] Appl. No.: 548,750

[22] Filed: Jul. 5, 1990

Related U.S. Application Data

[63] Continuation-in-part of Ser. No. 244,331, Jul. 14, 1988, abandoned.

[51] Int. Cl.⁵ .................. G02F 1/00; G03H 1/10; G03H 1/28
[52] U.S. Cl. ........................ 359/10; 359/24; 359/34; 359/258
[58] Field of Search ............. 350/3.75, 3.77, 3.78, 350/3.79, 3.81, 3.67; 359/1, 10, 22, 23, 24, 27, 34, 258

[56] References Cited

U.S. PATENT DOCUMENTS

| | | | |
|---|---|---|---|
| 2,955,156 | 10/1960 | Heilig | 359/466 |
| 3,050,870 | 8/1962 | Heilig | 359/468 |
| 3,975,080 | 8/1976 | Norman | 359/33 |
| 4,159,417 | 6/1979 | Rubincam | 235/375 |
| 4,208,098 | 6/1980 | Johnson | 359/467 |

Primary Examiner—William L. Sikes
Assistant Examiner—David Parsons

[57] ABSTRACT

A portable holographic display system embodying holographic plates which are disposed upon a plurality of thin film holographic emulsions coupled to multiple channel Kerr units that generate a series of multi-colored holographic images. The holographic images generated by transmission thin film emulsions are based on the number and order that multiple light channels, fiber optics elements and thin film holographic emulsions are illuminated. The process of illumination depends directly on the activation sequence of lens elements or cells, which contain an optically active medium controlled by command signals from a central control means coupled to a source of electrical power.

8 Claims, 60 Drawing Sheets

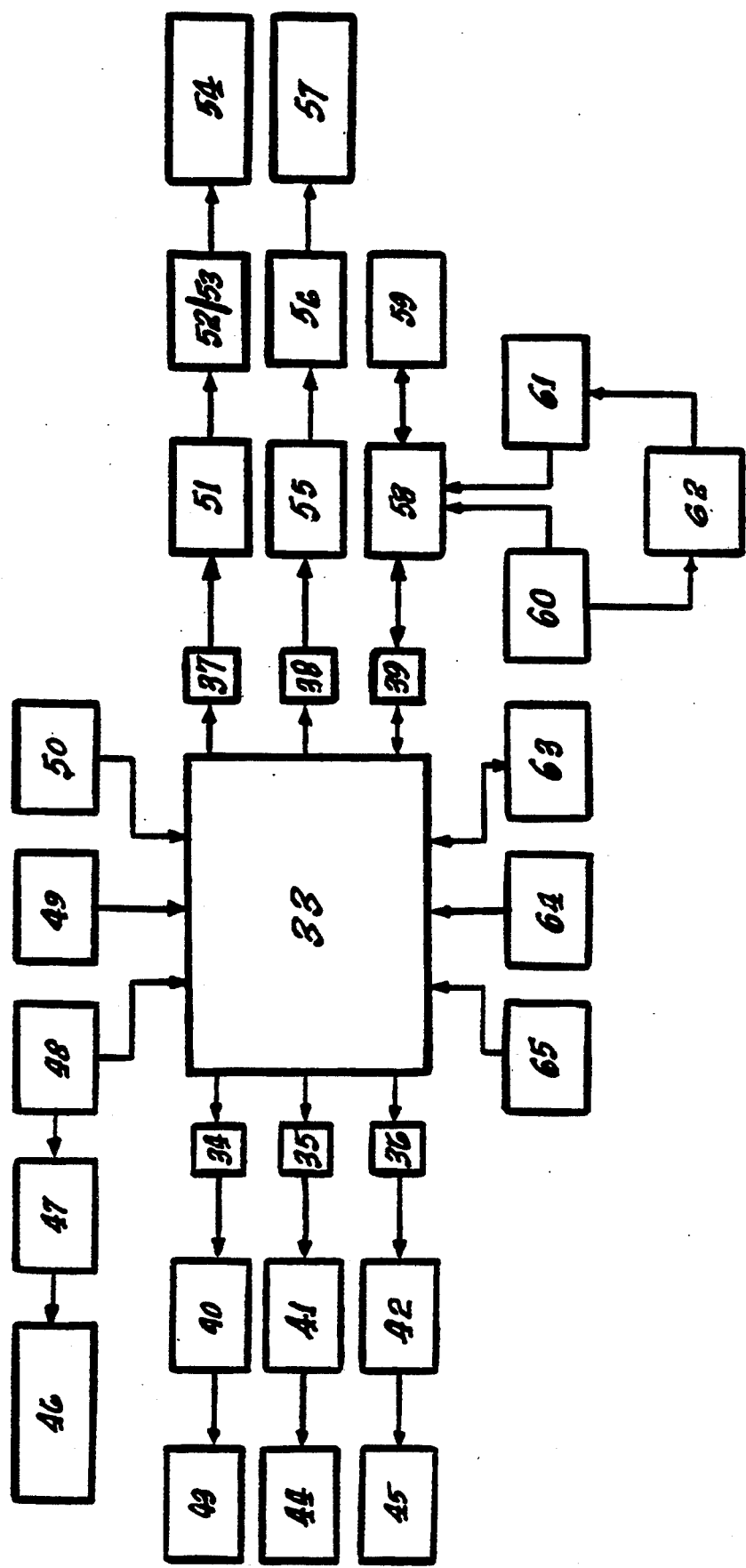

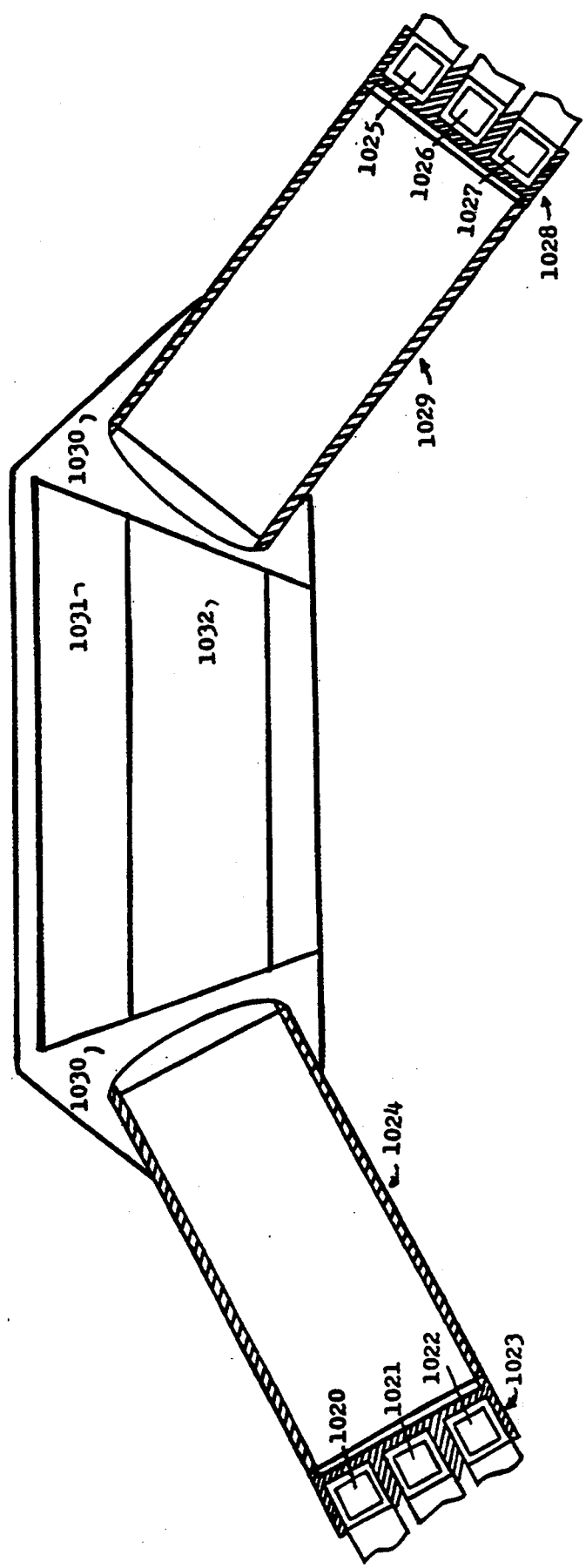

FIG. 17
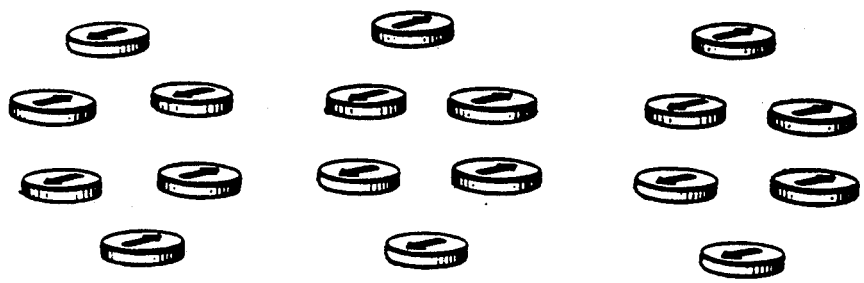
FIG. 17a
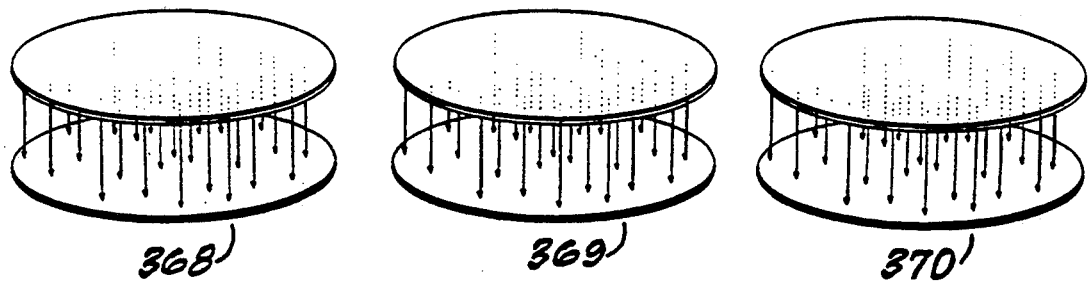
368  369  370
FIG. 17b
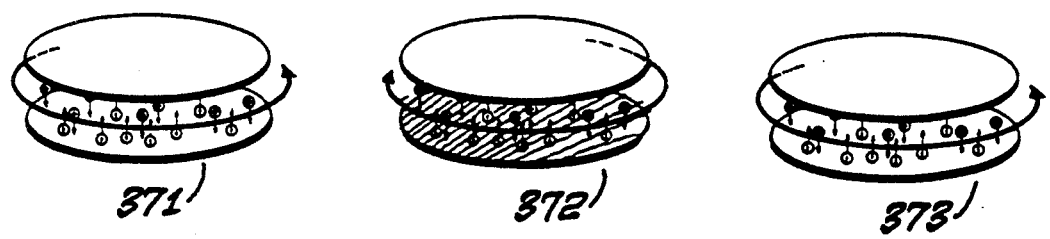
371  372  373
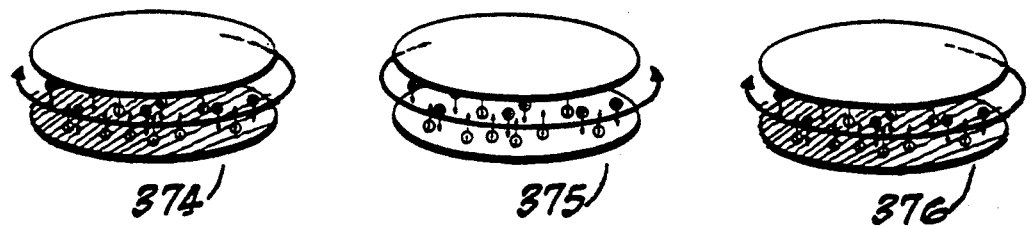
374  375  376

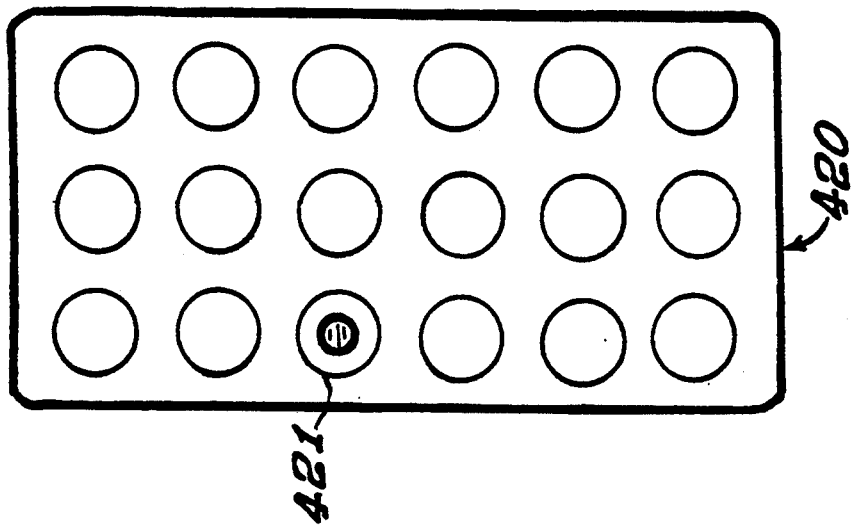
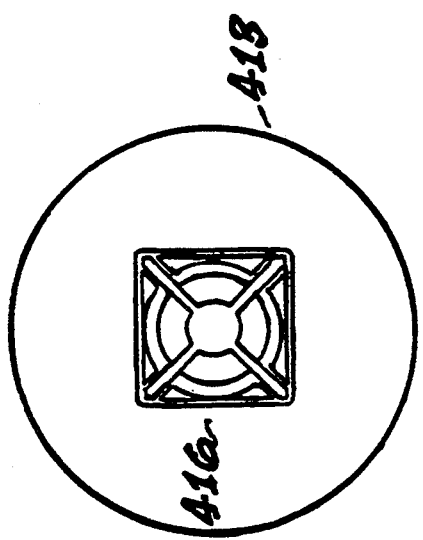
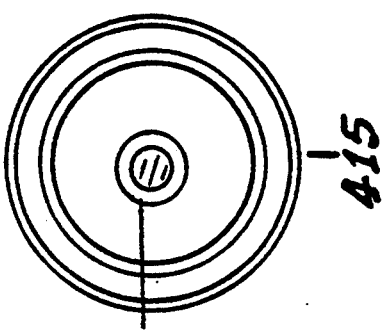

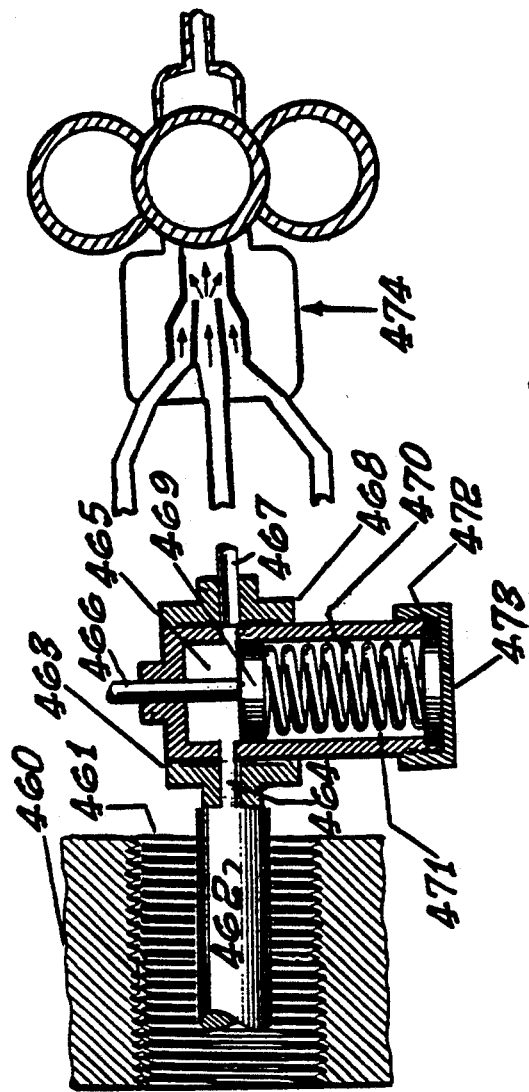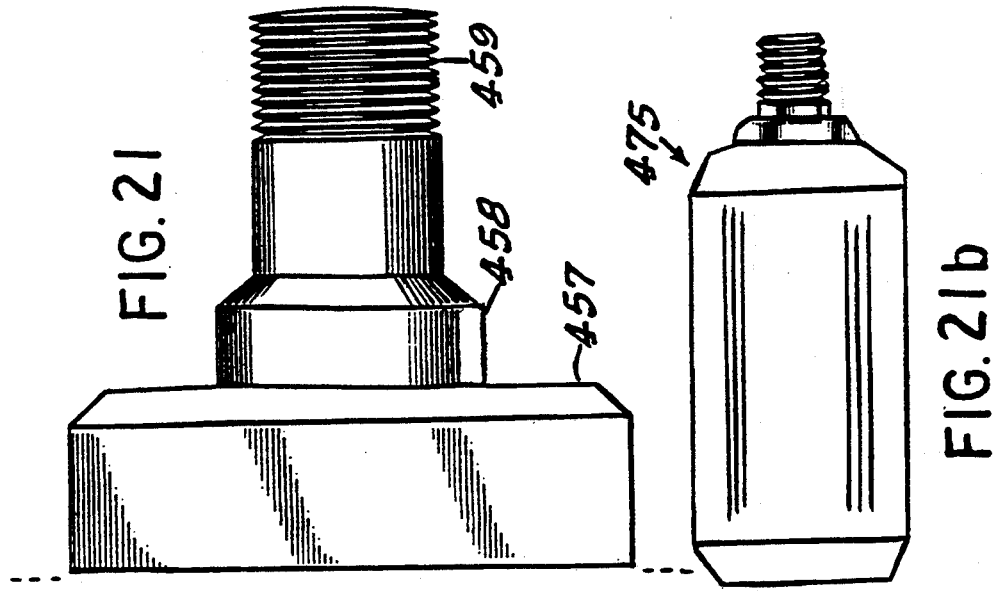

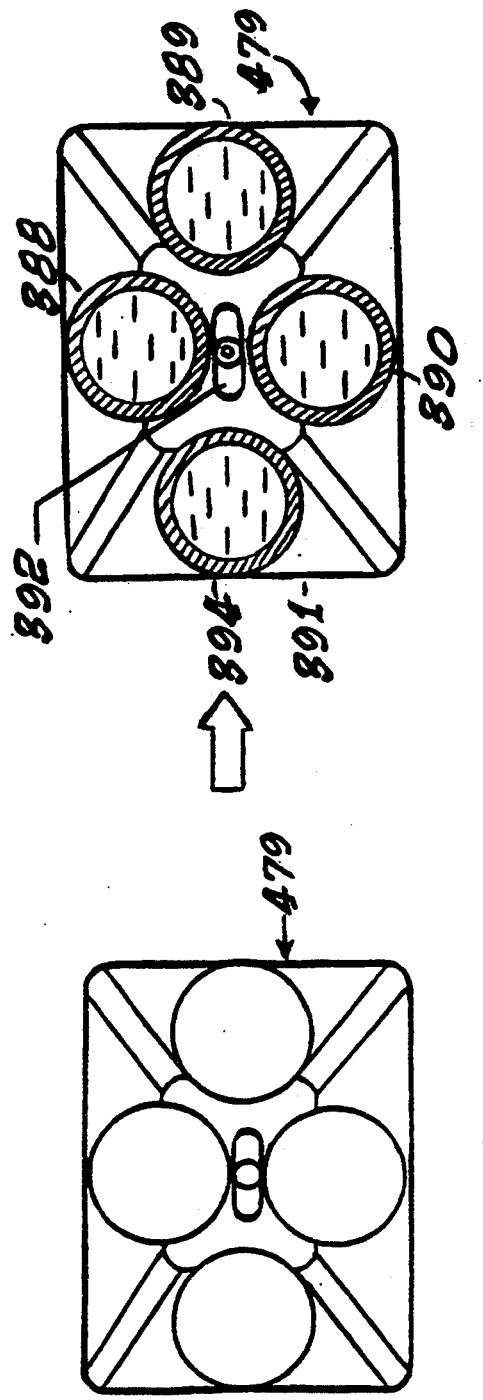

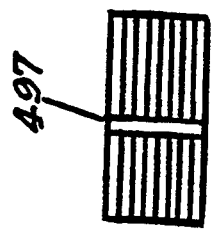
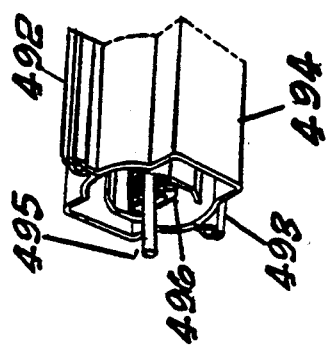
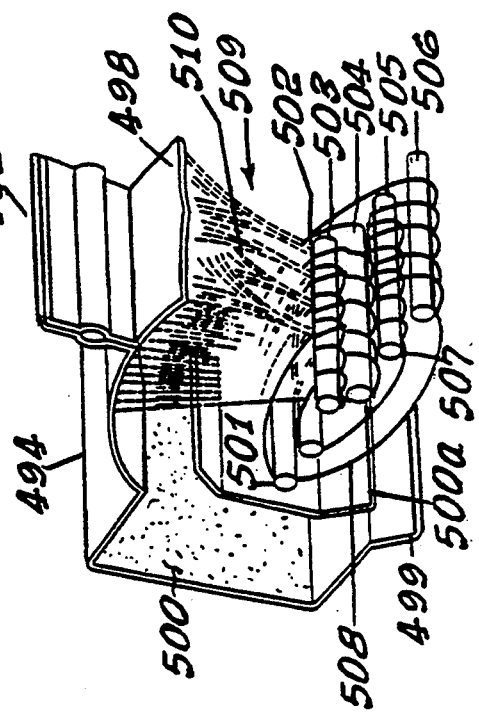
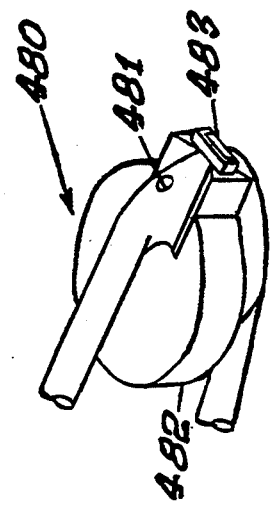
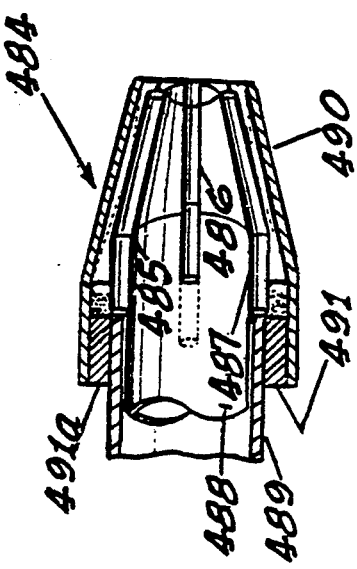

FIG. 35
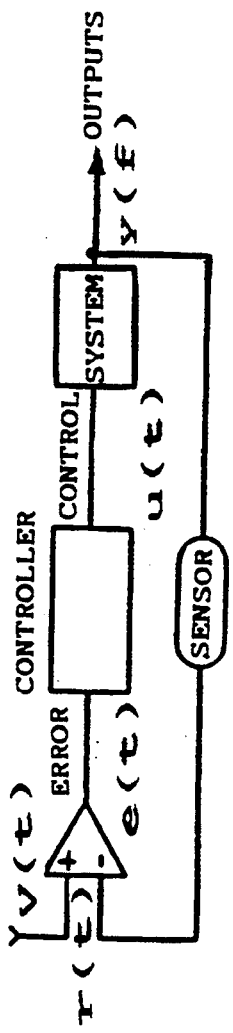
A CLOSED-LOOP SERVOMECHANISM
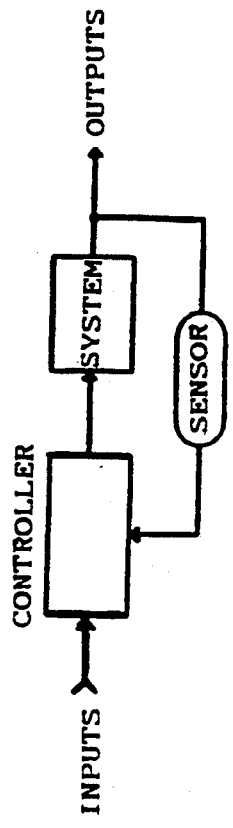
A GENERAL CLOSED-LOOP CONTROLLER

FIG. 38

SECOND-ORDER CURVE-FIT

```
var
    i : integer;
    x : real;
begin
    x := 1.0;
    for i := 1 to xpnt do
        x := x * mantissa;
    pwr := x
end;

procedure leastsquares (nbr : integer);
var
    i              : integer;
begin
    a0 := 1;
    a1 := 0;
    a2 := 0;
    a3 := 0;
    a4 := 0;
    b0 := 0;
    b1 := 0;
    b2 := 0;
    for i := 1 to nbr do
        begin
            a1 := a1 + x[i];
            a2 := a2 + pwr (x[i], 2);
            a3 := a3 + pwr (x[i], 3);
            a4 := a4 + pwr (x[i], 4);
            b0 := b0 + y[i];
            b1 := b1 + x[i] * y[i];
            b2 := b2 + y[i] * pwr (x[i], 2)
        end;
    a1 := a1 / nbr;
    a2 := a2 / nbr;
    a3 := a3 / nbr;
    a4 := a4 / nbr;
    b0 := b0 / nbr;
    b1 := b1 / nbr;
    b2 := b2 / nbr;
    d := a0*(a2*a4 - a3*a3) - a1*(a1*a4 - a3*a2)+a2*(a1*a3 - a2*a2);
    a := b0*(a2*a4 - a3*a3) + b1*(a3*a2 - a1*a4)+b2*(a1*a3 - a2*a2);
    a := a / d;
    b := b0*(a3*a2 - a1*a4) + b1*(a0*a4 - a2*a2)+b2*(a2*a1 - a0*a3);
    b := b / d;
    c := b0*(a1*a3 - a2*a2) + b1*(a1*a2 - a0*a3)+b2*(a0*a2 - a1*a1);
    c := c / d;
    d := 0;
    for i := 1 to nbr do
        begin
            d1 := y[i] - a - b * x[i] - c * pwr (x[i], 2);
            d := d + pwr(d1, 2);
        end;                           Y = f(X)
```

Polynomial curve-fitting involves matching data to an x,y relationship. For a binomial or second-order polynomial, the relationship is $$x^2 +/- 2xy +/- y^2$$

For a third-order polynomial, it is $x^3 +/- x^2y +/- xy^2 +/- y^3$

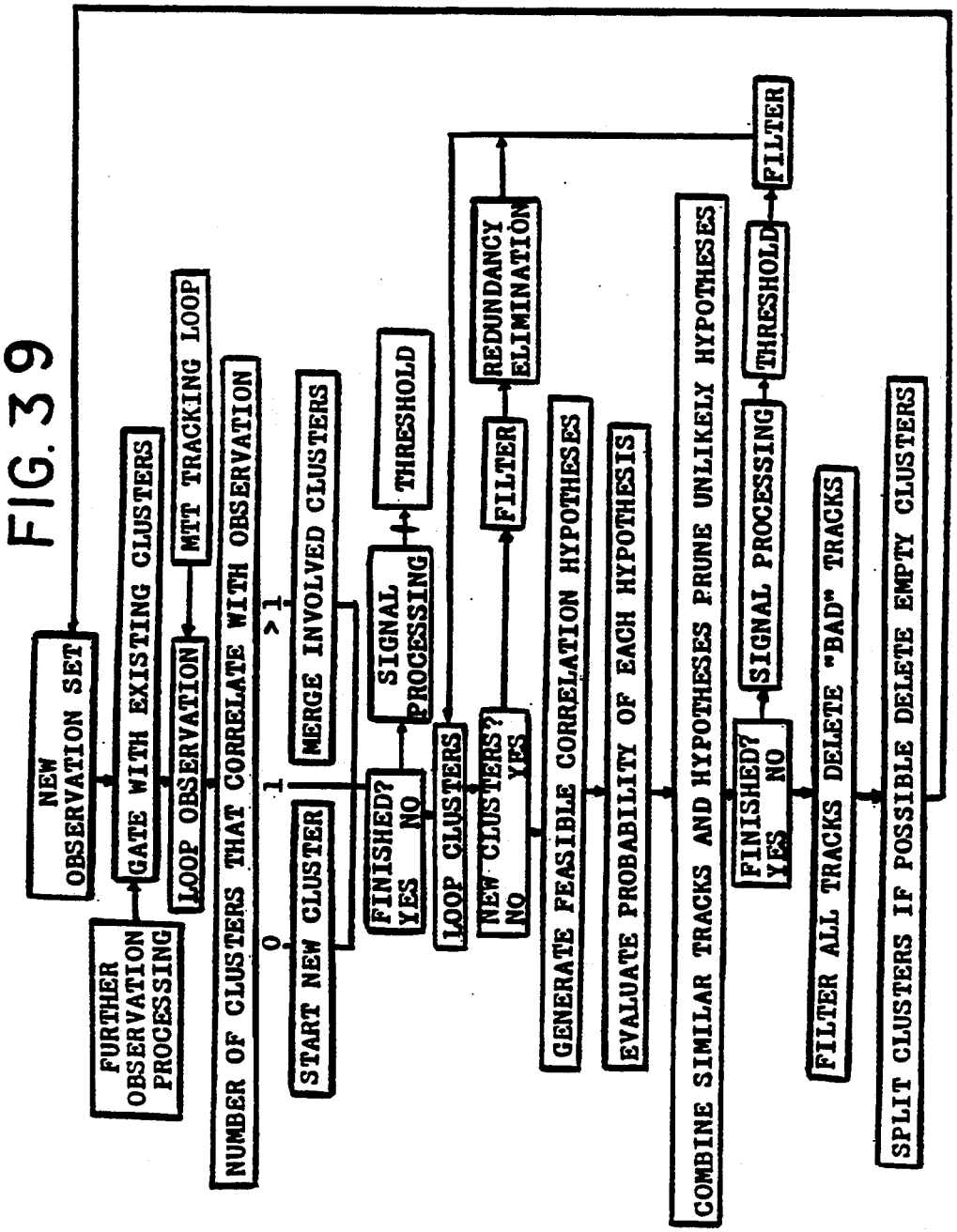

HOLOGRAPHIC DISPLAY SYSTEM

This application is a continuation-in-part of application Ser. No. 07/244,311, filed Jul. 14, 1988, now abandoned.

BACKGROUND OF THE INVENTION

1. Field of the Invention

The scope of the invention pertains to portable holographic systems which generate multiple holographic images.

2. Description of the Prior Art

Computer interactive systems with or without voice recognition/voice synthesization means are well known and have been effectively utilized to produce graphics, edit texts, formulate solutions to various problems and have been extended to assist the handicapped in a variety of activities. System$\pi$presently available or being developed by Texas Instruments, I.B.M., Hewitt Packard, Intel and others are presently limited to the storage capacity, recall time and often require a relative lengthy and or repetitive keying instructions especially these systems concerned with graphics or voice recognition. Attempts to couple the synchronized release of chemicals into the environment to coincide with audiovisual presentations in order to effect sensory organs concerned with olfaction or gustatory response have been ineffectual. The chemical release mechanisms indicated in prior art effecting the sense of smell and or taste to enhance audio or visual stimuli are not reliable, require near continuous maintainance and are inflexible having a rigid programming format.

Additionally, all of the aforementioned systems require a large number of ancillary support structures and have intrinsic difficulties alluding to interface and compatibility with other systems. The inactment of complex keying sequence to retrieve, add or modify existing data has often confused and exacerbated the user. A need therefore exists for the development of a simple interactive device and corresponding techniques which bridge the gap between complex ultrasophisticated computers and simple non-interactive devices presently available to the user to provide a learning experience and/or entertainment to the user.

Accordingly, it is the primary objective of the present invention to fill the void between sophisticated computers and non-interactive devices.

It is yet another object to structure the operation of the invention to coincide with the intrinsic operation of the user rather than having the user adapt to the operation of the device.

These objects and other objects of the invention, as well as many attendant advantages thereof will become more readily apparent when reference is made to the following description taken inconjunction with the summary of the invention and annexed drawings.

SUMMARY OF THE INVENTION

Incorporated within the basic embodiment of the device 4 is a large number of non-conducting metallic like sheets bound together in a book format. Each thin sheet resembles a single page 6 found in conventional texts in regards to length, height and thickness, A large assemblage of thin filmed holographic emulsions 8 are superimposed over one another and then collectively laminated 9 to each separate and distinct sheet of the book. The aforementioned thin filmed emulsion are situated in a manner to project a cohesive sequence of animated images or separate still frames when 12 viewed by the user either from different angles in non-coherent white light or with the implementations of coherent beams of light. When viewed in non coherent light the viewer perceives a number of rainbow holographic images; however when coherent light is deployed the three dimensional sequence of images take on the color of one or more laser sources producing in some instances three-dimensional multi-colored holographic images. Two distinct types of holographic emulsions are present, a passive embossed rainbow type and a suspension active type. The passive white light holograph is thin filmed type which is so constructed to take advantage of minute differences in angular viewing and saccadian eye movement of the user. The active thin film holographic emulsion is differentially actuated by an optical network of conducting fibers transmitting a spectrum of colored coherent beam emissions to selected specified areas. Under the base layer of the holographic emulsions are thin film laminates consisting of a number of tetracolored LCD elements which are associated with an elastic panel of subminiature multicolored LED units or their electro luminescent equivalents. A light sensor incorporated into the structure of the sheet detects whether strong ambient light is present or not. In the event strong ambient light is present the images generated by diffraction or white light thin film holographic emulsions and the tetra-colored LCD elements or LCD screen are readily visable to the user; whereas the image generated by the transmission thin film holographic emulsions and the LED element or screen is obscured by strong daylight. Superimposed laminated diffraction or second generation holograms are currently produced on photopolymer film emulsions and superimposed, active transmission holographic emulsions are also in existence. The active transmission holographic emulsions and passive diffraction holographic emulsions are recorded on thin film emulsions, superimposed and laminated to one another. Said thin film holographic emulsion are interdisposed between a Fresnel lens and LED/LCD screen elements. The only criteria regarding the thickness and number of thin film holographic emulsions is that each thin film emulsion be thick enough to contain an interference pattern sufficient enough to generate a holographic image and that the image from the bottom most peripheral thin film emulsion and those images generated by the LED/LCD screen elements be visable to the user through the top most thin film holographic emulsion and said Fresnel lens element. Thin film holographic emulsions form holographic plates and the transmission thin film holographic emulsions are coupled to fiber optics elements of said Kerr units by Epotek 302-2 and a mylar polyacrylic silicate diffuser. The fiber optics elements exiting from said Kerr units conduct laser light through the diffuser coupled to the edge of said thin film emulsion in order to transilluminate said thin film holographic emulsions. The process of illumination depends directly on the activation sequence of lens elements or cells containing optically active mediums controlled by command signals from a central control means, a CPU, coupled to a source of electrical power. Said cells or lenses are terminally located at the end of multiple light channels of Kerr units and said channels can contain organic dyes. Fiber optics elements may be doped with trace additives such as, $Ba_2NaNb_5O_{15}$, lithium iodate, or other substances. Both the organic dyes and doped fibers alter wavelengths and thereby produce multi-colored holographic images. A master CPU conveys command signals to a number of slave CPU's, which control the output and sequencing of units governing the display of holographic images acoustic, olfactory and gustatory emission systems, embodied within the holographic display system described in the foregoing specification.

Additionally provided within the operative framework of 9 the device is the property to select one of several different outcomes and a EEPROM capability. The user can alter the outcome of a storyline by a simple verbal request or by keying a simple set of instructions. Contents of the text can be expanded by simply adding a microchip or its equivalent to the complement of microstructures. A separate ancillary computer means may program microchips or their equivalent to add, eliminate or delete text altering the contexts of the device. The implementation of a miniature light pen, mouse, or simple verbal command can adjust, alter the sequence or modify pre-existing programming incorporated within the device.

BRIEF DESCRIPTION OF THE DRAWINGS

FIG. 2 is a block diagram describing the interactions and types of operative systems embodied within said IVS units

FIGS. 14 through 14b designates three perspective views of the olfactory emitter means;

FIGS. 15 through 15b are sectioned views of the olfactory emitter means disclosed in FIGS. 14 through 14b;

FIG. 17, 17a and 17b are pictorial representations of wafers element undergoing the process of volatilization;

FIGS. 21 through 21d are detailed sectioned views of the cartridge loading assembly and solenoid release mechanism;

FIGS. 22 through 22f are detailed sectioned views of the aerosol dispensor means of the gustatory unit;

FIG. 26 is an over simplified timing sequencer controlling pulse repetition rate, aerosol dispersal and the like;

FIGS. 34, 35 define block diagrams disclosing the basic operational parameters of feedback loop mechanisms equivalent to those embodied within said IVS unit or device;

FIG. 38 exemplifies a second order curve fit program utilized as a data reduction technique;

FIG. 39 is a concise block diagram illustrating a combination of clustering and prunning techniques.

DETAILED DESCRIPTION OF THE INVENTION

Figure 1:
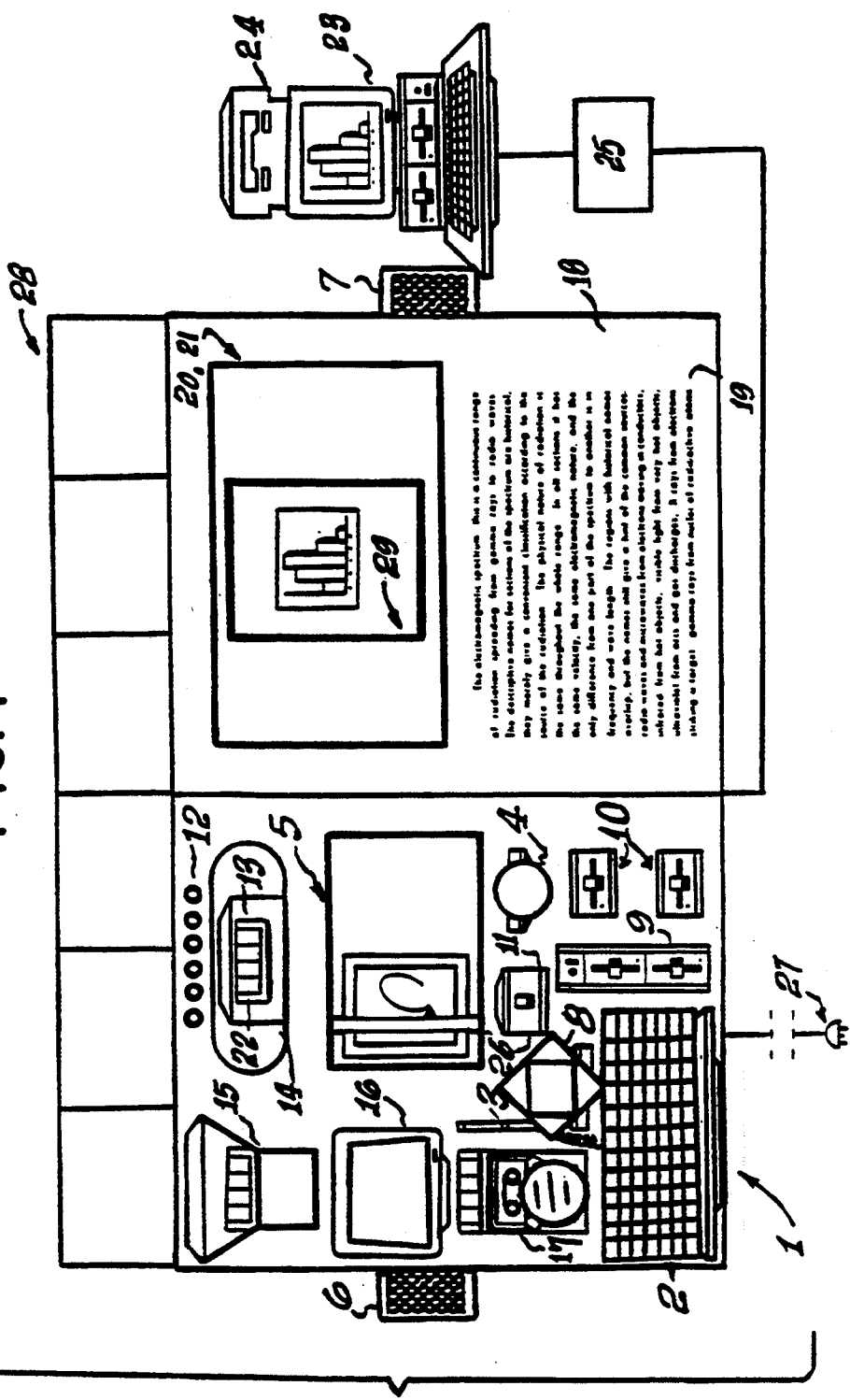
FIGS. 1, 1g through 1j are concise pictorial and sectioned representations disclosing the-assemblage of operative systems forming the basic embodiment of the-Portable Holographic Multi-Sensory Interactive Information Retrieval Device (IVS)

FIG. 1 is a pictorial representation of the Portable Holographic Multi-Sensory Interactive Information Retrieval Device (IVS) which is denoted collectively by numeral 1. Numbers 2, 3, and 4 are assigned to a flat single element keyboard, a miniature interactive light pen and an interactive mouse type element. Area 5 describes an interactive scribe pad, whereas units 6, 7 are initialized by directional piezoelectric transponders. Structures 8, 9, 10 and 11 designates a 360° rotatable joy stick for positioning vertical and horizonal slide adjustments and a power module. Numerals 12, 13 and 14 collectively define LED indicators, and an array of microprocessor modules. Elements 15, 16 and 17 of FIG. 1 are attributed to a microminiature video camera, a display monitor and recorder means utilized for addendums or the transcription of enviromental data. Numerals 18, 19, 20 and 21 denote a Single sheet element, corresponding printed text, fiber optical relay elements feeding into an interactive holographic terminal means incorporating a myriad of thin film emulsions, LCD and LED units, respectively. The number of sheet elements accorded to the book like format reside in numbers equal to or greater than 1 and approaching some finite value n. The number of sheets like pages of a book correspond to the number of elements necessary to complete a given text. The presentation of the material contained within the text, its order or sequence of presentation not necessarily its content can be altered by elements 2 through 7, respectively. The data can be either added to or deleted by the subsequent addition or removal of microprocessors or their equivalent to microcomputer means, number 22. The text can similarily be expanded by the encoding of data from computer, number 23, a specialized modum compiler means number 24 or other equivalent systems associated with an on lime electro-optical digitizer means described by element 25. The IVS unit defined by numeral 1 is powered by a number of rechargeable nickel, lithium or cadmium batteries, not shown in the aforementioned figure. The batteries are inserted into power module 26 which can be recharged from a conventional AC/DC power source described by unit 27 or a series of solar energy cells Contained in panel means 28. Low power operative systems can be powered by the solar energy panel. The entire complement of operative systems embodied by the IVS can be powered either by the power module, number 26 or the AC/DC power converter means described by numeral 27. The structural conformation of said IVS described collectively by numeral 1 is that of a conventional book. The device is deactivated by closing the cover as shown by in the closed book perspective represented by numerals 29, 30 which are a simplified plan view and side elevation of the device FIGS. 1, 1', respectively. Active systems are further deactivated automatically if a single sheet is exposed for a given length of time without an interactive response from the user inorder to conserve power. The term active systems refers to emissive diodes, miniature laser systems and other means which require near continuous power to operate. The dispersal means which are deployed to delivery volatilized scents and to disseminate gustatory stimuli are duely noted by numerals 31, 32 of FIG. 1a, respectively.

Figure 1A:
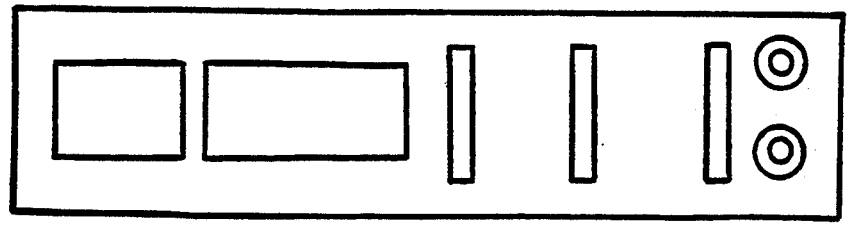
FIGS. 1a through 1f are pictorial representations of said IVS unit, the slide loading of CD discs, I.C. cards emboding programs, the insertion of power modules and input from other structures.

FIG. 1a entails an angular perspective of the invention existing in a book type of configuration, The open book configuration reveals a single sectioned page, number 18, exposing a 1.0 mm LED/LCD screen element, described by 18a, 18b, Element 18a, 18b generate letters, numbers and other symbols to correspond to images generated by holographic and LED/LCD screen elements 20 through 21b.

Figure 1B:
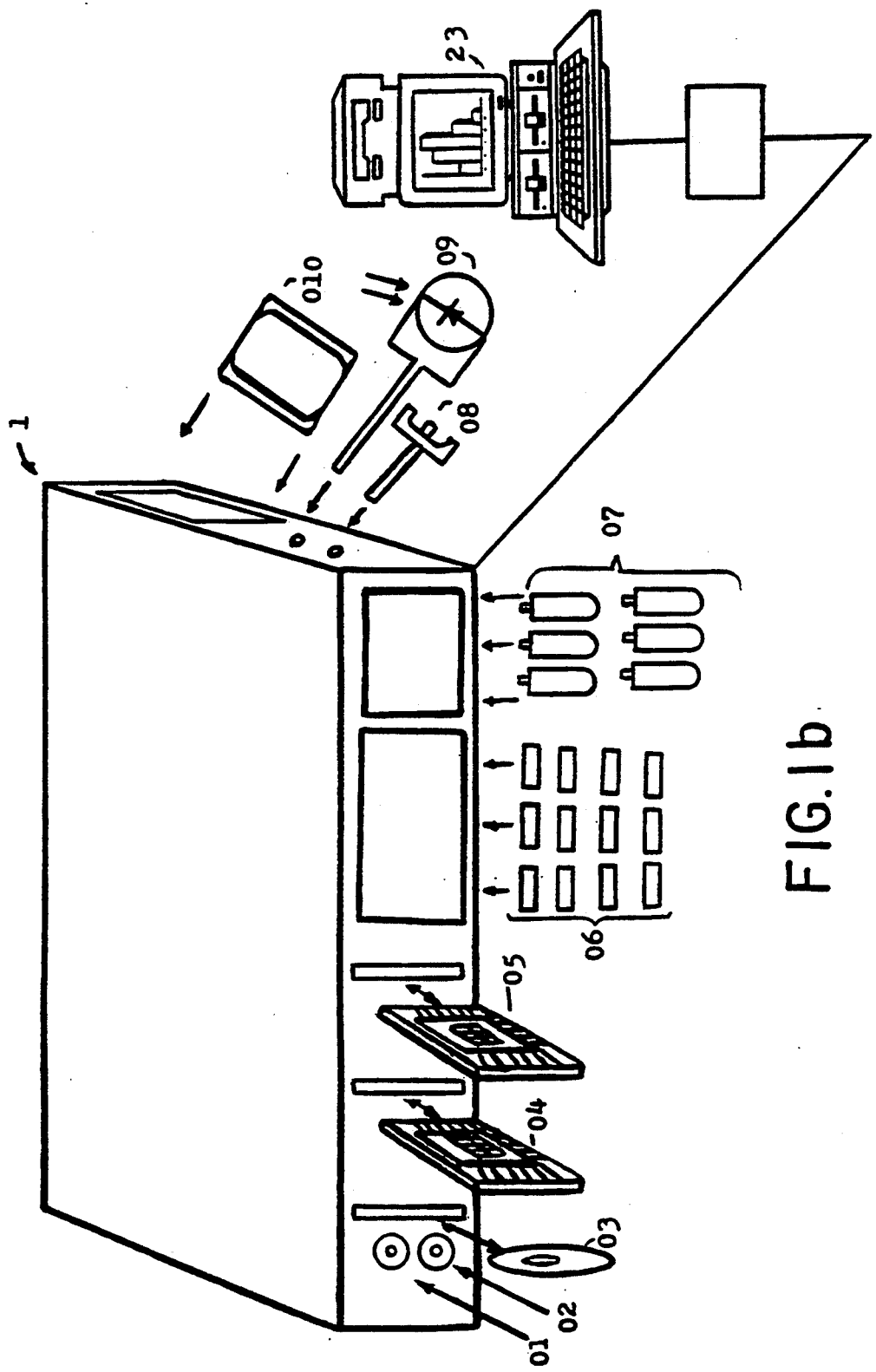

FIG. 1b represents a pictorial description of the Portable Holographic Multi-Sensory Interactive Information Retrival Device indicating the insertion of extraneous 4 component systems into said device. Numerals 01, 02 designate female Jacks for the input of data from a CPU and phone MOD/DEMOD system. Elements 03, 04 and 05 denote a insertable (CD) disc and data cards which contain programs emboding acoustic visual, gustatory and olfactory data. Numerals 06, 07 collectively describe in part wafers and cylinders containing volatilizable solidified matter and liquified gases to produce gustatory and olfactory stimuli. Numbers 08, 09 and 010 define power interface derived from an external current source, direct current from an external solar power source and a modular power source containing rechargeable batteries or other power sources.

Figure 1C:
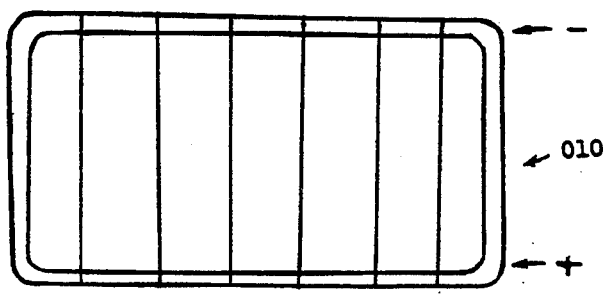

FIG. 1c describes the module, number 010 containing an array of voltic batteries attached in series to produce between 7.2–9 volts at between 0.45–0.5 AMP current depending upon the power requirements of component systems embodied within said device.

Figure 1D:
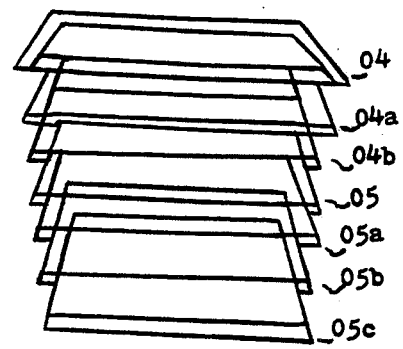
Figure 1E:
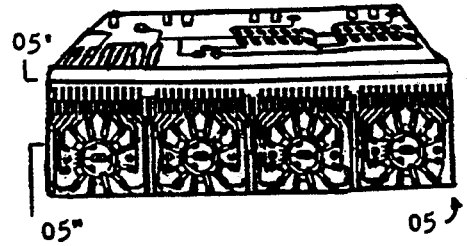
Figure 1F:
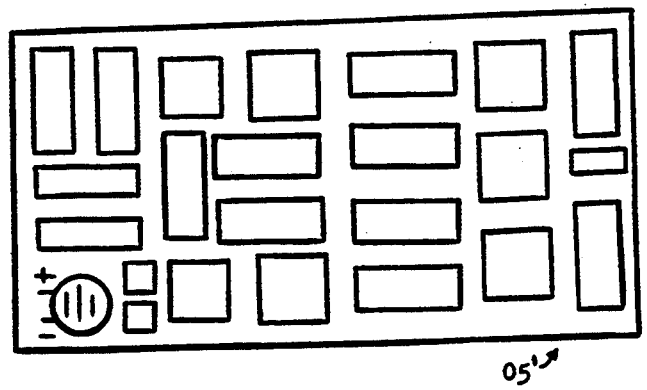

FIGS. 1d through 1f are pictorial descriptions denoting an array of insertable cards and views of single card elements. Elements 04a to 05c of FIG. 1d describe seven separate and distinct cards. Numerals 05', 05" of FIG. 1e describe the CPU module and electrical contact interface between said card, number 05 and the device. FIG. 1f describes a single card element schematically showing various integrated circuit elements and a single rechargeable power source in order to maintain short term memory input in chips containing REM. All said card elements embody REM and ROM chips and a miniature rechargeable power source to maintain volatile memories for periods of storage, transitory power failures and instances where said power modules are either absent or depleted.

Figure 1G:
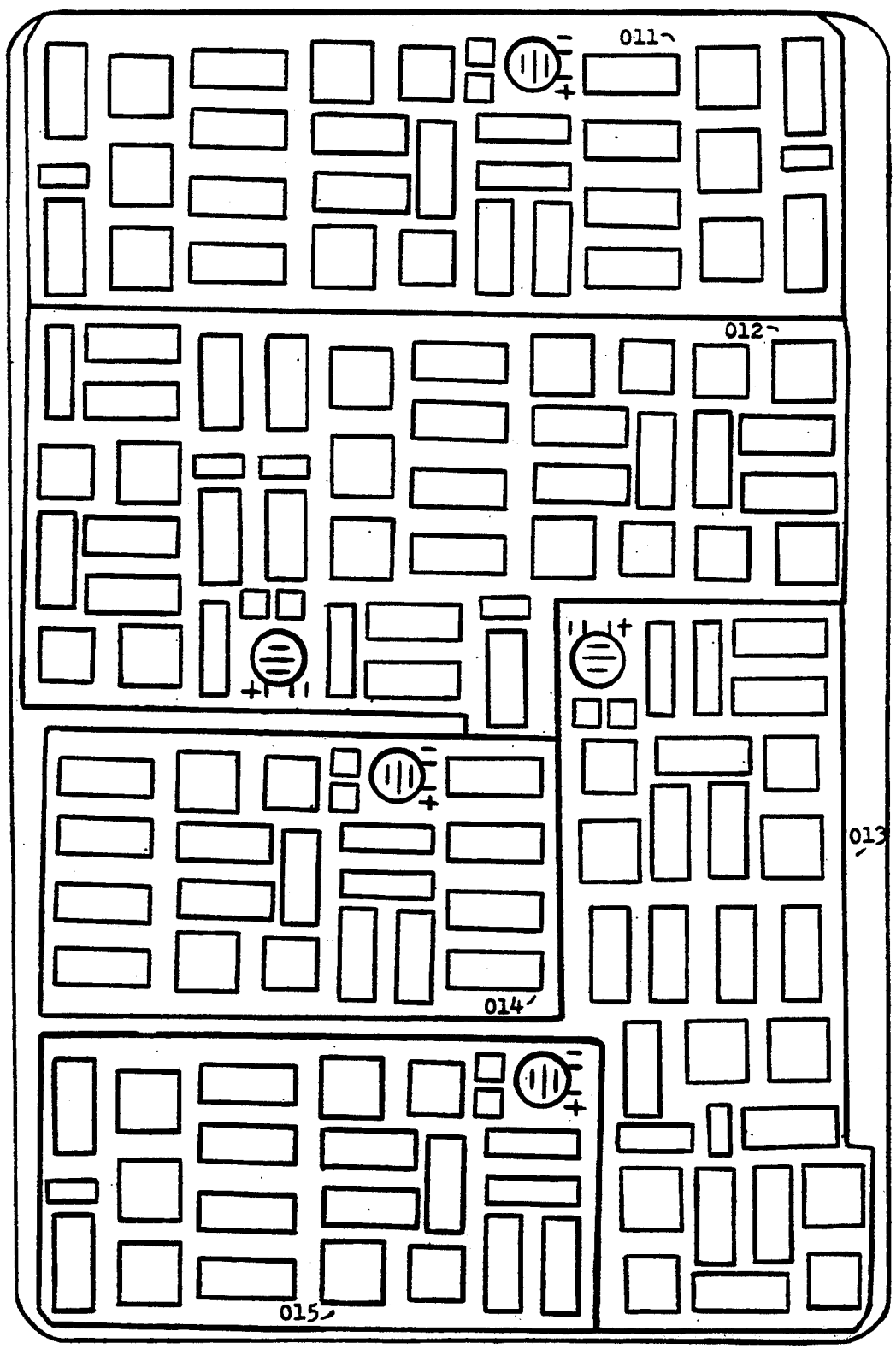

FIG. 1g is representative of the CPU control card located immediately beneath the array programming components located within the interior cover of said device. Numerals 011 through 015 of FIG. 1g designate five separate and distict control card units accessing the video CD unit, with accessing by acoustic units, the sequencing and dispersal of carrier mediated volstiles and other substances and user interfacing of systems by other means. Said user interfacing includes but is not limited to cursor light pen, mechanical manipulation of key board elements, or other forms of accessing entailing speech recognition and speech synthesis.

Figure 1H:
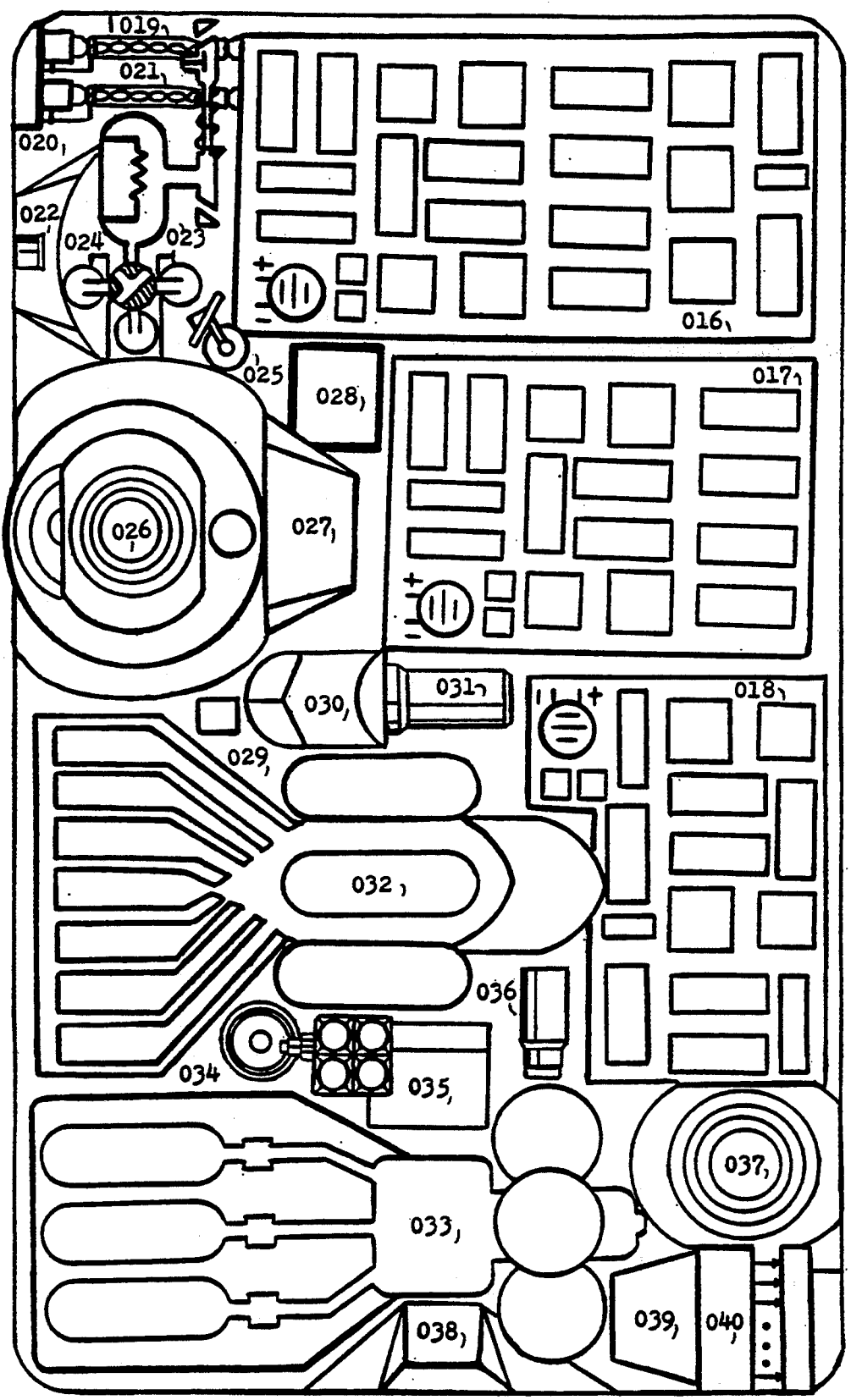

FIG. 1h is a partial sectioned view of the lower portion of said device excluding the holographic LED/LCD screen assembly and the acoustic generator means. Numerals 016, 017 and 018 collectively define control cards for actuation and sequencing of laser emissions, holographic and LED/LCD retrieval, the amalgamation of super-liquified chemical substrates, the volatilization of carrier mediated substances integrated with 28 presentation of prerecorded acoustic data. Elements 019, 020 and 021 denote a electro-optical coupler element, compilier and fiber optics elements which receive data input from an external CPU source. Numeral 022 collectively describes a MOD/DOM and decoding transponder for receiving input from a phone element and/or someother transmission unit, such as a microwave, or radiowave transmitter. Elements 023, 024 and 025 designate one of three plasma ion laser, gasifiers and automated mirror elements.

Figure 8:
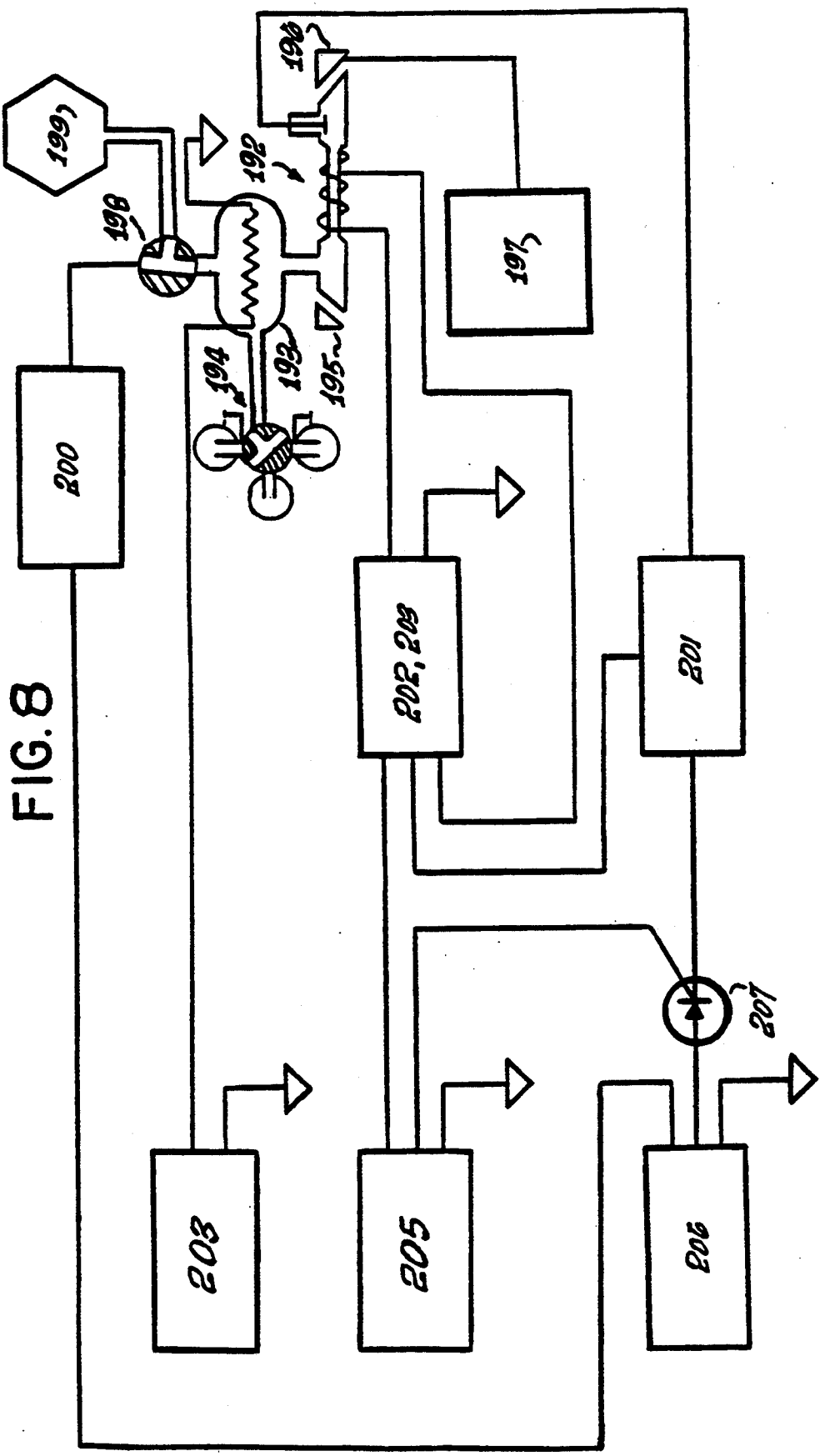
FIG. 8 illustrates in block diagram fashion a simple plasma laser generator means and ancillary systems.
Figure 9:
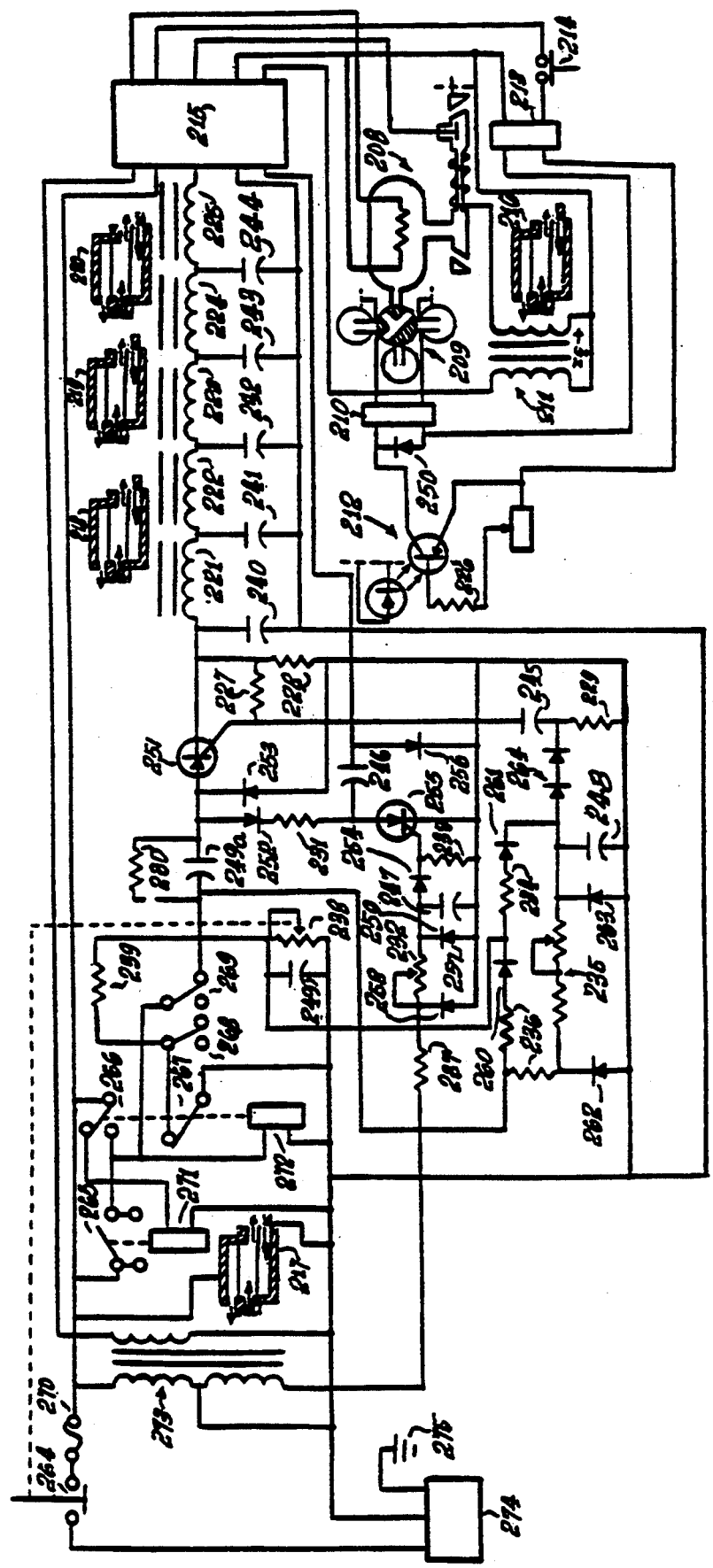
FIG. 9 is a simplified electrical schematic of a single plasma laser source generator.
Figure 10:
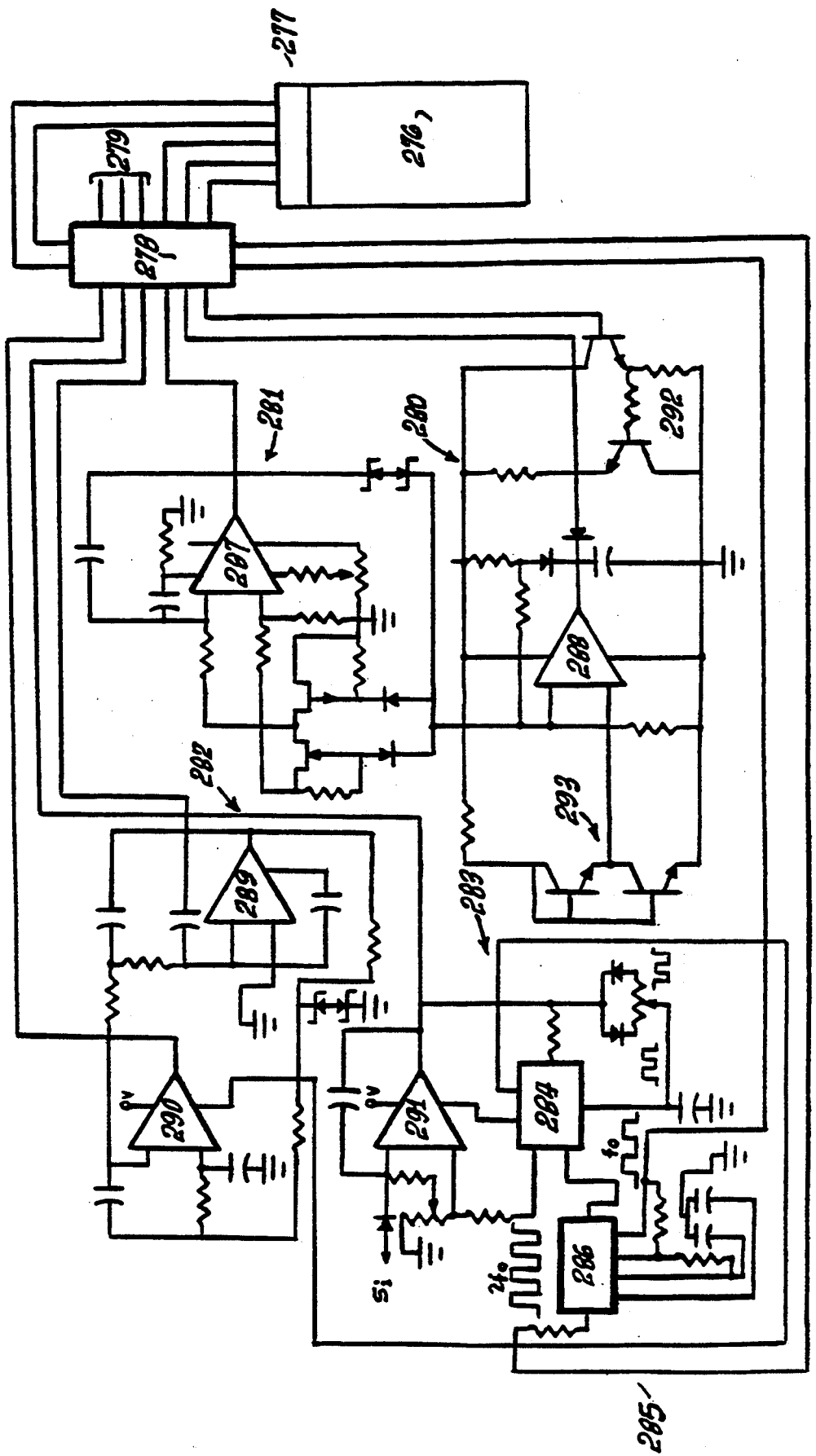
FIG. 10 is a concise simplified electrical schematic in part of a pulse shaping circuit associated with a given laser source generators.

The term plasma laser, plasma ion laser, plasma generater, or any other variations are equivalent and refer to a laser containing an active gaseous lasing medium, as disclosed in FIGS. 8 through 10 and in the corresponding specification. Element 026 is collectively assigned to CD video player unit and microprocessor card readier. Elements 027, 028 represent an audio-acoustic and charge capacitance video digital enhancer system. Element 029 denotes one of several electro-optical feedback units, which collectively operate to compensate for variances in ambient conditions of light, sound, temperature, humidity and other environmental factors surrounding the user and said device. Numerals 030, 031 designate one of several electro-optical sequencer systems utilized to integrate the presentation of acoustic, gustatory, olfactory and visual data to the user. Elements 032, 033 designate an automated olfactory volatization system and an automated gustatory aerosol delivery system. Both systems 032, 033 are described in greater detail later on in the specification. The gustatory system embodied a mixing chamber, humidifier and aerosol dispersal means; whereas the olfactory system embodies a radio-frequency unit, thermal induction element coupled to a mixing chamber and sintered delivery means. Numerals 034, 035 describe one of at-least three piezoelectric acoustic generators and digital processing systems utilized to implement the presentation of data with a variety of different sounds and enhanced pressure waves, which stimulate the users somoto-sensory receptors, as well as the auditory receptors. Numerals 036, 037 039 and 040 designate an electro-optical sequencer, enhancer and amplifier means for the retrieval implementation and presentation of holographic data. Element 038 describes in part a power module recepticle embodying a power module, numeral 10.

Figure 1I:
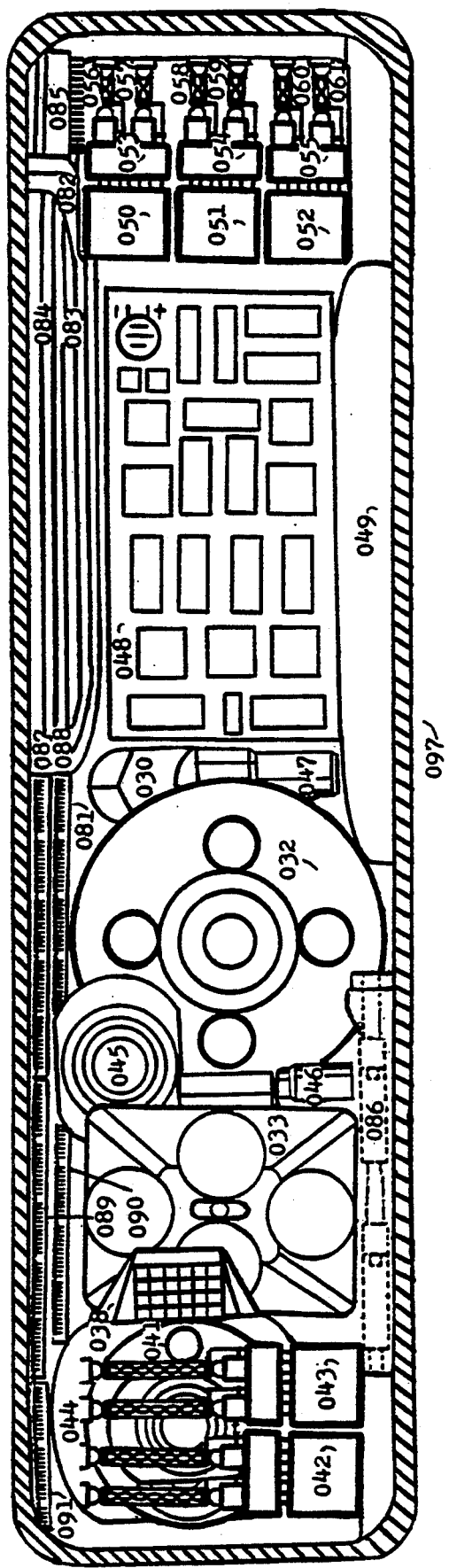
Figure 1J:
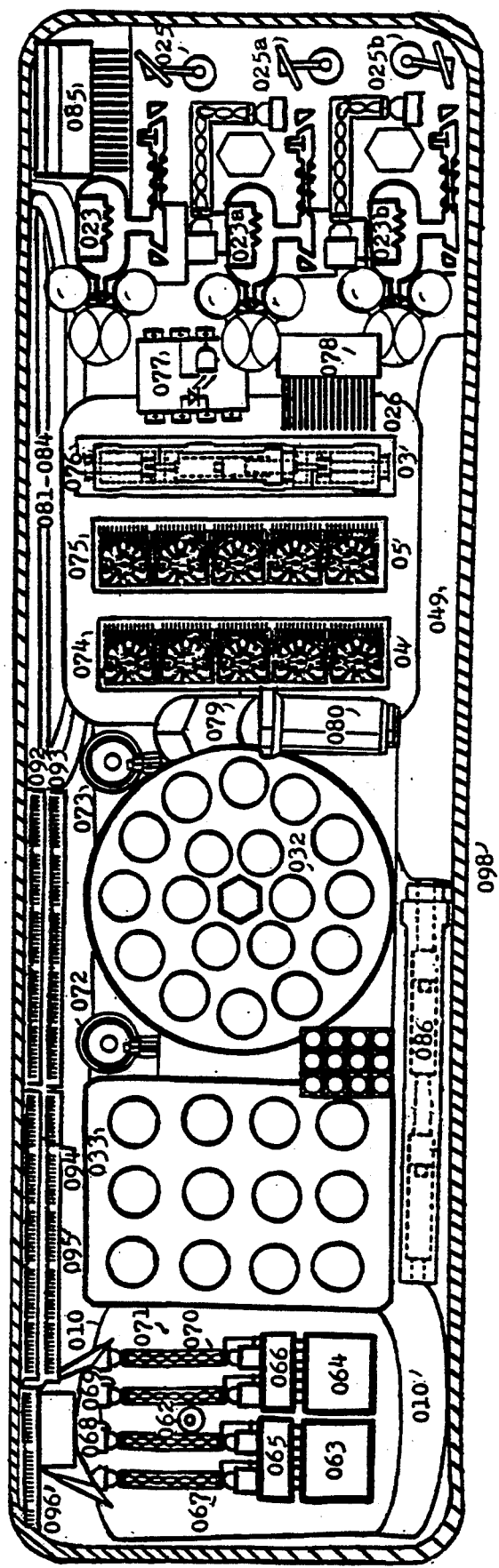

FIGS. 1i, 1j are side elevations of the aforementioned device. Both views are obverse of one another. Numerals 041, 042 of FIGS. 1i, 1j disclose an electro-optical power converter element coupled to a piezoelectric transformer element, which is further coupled to a power source, not shown. Numerals 032, 033 disclose front and aft portions of the systems utilized to manufacture and disperse gustatory and olfactory agents. Numerals 041, 042, 043 and 044 of FIG. 1i designate a piezoelectric transformer, electro-optical converters elements and fiber optics conducting cables. Numerals 038 through 040 previously described in FIG. 1h are indicated in FIG. 1i. Elements 045, 046 and 047 describe a auxiliary holographic optical address, electro-optical address for the LED/LCD address acoustical address and piezoelectric acoustic generator means. A secondary optical processing card which is equipted with REM electro-optical processing chips is collectively described by numeral 048. Numeral 049 is an optical processing center embodying at least three optical processing chips, numerals 050, 051, 052, at least three electro-optical D/A converters, described by units 053, 054, 055 and at-least six fiber optics transmission cables described by elements 056 through 061.

FIG. 1j entails a sectioned side elevation of the aforementioned device. Elements 062, 063 and units 064 through 071 designate a piezoelectric transformer emboding within it primary and secondary winds, an electric female power inlet, a complement of electro-optical converter units, electro-optical processing units and fiber optic elements forming one of four electro-optical bridge elements encasing said transformer element. The dispersal of aerosals and carrier mediated volatiles through induction orfices 072, 073.

FIG. 2 defines in a concise diagrammatic fashion the operative subsystems embodied within the aforesaid Invention, or said IVS device. The central controller means wherein all data is entered, processed and acted upon is indicated collectively by element 33. Numerals 34 through 39 of FIG. 2 are assigned to signal processing elements. Numerals 40, 41 and 42 designate digital data sequencers for an array of multicolored LEDs, LCDs and electroilluminescent elements defined by networks 43, 44 and 45, respectively. Active display thin film holographic emulsion plates number 46 are transilluminated by emissions provided by a solid state dye cell means 47 in conjunction with laser sources 48 or by the said laser means directly. On line computer input from a modem or otherwise described by number 49 provides a means to edit or add to pre-existing text.

The memory or text of the IVS device is also expandable by the simple addition of EEPROM chips or their equivalents provided by element 50. Concentrated scents are contained wi-thin separate cart-ridges number 51 to be selectively volatilization and aerate by elements 52, 53 prior to being converted into an aerosol by a dispersal mechanism, number 54. The various tastes are contained as number 55 concentrated liqueurs in a gustatory repertoire, a mixer means 56 and an automated dispensor means designated by numeral 57. Audio signals are transduced by piezoelectric elements, 58, which are bidirectional to receive the vocal input from the user 59 as well as transmit acoustical impulses, In order to be an entirely interactive system the acoustical subsystems are provided with a voice recognition means, 60, a voice synthesizer element defined by number 61 and are be equipped with repertoire of digitized signals corresponding to spoken word equivalents described by number 62. Other forms of electro-optical interactive systems provided for the user are a keyboard element, a rotatable mouse and or Joy stick means and a light wand micro-miniature video link means described by numerals 63, 64 and 65, respectively. Passive systems such as thin film white light diffraction gradient holographs are interfaced with their active counter parts, number 46.

Figure 3:
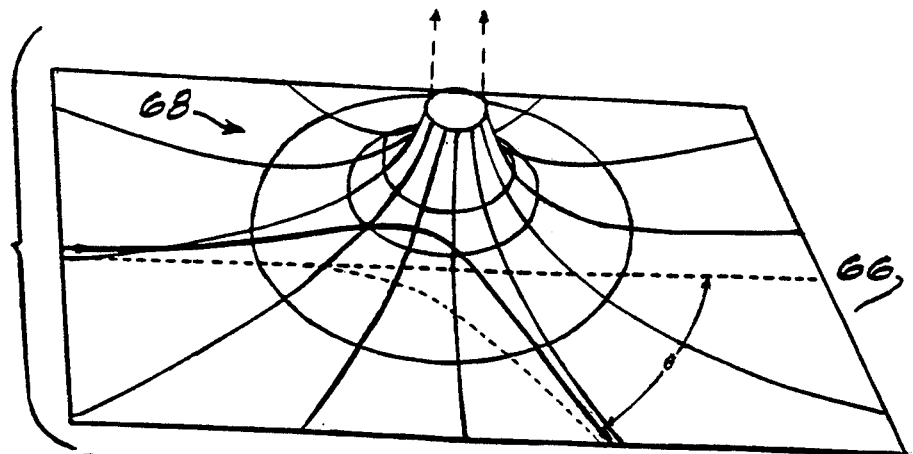
FIGS. 3, 3a and 3b illustrate a simulated holographic projection, a fresnel magnifier and a holographic emulsion plate FIG. 3c denotes concise pictorial representations of holographic sample topics projected from the screen of said IVS device.
Figure 3A:
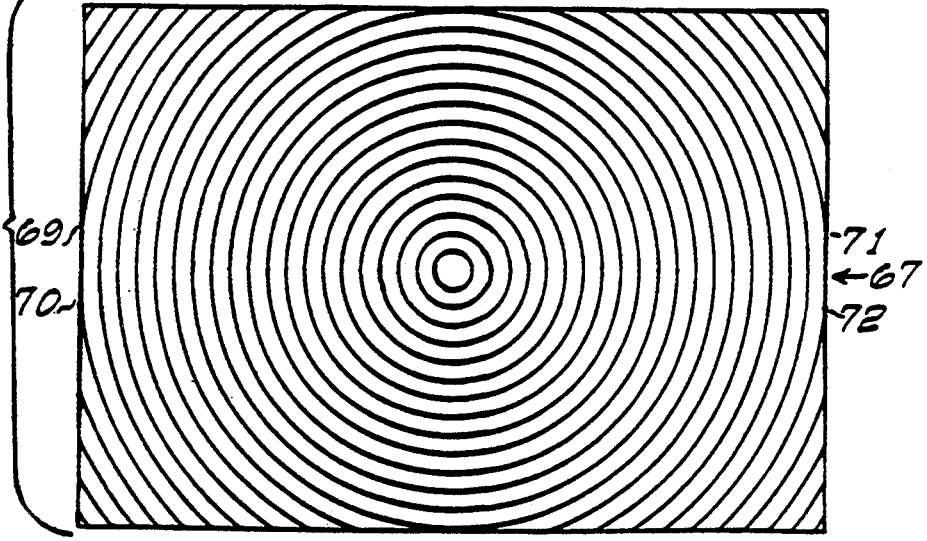
Figure 3B:
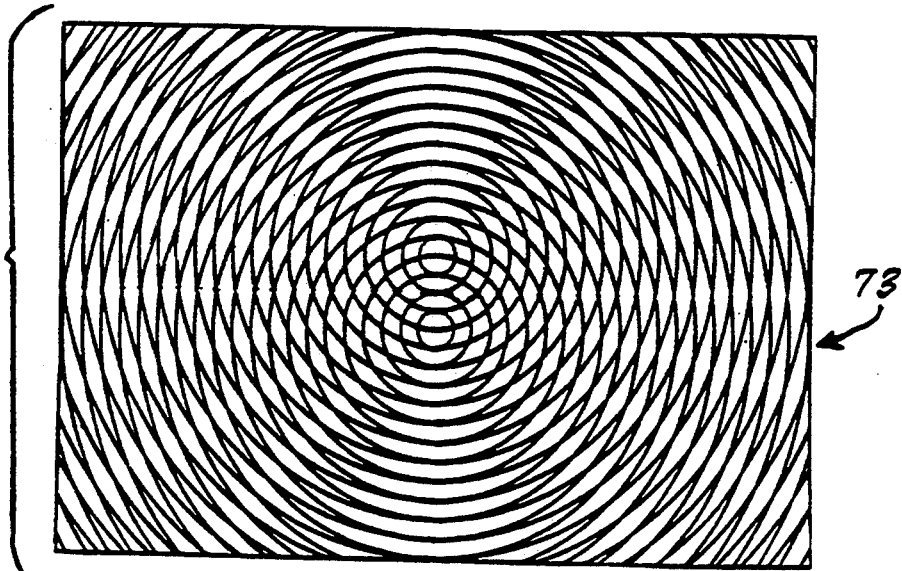

FIG. 3, 3a and 3b are simplified pictorial representation of three elements of the holographic projection means. Numerals 66, 67 and 68 of FIG. 3 are assigned to the central projection plane, the apparent fresnel magnifying lense and a representation of the actual holographic projection. Element 67 defines the fresnel lense. Numbers 69, 70 and 71, 72 represent fusion Junctions to the fresnel element. Unit 73 designates a number of thin film holographic plates superimposed over one another.

Figure 3C:
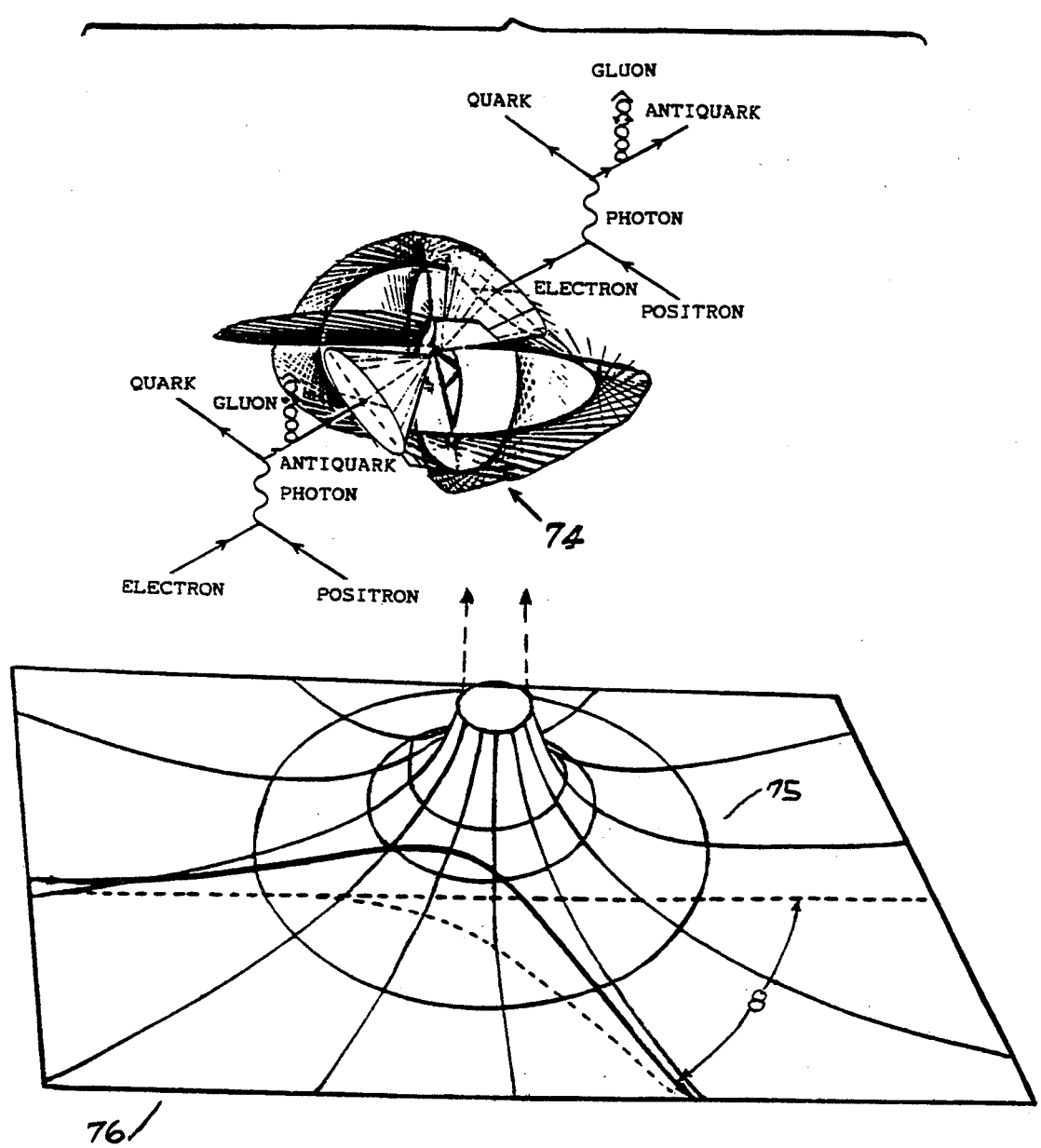

FIGS. 3a through 3c are concise pictorial representations of the range of holographic topics and the like which can be displayed. Images ranging from field based particle physics to the metaphysical and including theology. Numerals 74, 75 describe particle interactions and lattice formations of a crystalline structure. Elements 74 to 76 represent the holographic image and holographic plate elements.

Figure 4:
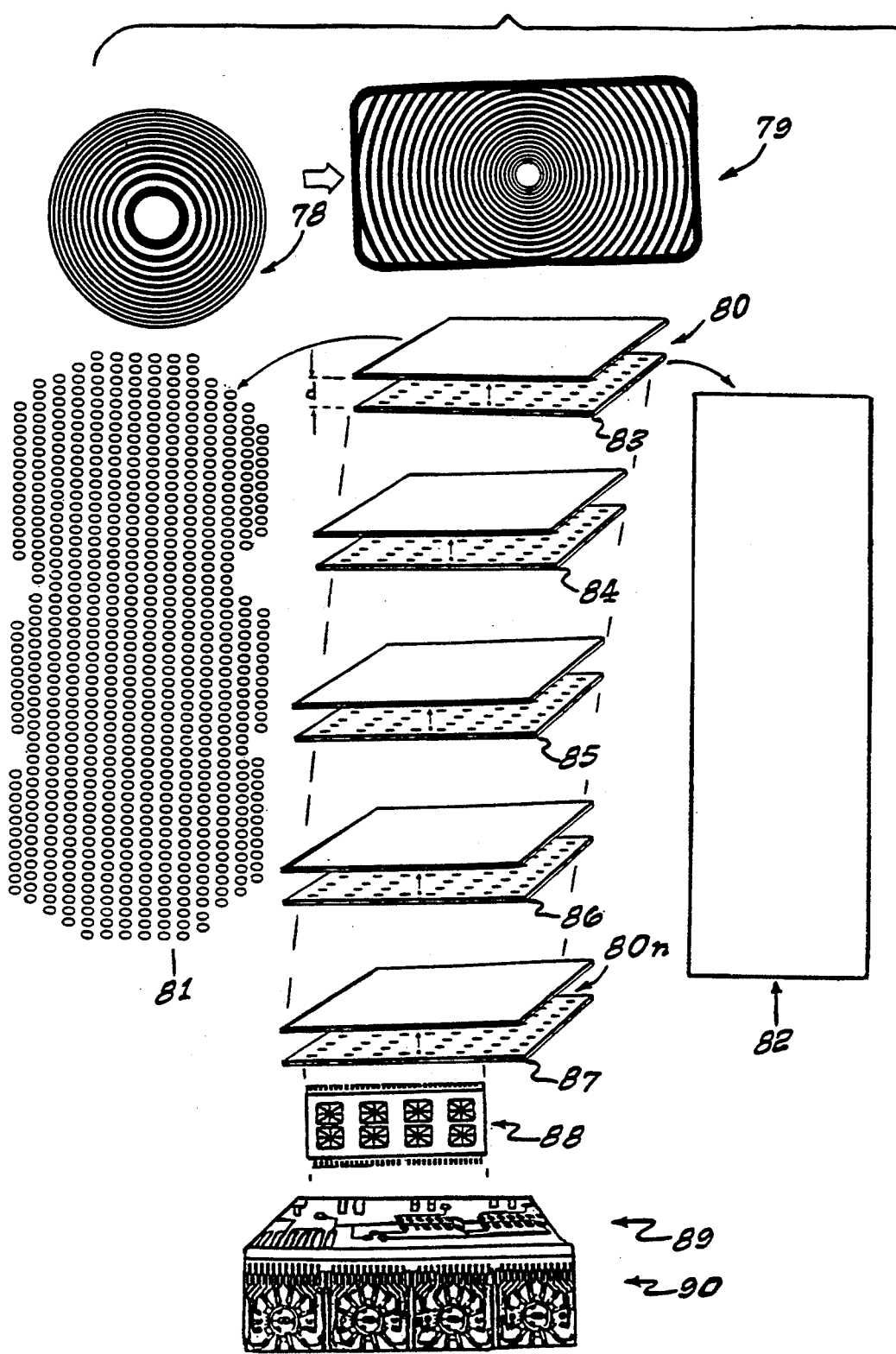
FIG. 4 is a concise pictorial representation of the basic assembly of the holographic LED/LCD electroilluminescent imaging complex.

FIG. 4 is a concise pictorial representation of the basic assemblage of the holographic LED/LCD electroilluminescent imaging complex. Numerals 78, 79 represent a magnified portion of the angular perspective of the fresnel lense. Numerals 80 through 80n are descriptive of the complex of thin film holographic emulsions. Elements 81, 82 define the emulsion and interference patterns. Numerals 83 through 87 refers explicitly to an array LCD thin film emulsions mutually disposed between holographic emulsions 80 through 80n. Element 88 is assigned to an LED array situated between units 81 to 87 and the electroilluminescent screen means defined by numerals 88, 89, 90. The multicolored LCD screen for daylight viewing and the electroilluminescent panel utilized for viewing images in intermediate and low levels of light supplied from a micro miniature laser discs system, not shown in the figure. Interdisposed between each thin film holographic emulsions are equivalent diffraction gradient holographic elements or thin film emulsions, which produce a progressive rainbow of colors when viewed in the presence of non-coherent light. The so called rainbow of colors generated ranging from a violet reflective color to a red coloration depending on way light incidents off a given holographic diffraction membrane. The diffraction gradient holographs are so arranged as to be overlapped in succession, such that as the angle of rotation changes within a given plane, objects and the like etched within a number of separate and distinct defraction holographs appear to be animated. Additional as the sheet or the user changes the angular perspective different separate and distinct holographic diffractions are viewed in rapid succession. Therefore an object appears in motion to the user due to saccadian eye movement, retinal after images and small alteration in angular perspectives. This type of embossed processing of diffraction gradient holograph allows the user to so extend view passively through a large portion of data in the absence of active or powered systems which must be implemented with a readily available power source. Each page has incorporated within its structure a thin film light sensor, not shown, which signals whether active or passive systems are to be presented to the user.

Figure 5:
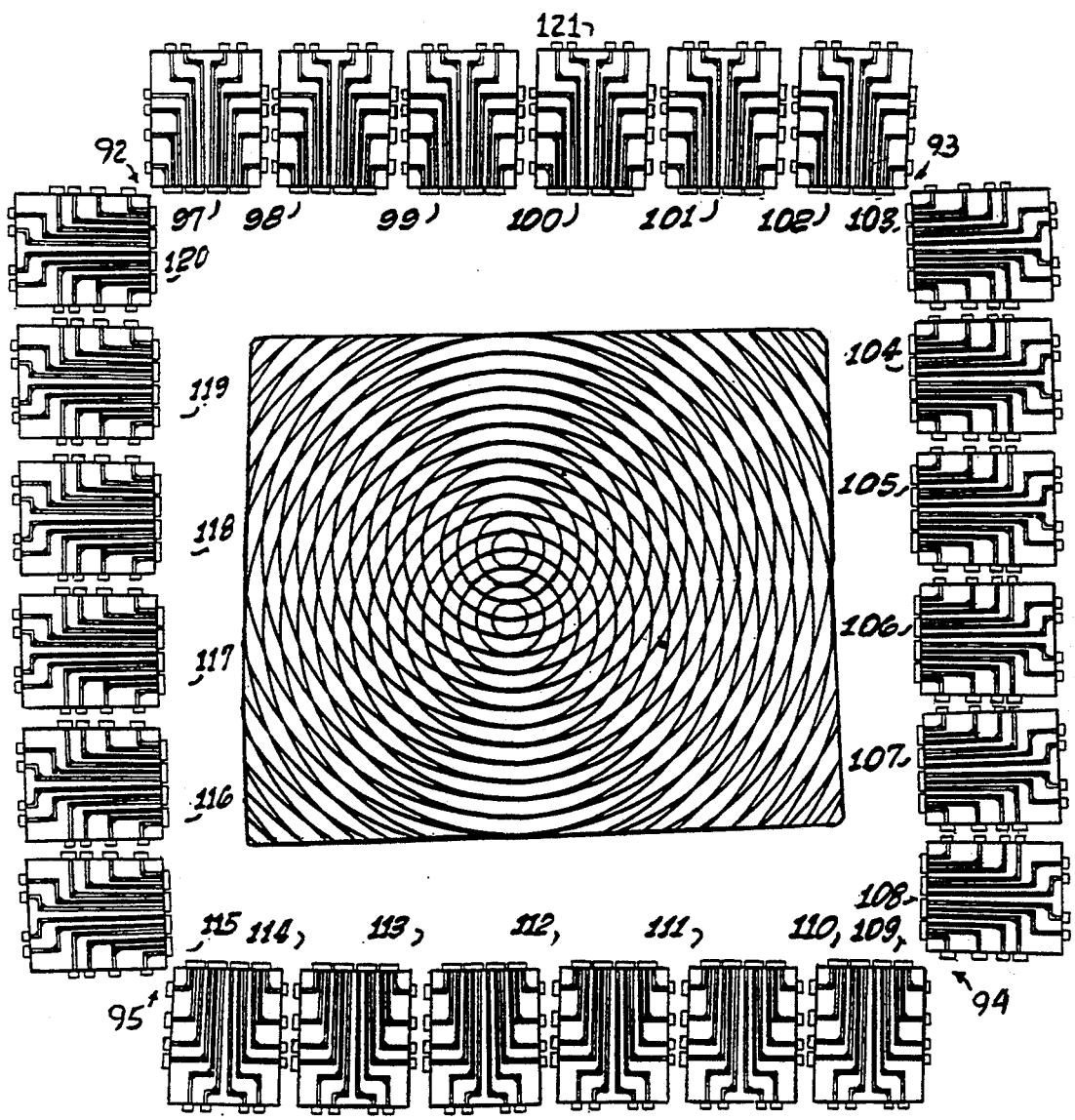
FIGS. 5 through 5c describes a holographic plate, fresnel magnifier and multi-cell Kerr elements FIGS. 6 through 6d describe in detail a single multi-cell Kerr element, the interface between said element and a portion of the aforesaid holographic plate and the operation of other ancilliary systems.
Figure 5:
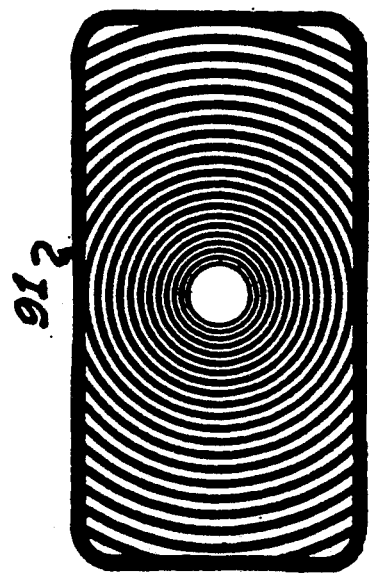
Figure 5:
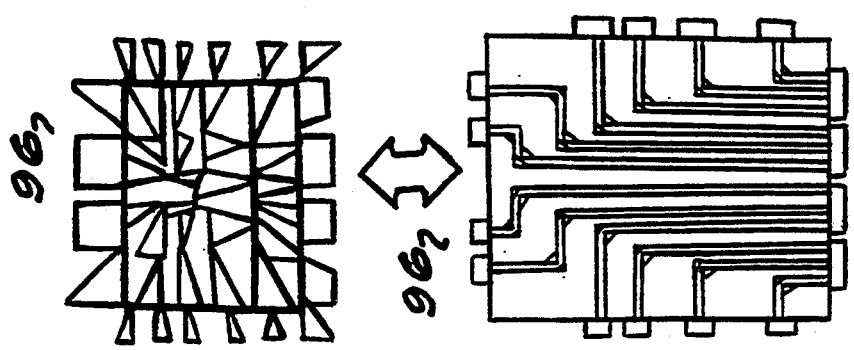

FIG. 5 is a partial perspective of a single thin film holographic emulsion composite. Numerals 91, 96 of FIGS. 5a, 5b designate a fresnel magnifying element and Kerr cell unit. Element 92, 93, 94 and 95 collectively describe separate elements of a single holographic emulsion plate. Numbers 96 through 120 define coupling terminals and control centers wherein separate optics elements interface. Numeral 121 designates a single composite thin film emulsion plate with an intermediate number of subelements. A single emulsion plate can consist of a single element with a single terminus or a relative large number of emulsive thin film structures intersect with their respective fiber optics means. Each fiber optics element is capable of carrying one or more optical emissive wavelengths. The number of elements forming a single thin film emulsion plate is directly proportional to the complexity of the given holographic plate and the number of wavelengths required to transilluminate each member of the composite. The minimum number of thin film emulsion plates required to produce a simulated animated sequence of events is an exponential function of the said number of events.

Figure 5C:
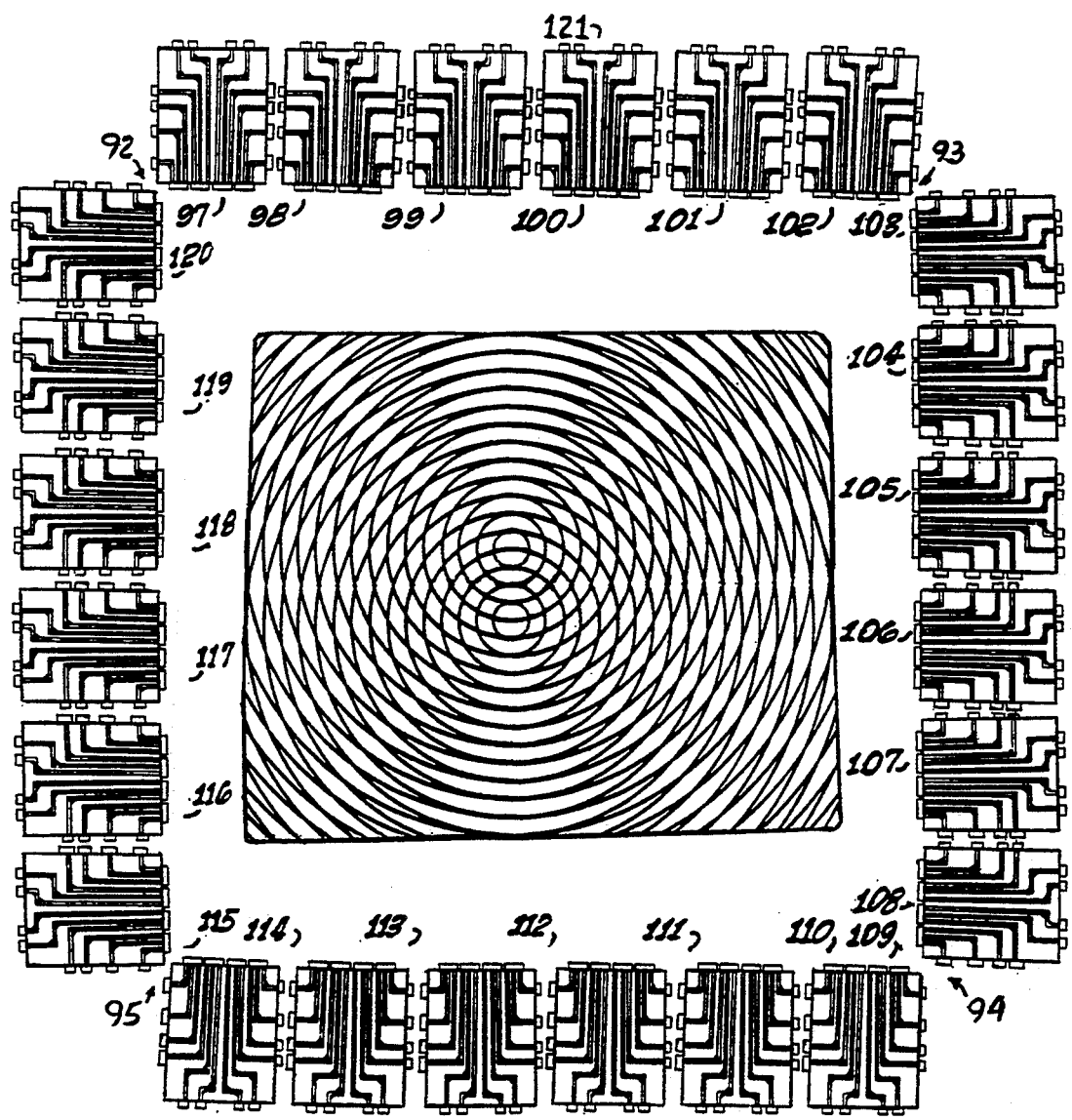

FIG. 5c is a topographical picture and schematic representation of a series of overlapping and adjacent holographic plates. The collage of holographic plates are Collectively designated by a single numeric value, number 121. Interfaced along the periphery of holographic plates, represented by numeral 16, are a complex of twenty-four optical switching elements designated by numerals 96 through 120. Two types of electro-optical devices were employed, one of which was a specialized multicelled Kerr type apparatus. Each cell from the Kerr unit which is selectively being activated to incident upon a given exit fiber optics means, not shown here, thereby illuminating only a specific region from a specific holographic emulsion plate. Various cells or channels of each Kerr type cell remain emissive or transparent, until the nitrobenzene medium is charged and non-emissive to the said transmission source. Another type of switching mechanism utilized are numerous Q-switching elements embodied within the unit. However, the costs and maintance aspects for such devices are far in excess of the Kerr type of arrangement. The operation of both the specialized Kerr cell means and the said Q-switching elements are consistant with similar such devices, well understood by those skilled in the art.

Figure 6:
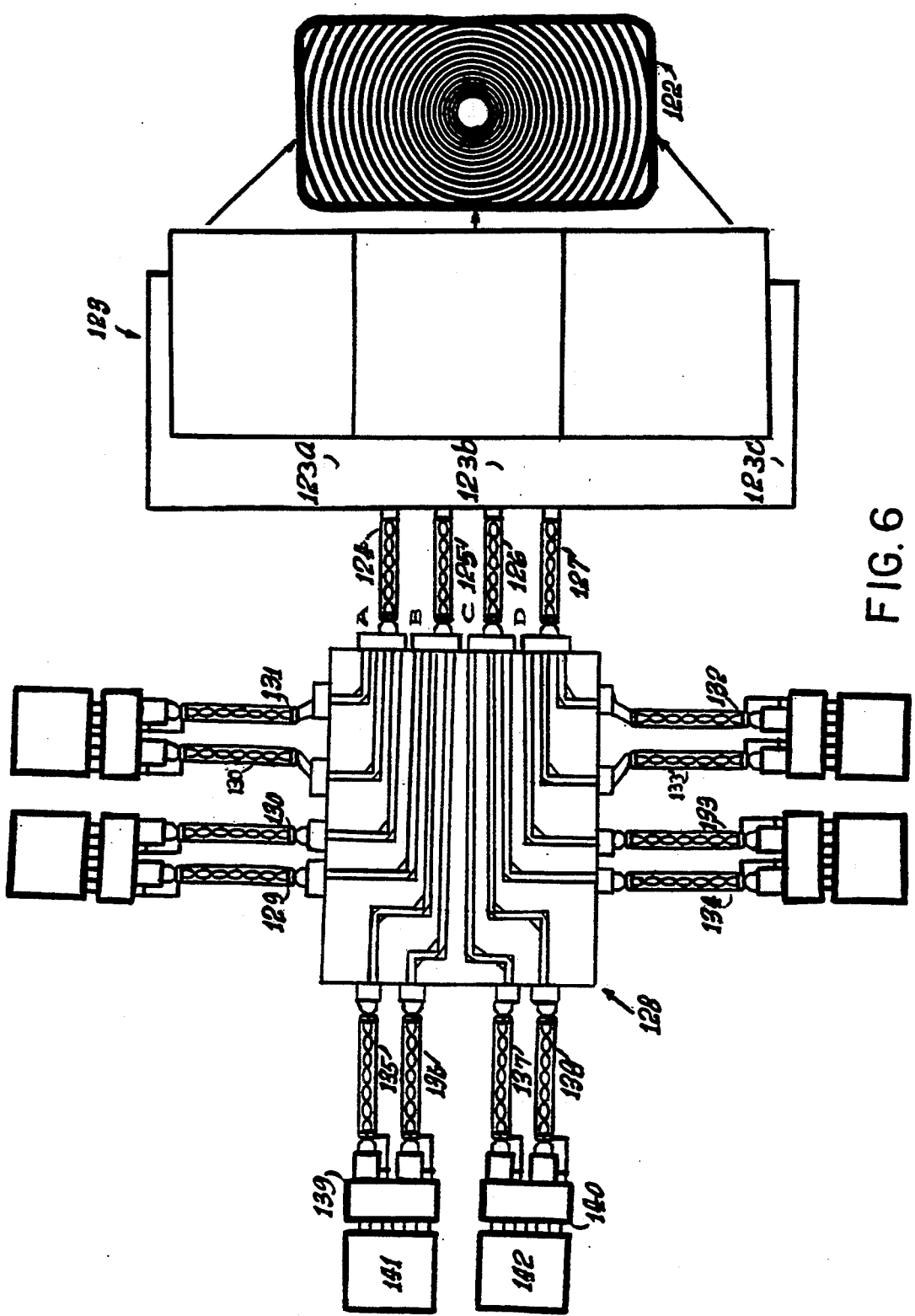

FIG. 6 portrays in a schematic manner a single multicelled Kerr unit, laser means and a partial holographic plate unit. Numerals. 141, 142 denote digital pulse modulators which specify the electronic signal sequence, duration or length, intensity and/or other processes are delivered by two commercially available tunable dye lasers, described herein by numerals 139, 140, respectively. Each of the said laser elements, numerals 139, 140 are situated directly aft of optical coupler means designated by numerals A through D. The emissions from the said dye lasers 139, 140, are conducted from elements a through D to a specialized multicelled Kerr unit, number 129, by four individual and distinct fiber optic/coupling means, which are denoted by numbers 135 through 138.;Additional electro-optical means designated by elements 129 through 133' are provided to actuate separate switching cells each of which contain suitable electronically opaque mediums; such as nitrobenzene, which remains optically emissive until charged. Four separate and distinct combination fiber optical coupler elements are described by the numerals 124 through 127. It is typically within the same said fiber optical complement, denoted by elements 124 through 127; wherein alterations or initial transductions in the wavelength and frequency occurs. Trace additives or dopants such as $Ba_2NaNb_5O_{15}$, lithium iodate, can double or triple the frequency; whereas vessels of organic dye mediums can selectively shift the wavelength spectrum in a manner well known to those skilled in the art. Said dyes are encapsulated within channels or cells either embodied within said multi-cell Kerr element and/or continuous with said cell, forming a composite structure. These commerically organic dyes, such as, p-Terphenyl in Cyclohexane with a lasing wavelength of 3410 Å, 7-Hydroxycoumarin in $H_2O$ with a lasing wavelength of 4600 Å, Rhodamine 6G in enthanol with a lasing wavelength of 5900 Å or similar such materials are employed along with other well known commerically available dyes. Means 124 through 127 thereby provide a simple and specific means of generating multiple colored holographics, which allows the viewer to experience dynamic multicolored three dimensional images in the blue, green, yellow, red, violet and additional regions of the spectrum. Each of the terminating fiber optics are orientated along specified critical emission points, which are necessary to illuminate certain specified portions of a given specific emulsion plate, wherein the beams are appropriately diffused by defraction gradings, or other Well known means. A single portion of a typical emulsion plate is specified by numeral 123, whereas other equivalent emulsion plates are indicated by elements 123a to 123c. Elements 64 and 65 are shown minus the Kerr complex and its associated elements for the sake of simplicity. Numeral 123 illustrates in a rather schematic manner a single holographic plane, consisting of a multiple array of overlapping and adjacent thin layered holographic emulsions which are typical of those depicted by numerals 123a, 123b and 123c, respectively. Said emulsions form holographic plates, which overlap one another and said plates are situated beneath fresnel magnifier element 122. Said plates may or may not correspond to said holographic plane.

Several types of multicolored holographic means were deployed in the construction of the hologram display, ranging from transmission to reflection, or equivalent hologram types. 4 Transmission holographic emulsion plates, consisting of three separate micro-thin holographic emulsion films are sensitive to at least four of the colors (red, green, yellow and blue). Holographic emulsions of Red 8E75, Green 8E560 and Kodak 649F which offers a full range of wavelength sensative emulsions, and/or other similar such commerically available holographic preporations thereof, are properly exposed, dimensioned and angled. A precise match between a given specified critical angle and selected or specific chromatic shifts are an absolute necessity in order to keep all colors in their proper synch.* A simple arrangement where only three primary colors are exacted at-least three separate exposures are needed. The problems of spatial orientation, beam diffusion/incident and the like are that each process must be accurate, in order to avoid improper color separation, wherein colors are otherwise shifted out of phase. Nine derived interference patterns are initiated by three separate and distinct emulsions, the number and complexity increasing proportionately with an increase in the definitive or absolute number of colors. Each said emulsion film is preferably 100 microns thick and laminated to other emulsion films by Epotek 302-2 coupled to a mylar polyacrylic silicate diffuser, which are commercially available sources.

*synch or order of presentation.

Figure 6A:
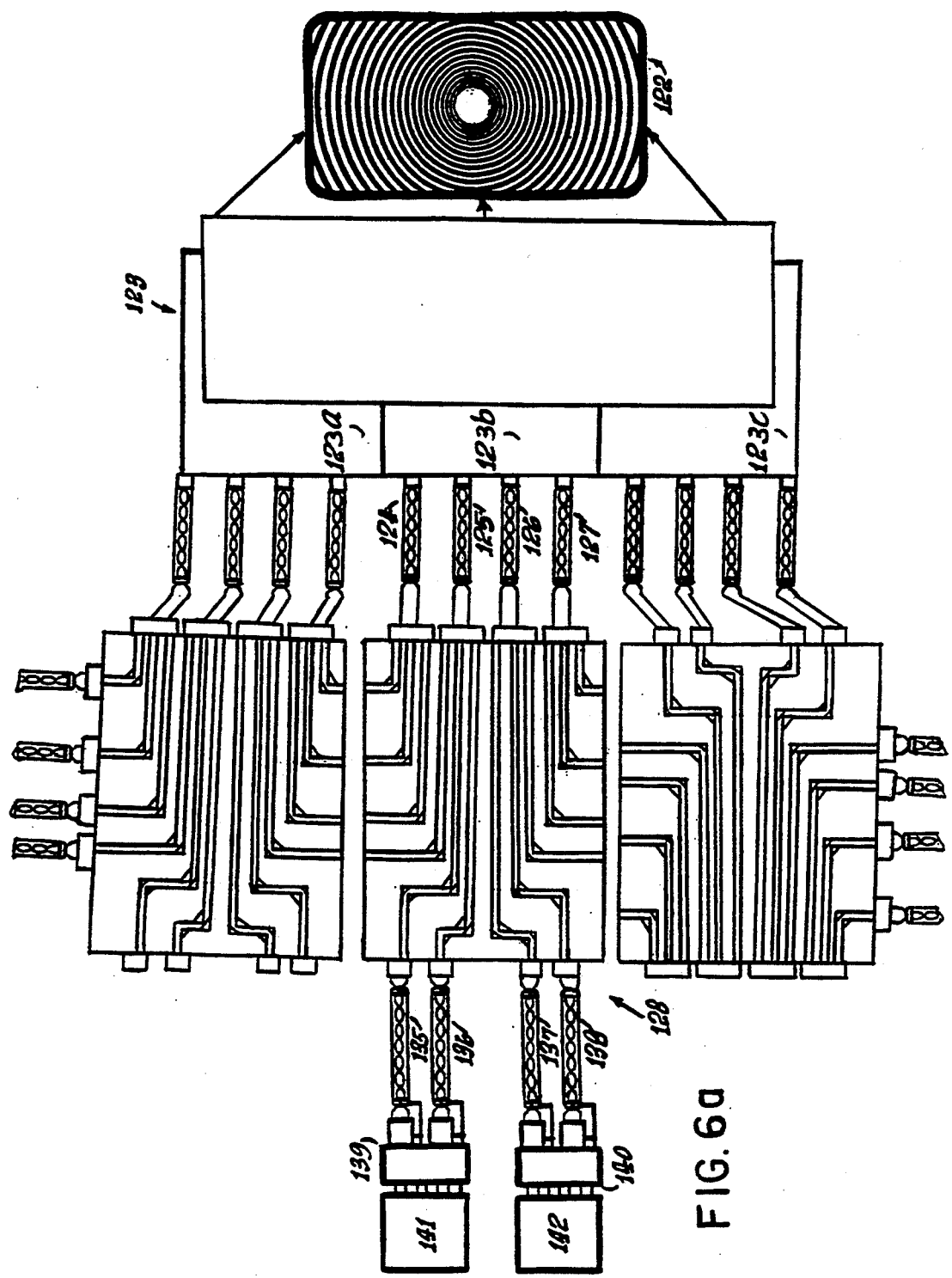

FIG. 6a is a schematic representation of a single multi-cell multiple channel Kerr cell element. Said Kerr cell element is representative of an array of equivalent cell elements linearily interfaced along the perimeter of each aforesaid holographic emulsion plate. The aforementioned Kerr cell element consists of an array of separate and distinct channels. Each said channel is physically isolated from every other said channel. Each said channel is electro-optically isolated from everyother said channel. The aforesaid channels embodied within said cell element are filled with either nitrobenzene or fluid dyes well known by those skilled in the art. The said dye shifts the wavelength and/or frequency of the laser emission in a manner consistent with conventional organic dyes utilized currently in existing dye lasers. Each said channel is coupled to two equivalent lense elements and each said lense element is coupled to a separate and distinct fiber optic element. Said lense element located at the termine of each said channel is filled with nitrobenzene, or an equivalent substance, which when activated by command signals becomes optically opaque. Said lense structure may additionally be composed of a solid state electro-optical prism which is incorporated by reference by U.S. patent application Ser. No. 4,589,078. The lense formed from said solid state material remains reflectively opaque to certain wavelengths and spectral lines embodied within said wavelengths until current is applied. Additional patented, patent pending and related works are incorporated by reference are as follows: 4,884,809, 4,893,815, pending work. Patented and pending works 5,020,411, 140,308 and CIPs of said works, which disclose the operation of all systems and subsystems embodied within a volume of space and complexity relative to that embodied within the invention.

All component parts and systems embodied with the invention unless specified otherwise are obtained from commercially available sources. All systems embodied within said invention operate in a manner consistant with processes and systems well known by those skilled in the art. The optimium construction mode for the fabrication of said multi-cell Kerr element is preferably constructed of a pyrex non-conducting, tempered glass substrate having a thickness of between 1.5 to 2 millimeters. Said glass substrate is readily obtainable from Corning and other commerical sources especially those which manifacture glass covers for microscope slides. A form of photolithography is optimally used to provide a mask to cover said glass substiate with a paraffin material while leaving exposed linear channels or tracks which can readily be etched by placing said glass substrate in a solution of $HF^+$ acid for a period sufficient to etch said channels to a depth of approximately 1.0 millimeter and said period corresponded to approximately two minutes for a one molar concentration of $HF^+$ acid. The time required for etching may vary depending on the type of glass substrate used and the potency of said $HF^+$ acid; a doppler laser technique or photoelectric method well known by those skilled in the art is preferably used to determine depth. The $HF^+$ acid or any other suitable etching medium is immediately washed and the paraffin material is then dissolved by a second bath of HCL acid followed by a water and acetone rinse to remove any residual acid or containment which may be remaining on said glass substrate a second glass substrate is fused onto the surface of said substrate containing the aforesaid linear channels or cells. Methods of encapsulation, wherein adhesives containing a silicon cyan, Acylate ester, or epoxy bonding adhesive are utilized and are well known and preferred; holster thermal bonding and various silicon glues may also be used to achieve bonding. Said channels or cells are treated with a solvent to clean the surfaces of said channels, which is followed by a solution of flux material, that precedes a solution of reflective coating of silver chromate or other suitable reflective mediums well known by those skilled in the art. The glass substrate may be heat treated to allow the flux and reflective coating to disperse more uniformily along the interior of each channel. Each channel must be optically isolated from every other said channel and there are currently three ways to achieve said isolation. Optical isolation of said channels or cells is achieved by coating each said channel with a non-reactive reflective material, covering said channels or cells with an optically opaque material, or ablatting the walls of said channels or cells in order to render said channel isolated from channels adjacent to said channel. Each said channel follows a linear or L-configuration; with microscopic reflective mirror surfaces along said channels where bends in said channels are present; however this said linear configuration is not the only configuration or design possible and should not limit the number and types of configurations embodied within the scope of the invention. Each said channel or cell terminates in a lense and each said lense is preferably fabricated from an electrical non-conducting glass substrate and hollowed to be filled with an optically active medium such as nitrobenzene. A separate and distinct pair of microelectrodes are embodied within each said lense forming a micro-miniature cathode and anode in which to actuate said optically active medium. The operation and electrical disposition of said micro-minature electrodes are consistant with conventional units well known by those skilled in the art. Said lense elements are then polished by several well known commerically available polishing agents used on fiber optics elements to produce a flat optical transmission region which can be readily coupled to fiber optics elements embodied within an optical coupler means. Said fiber-optics and coupler means are commerically available from Corning and other manufactures. FIGS. 6, 6a disclose that the number of fiber optics elements illuminated by laser elements exceed the number of fiber optics elements interfacing with a hologram imaging region by a factor of four to one. The number of incoming and outgoing fiber optics elements and corresponding input and output ports are arbitrary and must not be construed in a limiting sense. The number of incoming fiber optics elements are shown to be optimally greater than said fiber optics elements exiting said multi-cell Kerr cell element/which provides interfacing with said holographic region. Each electrode pair are electrically isolated from everyother electrode pair and each electrode inputs into a controller element, coupled to a timing circuit, which receives input from a CPU element and said input determines which lense element actuated, the duration of actuation and the sequence number of said lense elements being actuated. The number of out going fiber optics elements illuminated by said channels and the sequence of fiber optics elements illuminating regions of holographic plates 1—n is determined by the number of lense elements containing optically active material receiving current from an electrical source and both the said electrical source and number of electrical biased of said lense is controlled by commands from said CPU; which controls the optically emissivity of said tense element. Said exiting fiber optics element are polished and rounded to provide a focused 180° of arc light source and said rounded terminal end of said fiber optics exiting element transmit illuminating emissions through an epoxylated diffuser region, which when coupled to the layers of thin film holographic emulsions consisting of alternating transmission and reflection types of holograms forming said holographic plate provides, both the reference and incident beam necessary to reconstruct a holographic image and said process is consistant in operation with conventional methods of reconstructing images. The term reference beam is not to be confused with the reference beam required to initially form interference patterns within holograms; but is defined within the specification, unless stated otherwise, as a secondary incident beam which is required along with a primary incident beam, described as an incident beam, to transilluminate thin film holographic emulsions. A single thin film holographic emulsion as indicated in FIGS. 4, 6d, 7a, 7b and the corresponding specification require a number of incident and reference beams to transilluminate said single holographic emulsion and said beams are conveyed through numerous fiber optics elements. The angle of said exciting fiber optics elements are fixed and corresponds to the angle needed to reconstruct the image of said holographic plate. The angle of beam exiting from said exiting fiber optics elements are acted upon by said epoxylated diffuser mediums and the combination of reflection to transmission thin film emulsions to provide the necessary conditions within a much smaller volume to reconstruct said holographic images as do beam splitters, focusing lenses and diffuses means currently employed in conventional holography. It should be obvious that more than one said channels are coupled to the fewer number of exiting fiber optics means and said exiting means may contain a miniature bundle such that separate and distinct linear channels input onto said bundle, as to generate different colors depending upon which said optically active elements are actuated or switched on and which dyes are encapsulated within said channels are illuminated. Once constructed all said channels and lense elements are hermitically sealed and all said channels and lenses are physically and electro-optically isolated from everyother equivalent structure; in order to prevent short circuiting, to differentiate those channels to be illuminated from those which are to remain non-illuminated or non-emissive and to avoid the Unwanted actuation of said lense elements emboding said optically active lense elements containing said optically active mediums. Said multi-cell Kerr elements can be construct from plastics, ceramics or anyother suitable materials and different agents can be used to etch said materials. Said channels can be cut by laser beams, mechanical means employing diamond drill bits or other suitable means either from the top of said Kerr element or through the side or edge of said element. The use of one reflective coating preferred over another type of reflective coating is based on the cost and relative ease of application rather than the availability of said reflective coating and should not be consider the only available reflective coating. The use of opaque coatings rather than a reflective coating or a combination of both falls within the scope of the invention.

Figure 6B:
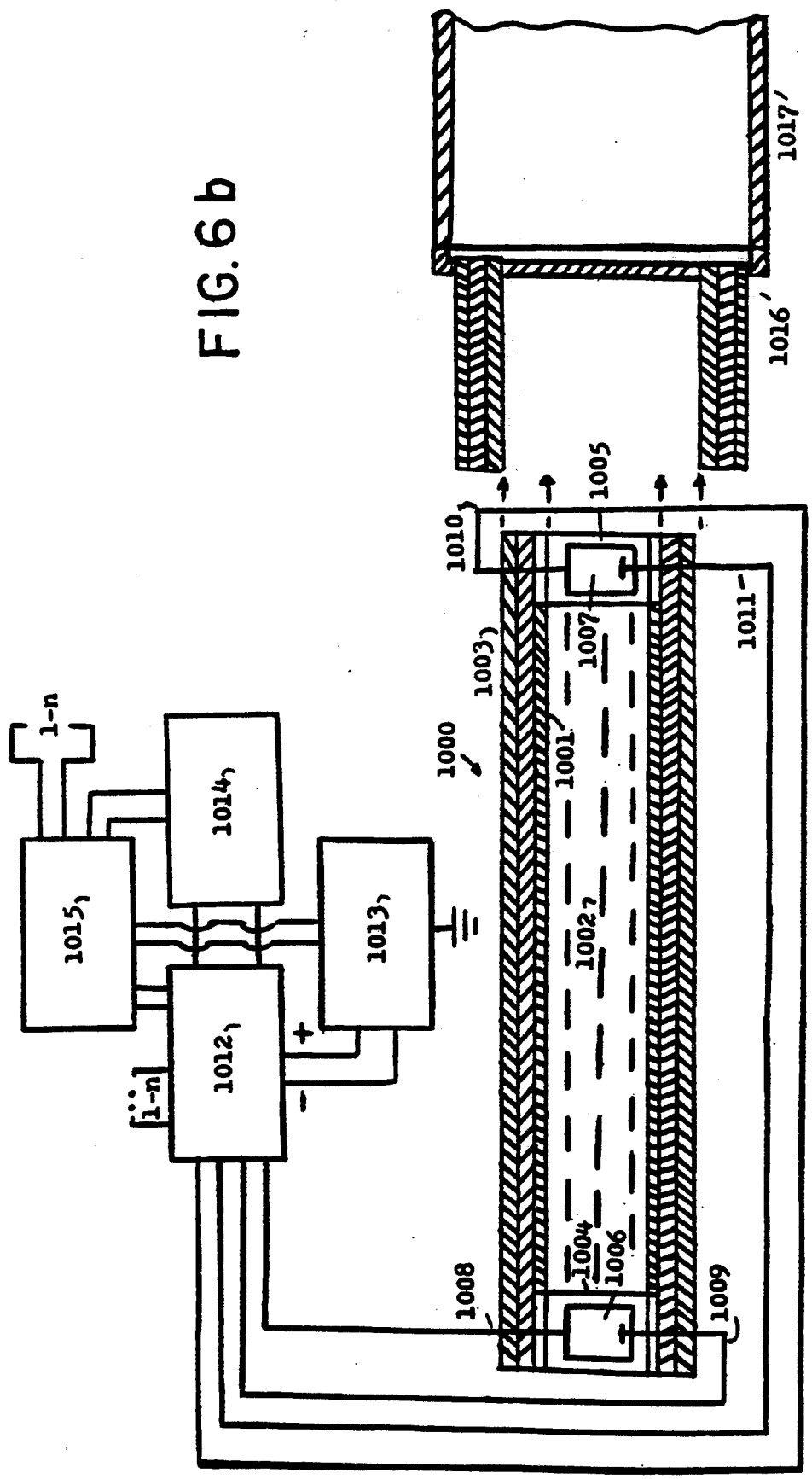
Figure 6:
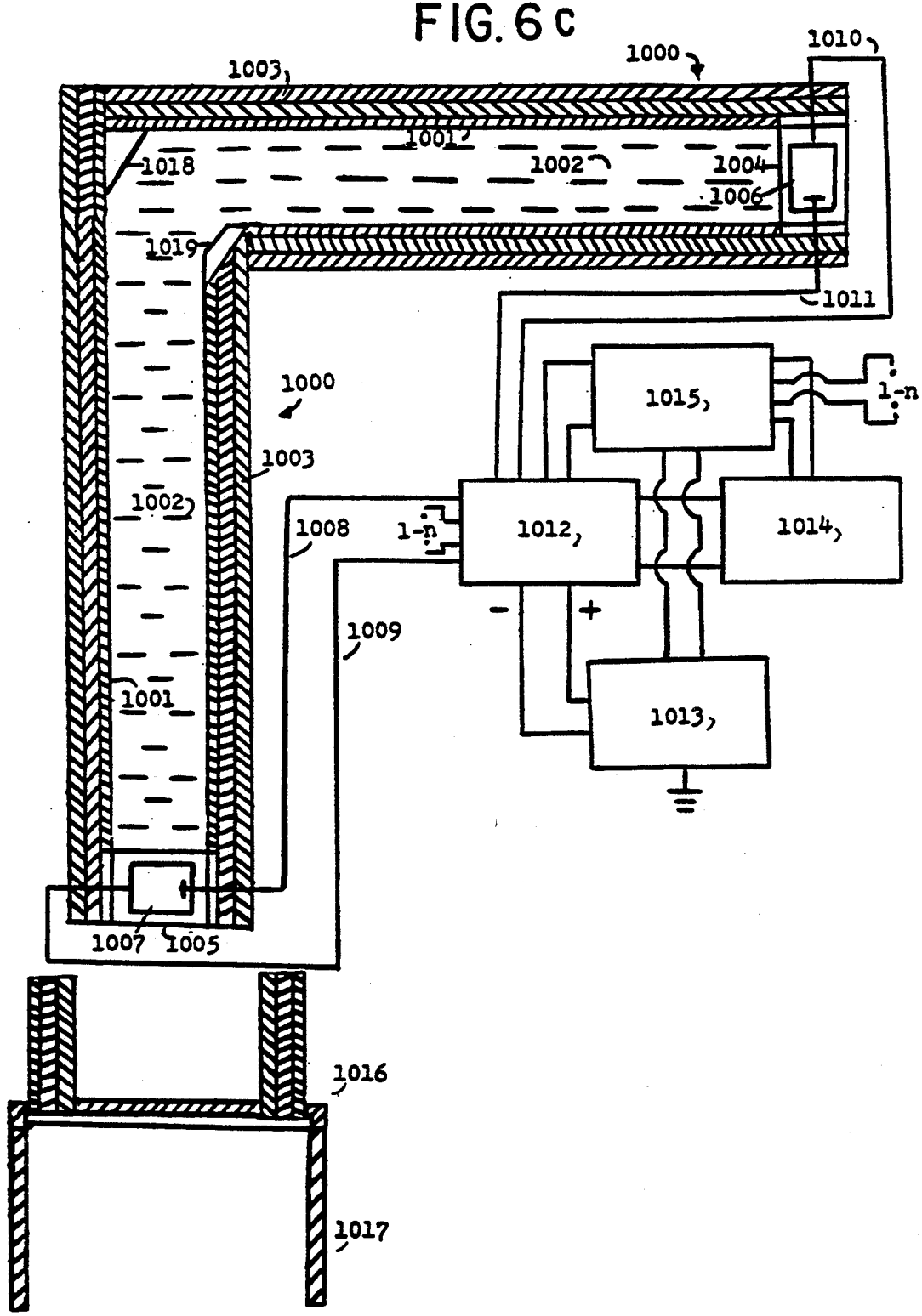

FIG. 6b discloses a single linear cell or channel which forms in part a linear array of equivalent channels embodied within a single multi-channel Kerr cell element. Numerals 1000, 1001 and 1002 describe single channel, the reflective coating of said channel and the dye embodied within said channel to alter the wavelength, optical characteristics and other parameters of light illuminated said channel from a laser source. Numeral 1003 of FIG. 6b denotes an area encapsulating said channels where an optical opaque medium such as, black indigo is applied to coat said channels and such opaque mediums are obtained from commerically available-sources. Numerals 1004, 1005 discloses the lense elements embodying a transparent capsule containing an optically active agent or medium such as nitrobenzene, or another suitable optically active medium which can be used as a switching element. Numerals 1006, 1007 represent the present of said optically active medium, whereas numerals 1008 through 1011 designate four separate and distinct microelectrode elements. Each pair of said microelectrodes acting as a cathode and anode elements when current is applied to said elements 1008 through 1011. Alter the optical emissivity of said optically active mediums 1006, 1007, allowing said mediums to act as optical switching elements.

Said microelectrode elements input collectively into sequencer element 1012 which acts as a sequencer for inputs 1—n equivalent lense elements embodied within a single multi cell-Kerr unit. Said sequencer element 1012 determines which lense elements are to receive current and element 1012 is coupled to power source 1013 and timer unit 1014. Timer unit 1014 controls the duration each said lense containing one optically active medium is to be actuated. Sequencer 1012, timer 1014 and power source 1013 are coupled to CPU means 1015 which provides command signals to all the aforementioned elements embodied within said Kerr elements and all components embodied within all equivalent Kerr elements and ancillary systems embodied within the device. Numerals 1016, 1017 disclose an optical coupler element and fiber optics element. More than one channel may input on said optical coupler element. Element 1016 and said fiber optics element may consist of more than one or a bundle of smaller fiber optics elements. The ends of said lense element and fiber optics are polished by techniques well understood and practiced by those skilled in the art of fiber optics.

FIG. 6c is equivalent to FIG. 6b. All elements 1000 through 1017 of FIG. 6c correspond to elements 1000 to 1017 of FIG. 6b. Elements 1018, 1019 correspond to reflective mirrored surfaces wherein said channel bends at a angle exceeding 45 degrees to the inital point relative to laser light initially illuminating said channel element. The aforesaid channels are coated both with a reflective coating facing in the interior and in contact to said dye medium preceded by an opaque coating, as disclosed in FIGS. 6b, 6c, respectively.

FIG. 6d entails a partial angular perspective of several exiting fiber optic elements coupled to a portion of a single holographic plate. FIG. 6d shows that there are at-least three lense elements containing optically active medium which interfaces with each optical coupler element attached to or coupled with each said exiting fiber optics means. There may be fewer than three said lense elements or more than three said lense elements that interface with each said coupler element of each said exiting fiber optics element. Said exiting fiber optics elements may be composed of a single large diameter fiber or a bundle of equivalent fiber optics elements, each having a preferrred diameter of 100 microns. The ends of said exiting fibers and said lense elements forming the fiber terminal elements of each said channel element of each said multi-cell Kerr element are polished by methods well known and practiced by those skilled in the art of making fiber optics elements and the said optical coupler means like said fiber optics elements are commerically from a variety of manufactures. Numerals 1020, 1021 and 1022 of FIG. 6d designate three separate and distinct terminal lense elements from three separate and distinct channels embodied within a single multi-cell Kerr element. Numeral 1023 denotes a single coupler element which interfaces with exiting fiber optics element 1024. Numerals 1025 through 1028 of the exiting fiber optics element 1029 are equivalent to numerals 1020 through 1023 of exiting fiber optics element 1024. Said fiber optics element, number 1025 has a polished rounded lense which optimally magnifies emissive light by a factor of four and disperses said light 180 degrees when coupled to epoxylated medium, described by 1030, which serves to diffuse and disperse said emissive light transmitted from an array of equivalent exiting fiber optics elements, not shown in said figure. Elements 1031, 1032 describe a reflection and corresponding portion of a transmission type of holographic emulsion and as indicated earlier there are at least three thin film emulsions of the transmission type and at-least three thin film emulsions of the reflection type of holograms which form a single holographic plate. There are 1—n thin film holographic emulsions to form 1—n holographic plates. Said thin film emulsions must be thick enough to contain the interference patterns necessary to generate holographic images, yet be thin enough to allow said images generated from the bottom most peripheral thin film emulsion to pass through other equivalent thin film emulsions, to be viewed by the user. The said thin film emulsions, said epoxylated medium and the aforesaid terminal lense elements of said exiting fiber optics elements are so constructed as to provide a reference beam and incident beam necessary to illuminate said holographic emulsions and recreate conditions necessary to produce a holographic image from said thin film emulsion. The recreation of holographic images from said thin film emulsions are consistant with current holographic technology and readily understood by those skilled in the art. The optiumum angle of 45 degrees relative to each said exiting fiber optics element to said epoxylated medium interdisposed between alternating equivalent reflective and transmission holographic plates disperses sending waves of illuminating light to produce said reference and incident beams to recreate said holographic images. Fiber optics elements direct and in some cases transduces laser light, the polished ends of said fibers focus and disperses said light and the aforesaid expolyated medium coupled to said thin film emulsions serve to create reference and incident beams necessary to recreate conditions needed to produce said holographic images in a much smaller condensed volume than needed by lenses, filters and beam splitters needed to provide said reference and said incident beams in larger structures. The phenomenon of cross-talk interference is eliminated by illuminating only one single said thin film emulsion to the exclusion of all other said thin film emulsions by determining which channels are illuminated on each multi-cell Kerr element. The number, sequence and duration of channels which are illuminated correspond to those systems previously described to be actuated by command signals from said CPU. Said exiting fiber optics elements emit emissions which illuminate separate and distinct holographic regions to produce specific holographic images embodied within interference pattern contained therein, to the exclusion of other said holographic regions embodied within other separate and distinct holographic thin film emulsions. The duration number and sequence of each said channel is illuminated determines the duration, number and sequence of said exiting fiber optics illuminated which specifies the duration, number and sequence of said holographic thin film emulsions illuminated to project the holographic images contained therein. Since only specified holographic regions are illuminated per a specified interval of time cross-talk or the subsequent illumination of unspecified interference patterns of unspecified holographic regions producing unwanted holographic images along with said specified holographic images is virtually eliminated from the holographic presentation of specified images. The aforesaid LCD/LED thin film screens are in fact optically visible through said holographic plates and said holographics are optically transparent to one another, such that images generated by any one element can pass readily through another said element. The relative dimensions and structural configuration disclosed in the specification should not be construed as to provide a limit in size or a limit in the design of said IVS or Device and/or component systems embodied within said device.

Figure 7:
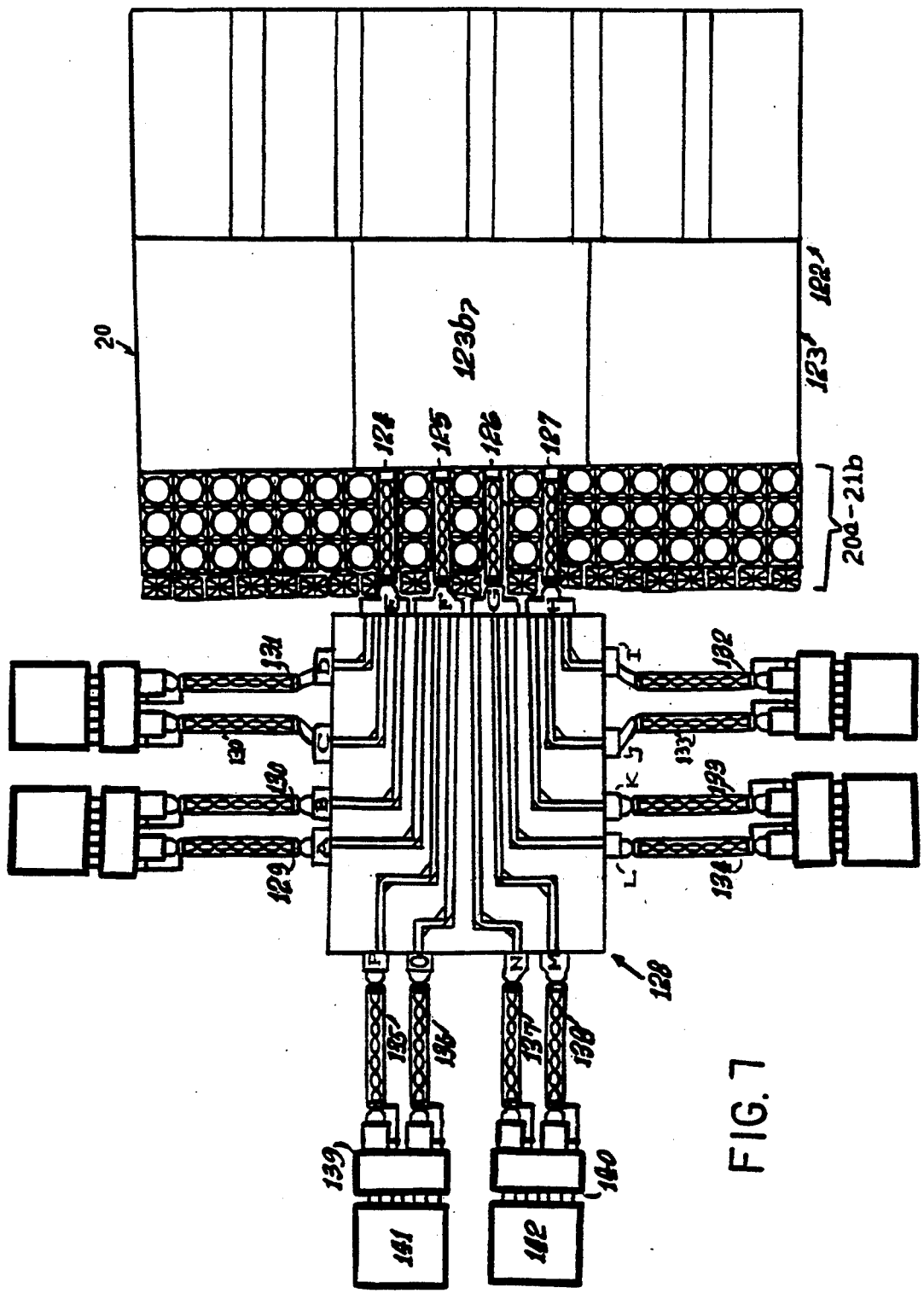
FIGS. 7, 7a and 7b describe in detail the relationships between said Kerr elements, fiber optics elements, automated beam spitters, lasers, dye lasers and the holographic emulsions forming holographic plates.

FIG. 7 is a concise pictorial description of a multi-cell Kerr unit coupled to a portion of a single holographic emulsion. Said holographic emulsion is described by numeral 123 and holographic emulsions 1—n are interdisposed inbetween LED/LCD image generating units 20a-21b and a compound sheet of frensel lens collectively by element 122. Numerals 124 through 127 designate fiber optic exiting elements, which conduct laser light to a single segment, 123b, of holographic emulsion unit 123. Fiber optics input element 129 through 138 conduct laser light from laser sources. Said light is emitted into channels embodied within said Kerr unit through terminal elements 129a through 132a. Lense elements A through P, described earlier in the specification contain nitrobenzene or some other suitable optical switching medium. Numbers 129 through 138 are assigned to fiber optics means deployed to conduct various electromagnetic emissions to the aforementioned control element 128. Numerals 139,140 disclose dye laser elements which provide multicolored coherent emissions to one or more optical elements. Numerals 141, 142 are assigned to optical encoder means associated with pulse frequency and pulse formation.

The holographic plates are intersected or innervated by an array of fiber optics elements. The array of fiber optics elements consists of a specified number of separate and distinct fiber optics elements, which conduct both the incident and the equivalent to reference laser beams to given specified portions or regions of the holographic plate. The number of fiber optics elements forming said fiber optics array and the number of holographic regions intersected varies directly with the information content of each plate. Each separate and distinct fiber optics element is permanently bonded or fused to an exact region of the holographic plate. The point of intersection between said fiber optics elements composing the aforementioned array of fiber optics elements are precisely positioned at the critical or optimum angle needed to maximize transillumination of holographic regions, composing or forming the entire given holographic plate. Transillumination of regions forming a given holographic plate element optimally occurs from the edge or side of said plate and perferably longitudinally, along the axes or plane angle of the aforementioned holographic plate elements. The implementation of a critical angle structure and design elements are needed to have laser beams collimated, directed, diffused and/or additionally processed in the absence of mirrors, prisms, or any other bulky or potentially unstable apparatus.

The reflection or diffraction grading thin film emulsions are additionally disposed adjacent to and in between the transmission holographic thin film emulsion plates. The reflection or diffraction grading thin film emulsion holographic elements are transparent to the transmission emulsion elements and have the additional advantage of being able to display information in strong light approaching ten thousand candles. The operation and use of reflection or diffraction grading holographs is well known and practiced by those skilled in the arts however the structure and application of diffraction grading holographic thin film emulsions embodied within the invention is not known or believed to be embodied in the existing art or approached by other inventions in the field. The critical viewing angle by which said diffraction gradients are accessed by the user is conducted within the contexts of a sensor based feedback loop incorporating a piezoelectric source vibration unit. The piezoelectric crystal element sets the optimum level of sympathetic vibrations necessary to allow the separate diffraction grading thin film emulsion holographic plates to alternately oscillate into and then out of the planes forming the said critical angle ,in a specific manner, as to present different information sequentially to the user or others in the immediate vicinity of the user. The operation of the sensor feedback based piezoelectric source vibration unit can be readily understood by those skilled in the art and is briefly disclosed collectively throughout the specification. Additional information discussing the operation of sensor based feedback loop are discussed in detail in FIGS. 34, 35 and 36 of the disclosure. The power source is conventional consisting of 5V, 250 ma obtained from modified commercially available watch batteries wired in series coupled to a blocking diode, electo-mechanical transducer element and an automatic shutoff element to deactivate the device when not in use. The power source and ancillary systems are readily understood by those skilled in the art and will not be discussed in any detail. It is to be assumed that all system embodied within the device are electrically powered even though said source is not explicitly shown.

The aforementioned multi-cell. Kerr element embodies a plurality of separate and distinct cells or channels containing organic dyes or other substances to moderate or alter the wavelengths of light entering said channels from a laser source. Each said channel terminating in lense elements, each said lense element being filled with an electro-optically active material such as nitrobenzene and said lense elements being coupled to separate and distinct fiber-optics elements. Said electro-optically active material provide an optical switching means for laser light conveyed to and from light input and light output ports. Said optically active materials operate in a conventional manner in regarding a charge applied to said material and optical emissivity to light generated from laser sources. Said channels, lense elements and fiber-optics element are electro-optically isolated from everyother equivalent element. Electro-optically isolated elements are those elements which are isolated from one another by reflective or opaque coatings of non-conducting material, well known by those skilled in the art. Said multi-cell Kerr elements are assembled in a linear array along the perimeter of said holographic plates and are constructed of commerically available materials including but not limited to non-conducting glass substrate, expoxylated plastics and other suitable substances. Said multi-cell Kerr elements, electronic circuits and ancillary systems are processed by commerically available techniques, including but not limited to photolithography, chemical etching, laser cuttery and other methods. Channels or cells can be cut in glass substrate by HF+ acid applied to exposed regions, while masking the rest of said glass substrate by wax, paraffin, on plastic, then encapsulating organic dyes or other substances by epoxy or epoxylated glass. Other substances using substrates can be prepared in a similar manner as described in the previous sentence except different etching chemicals of preparations are used on different substrates. The conducting portions of said circuit can be produced by photolithography, laser, soldering, particle beam bombardment, or other methods well known by those skilled in the art.

Figure 7A:
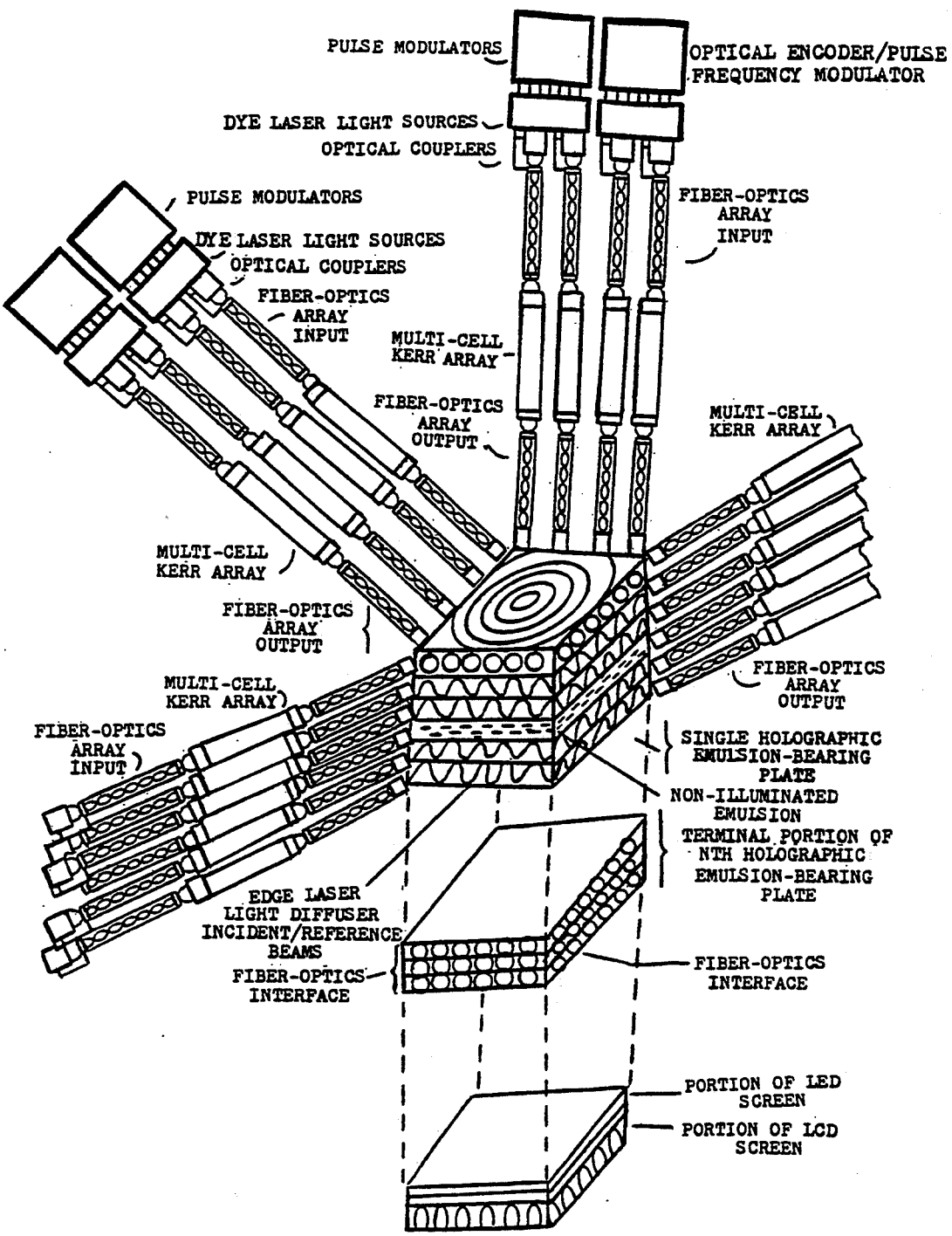

FIG. 7a is an angular perspective and partially sectioned view of the holographic display element relative to the fiber-optics element, Kerr cell elements, laser sources and other structures concerned with producing visual images. Each holographic plate consists of at-least three thin film holographic emulsions of a transparent type and at-least three equivalent thin film reflection type of holograms interdisposed inbetween said transmission type of emulsions. The use of reflection and transmission type of holographic emulsions have been described earlier in the specification. Said thin film emulsions 1—n form holographic plates 1—n. Holographic plates 1—n are interdisposed inbetween one another and are immediately preceded by an LCD screen element coupled to an LED screen element. Said transmission holographic emulsion plates and LED elements are readily perceived by the user under conditions of low or dim ambient lighting; whereas reflective holographic emulsions and images generated by said LCD are readily perceived by the user under ambient light exceeding 1,000 candles. The position of said reflection and transmission holographic emulsions and the angles of laser light incidenting through epoxylated holographic mediums act to diffuse said laser light to create both reference and incident beams in image construction in a manner consistant with current techniques of holography. In FIG. 7a the diffuse laser light is expressed as larger traveling waves when said waves enter the aforesaid emulsions; whereas said laser light maintains a more intense, compact wave form prior to exiting fiber-optic elements, as disclosed in FIG. 7a. Each said fiber-optic element is polished at each end forming a lense element, as indicated in FIG. 7a and FIGS. 6, 6a, Said lens is the rectangular or conical nodular structure at the terminal of said fiber-optic elements. Each said fiber-optic element terminates at its specific fiber-optics interface region of each said thin film holographic emulsion element, as disclosed in FIG. 7a. All structures embodied within FIG. 7a are clearly labeled and correspond to equivalent numbered structures in the preceding FIGS. 6, 6a, as disclosed earlier in the specification.

Figure 7B:
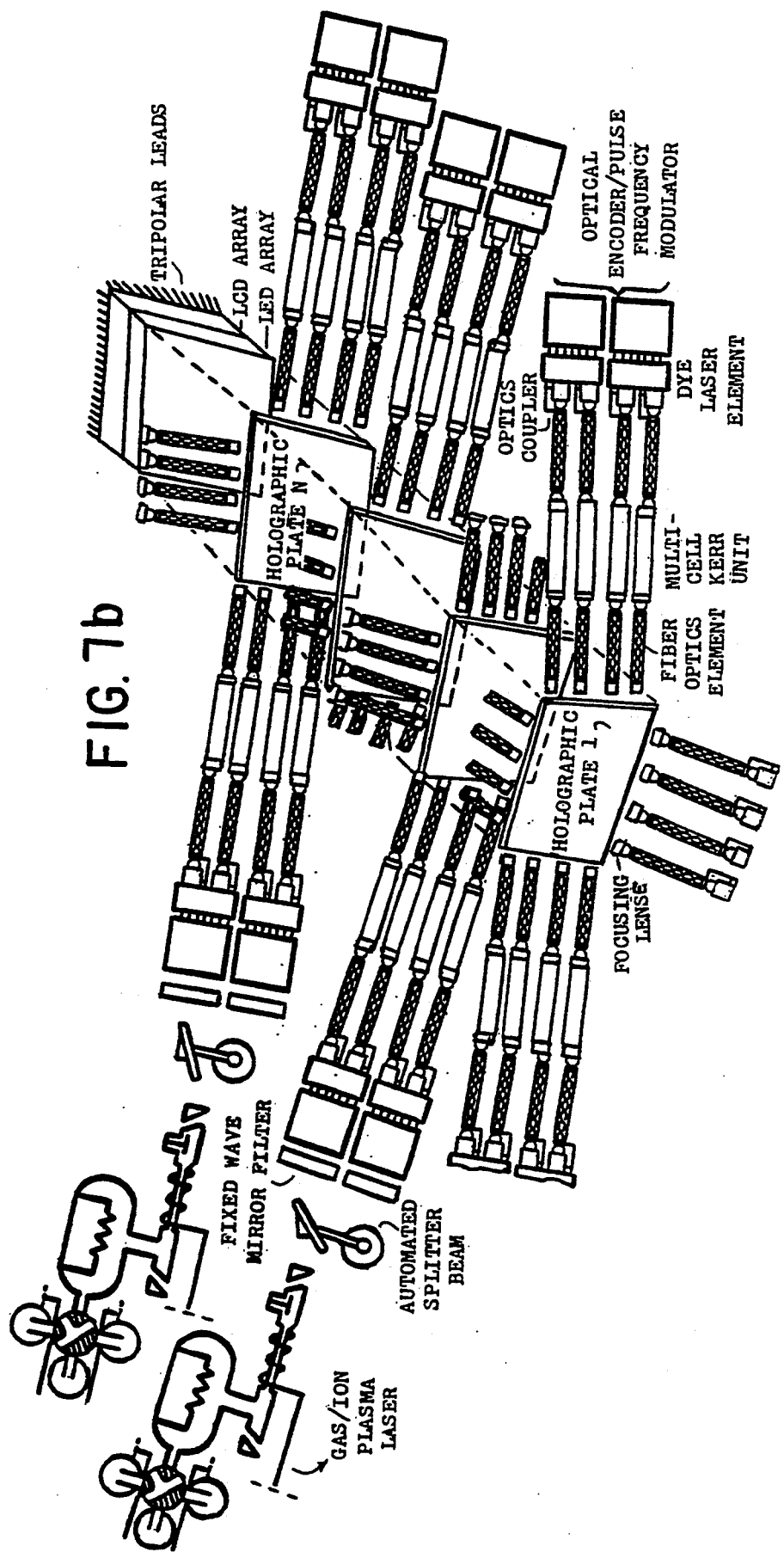

FIG. 7b is a concise pictorial angular perspective of the holographic assembly. All necessary component systems are clearly labeled eliminating the need to use numbers. Thin film holographic plates 1—n are shown coupled to a rectangular array of fiber optic elements. Said fiber optic elements are interdisposed between said plates embedded in an emulsion which disperses light, described previously, adjacent to an array of fiber optic elements. Said fiber optic elements are continuous with optical coupler elements which are interdisposed between said fiber optic and automated beam splitter units. Said splitter means are interdisposed in between said optical couplier elements and one of at least three laser source generators. Laser light conducted by fiber optic elements are dispersed by said emulsion and ancillary systems to provide standing waves, which produce both reference and incident beams sufficient to illuminate said holographic plates in order to produce holographic images. Said holographic plates consist of at least three thin film emulsions of a transmission type and at least three holograms of a reflection type emulsion with a minimum thickness of 30 to 45 microns each or a thickness exceeding 100 microns. Said holographic plates are individual holograms thick enough to embody diffraction patterns which when illuminated from the edges by laser light can generate holographic images, yet thin enough to be transparent to each adjacent overlapping hologram and transparent enough to allow images generated by the LED/LCD unit to be visible to said user. Optical switch of the multi-cell Kerr units determine which holograms are to be illuminated, what colors are to be generated and the duration of illumination, as described earlier in the specification. The intensity of illumination, pulse modulation, wavelength and frequency of laser light is determined by controller elements which operate upon the automated beam splitter elements and laser source generators. Said controller elements act upon commands from the CPU, not shown but discussed in detail later on in the specification.

Each holographic emulsion is illuminated by at-least ninety six fiber optics elements conducting light from at-least two hundred and eighty eight separate and distinct input channels which are embodied within at-least twenty four separate and distinct multi-cell Kerr elements. The duration, order, number and sequence said emulsions are illuminated is under the control of the CPU element, which conveys commands to controller elements, which execute said commands. Electrical and optical output. incluolfactory and gustatory outputs are controlled by said CPU. The CPU referred to is the master CPU, which conveys command impulses to at least four slave CPU's, which controls optical processing visual imaging, the generation of acoustic emissions, the dispersal of scents and carrier mediated volatiles effecting olfactory and gustatory centers within the user, Each slave CPU issues instructions to controller, sequencer pulse shaping circuits timer element and other systems which execute said instructions by activating or deactivating electro-optical switching elements, induction coils and other structures: embodied within said invention.

Figure 7C:
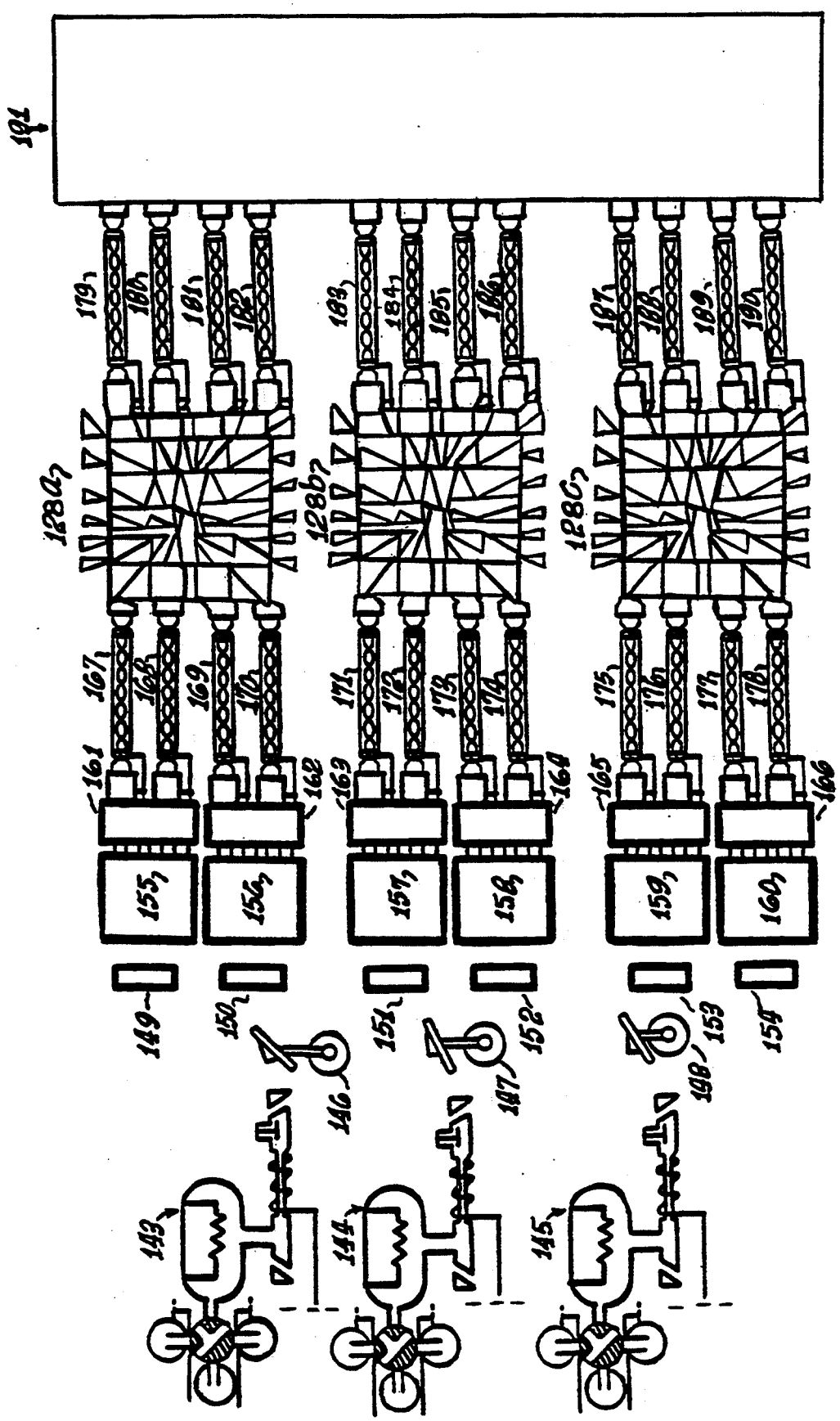
FIG. 7c is a schematic illustration in part of the plasma laser generator means, dye cell cavity and electro-optical elements feeding into a portion of a thin film emulsion plates.

FIG. 7c is a schematic illustration in part of the plasma laser generator means, dye cell cavity and electro-optical elements feeding into a portion of a thin film emulsion plate. Numbers 143, 144 and 145 corresponds to three equivalent miniature rechargable plasma ion lasers which form part of a laser complex. Numerals 146, 147 and 148 define three equivalent automated beam splitter means utilized to direct beams and for wavelength selection. Elements 149 through 154 are ascribed to fixed mirror filters to alter wavelength emissions. Numerals 155 through 160 represent pulse shaping and pulse frequency elements. Units 161 through 166 represent separate and distinct dye cell elements. The fiber optics means described by values 167 through 178 define input elements, whereas fiber optical elements 179 through 190 designate output elements. Numeral 191 depicts a partial array of thin film holographic emulsions. Numerals 128a through 128c of FIG. 7c are assigned to an array of Kerr cell control elements.

FIG. 8 illustrates in block diagram fashion a simple plasma laser generator means and associated ancillary systems. Numerals 192. 193 and 194 of FIG. 8 denote the laser resonant cavity, the fracture resistant quartz plasma containment jacket and discharge vessel. Numerals 195, 196 and 197 represent a totally reflective prismatic mirror, a selectively emissive automated mirror and the control circuit for the same said automated mirror means. Elements 198, 199 and 200 designates an automated inlet valve or governor means for controlling the flow of plasma during the recharging cycle, a plasma reservoir containing suitable lasing medium under pressure and a controller element utilized to regulate the release of the lasing medium and its pressure within the plasma jacket. Numerals 201, 202 and 203 are delegated to a radiofrequency element to provide additional excitation for enhanced lasing and ancillary circuitry concerned with pulse shaping formation. Units 204, 205 and 206 are assigned to the filament supply, timing circuits and power supply, respectively. Element 207 signifies a SCR means.

FIG. 9 is a simplified electrical schematic of a single plasma laser source generator unit. Numerals 208, 209 and 210, 211 of FIG. 9 designate the plasma ion laser generator, a valvular control governor, solenoid gas pressure valve and radio-frequency excitor means. Number 212 is collectively assigned a light emitting sensor complex utilized to detect and respond to the concentration of gaseous plasma contained in a given reservoir. Elements 213, 214 define an automated control mechanism governing the release of gas plasma from the reservoir and a manual release switch gasifier. The central control microprocessor 215 is utilized for timing of electrical impulses, sequencing of electrical impulses and delivery or distribution of impulses to various points of Junctures. Heat exchanger means are utilized to conduct thermal energy away from circuits, inductive elements the like and are designated by values 216 to 220, inclusive. Numerals 221 through 225 are assigned to inductive elements taken in series. The resistive elements of the circuit are defined by numerals 226 to 239, whereas the capacitance elements are defined by elements 240 through 249. The diode elements of the circuit diagram are indicated by numerals 250 to 264. Numerals 265, 266, 267, 268 and 269 designate switching elements for the standby and operative modes, inclusive. Numerals 270, 271 and 272 define a fuse element and two guardian elements utilized to protect or assist the circuit. Elements 273, 274 and 275 are assigned to a transformer means, a power source and ground means.

FIG. 10 is a concise simplified electrical schematic in part of a pulse shaping circuit associated with a given laser source generator. Elements 276, 277 and 278, 279 of FIG. 10 define a given plasma ion laser source generator, automated mirror element, microprocessor pulse sequencer means and ancillary circuit means. Numerals 280, 281 282 and 283 define four separate and distinct pulse generating and shaping circuits. Numeral 280 is assigned collectively to a precision squarer Circuit. Circuit 281 generates trangular waves whereas numeral 282 generates both waves of a sine and cosine nature. Circuit 283 generates ramp waves and is associated with a pulse generator means defined by numeral 284. The frequency of any given signal wave type can be doubled, triple or inverted by the circuit described by numbers 285 and 286. Elements 287 through 291 describe integrator means that have differential inputs and outputs. Transistive/resistive elements o are assigned collectively by numerals 292, 293, respectively. The operative framework of the capacitance, diode, resistive and ground elements are straight forward to one skilled in the art and therefore not numbered for the sake of simplicity.

Figure 11:
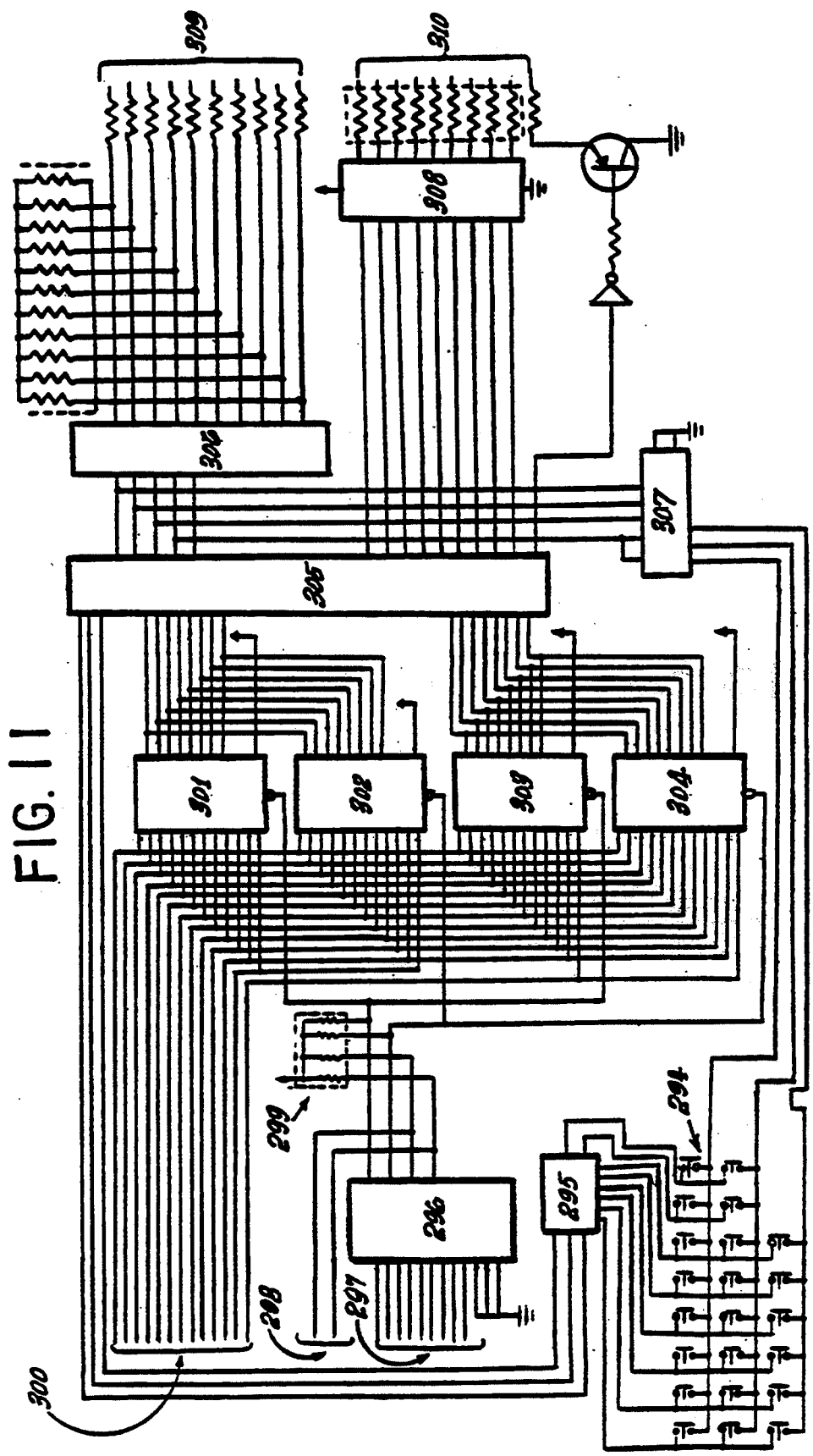
FIG. 11 defines a simplified electrical schematic designating a portion of the circuitry involved in keying the interactive video, holographic, acoustical elements and the like associated with the devices operations.

FIG. 11 defines a simplified electrical schematic designating a portion of the circuitry involved in keying the interactive video, holographic, acoustic elements and the like systems associated with the devices operation. Numerals 294 of FIG. 11 is collectively assigned to manual keying elements which are manipulated by the user to insert, recall or modify data. All signals retrieved from duel or tri-function keying elements are essentually processed by a signal digitizer and encoder means defined by element 295. Numerals 296 designates a signal encoder/processing means to relay data derived from a mouse or Joy stick mechanism and or a light wand means. Numbers 297, 298 and 299 are points of entry for data generated by interactive systems such as an electro optical video, a mechanical mouse means and supplemental Joy stick unit. The entry and exit point defined by value 300 corresponds to circuitry concerned with voice recognition and synthesis. Integrated circuits 301, 302, 303 and 304 act as comparators and interrogators for LSI circuit 305. Other integrated circuits 306, 307 and 308 serve higher order functions and additional data signals are exchanged at points 309, 310. Resistive element, grounds and the like are straight forward and are unnumbered for the sake of simplicity.

Figure 12:
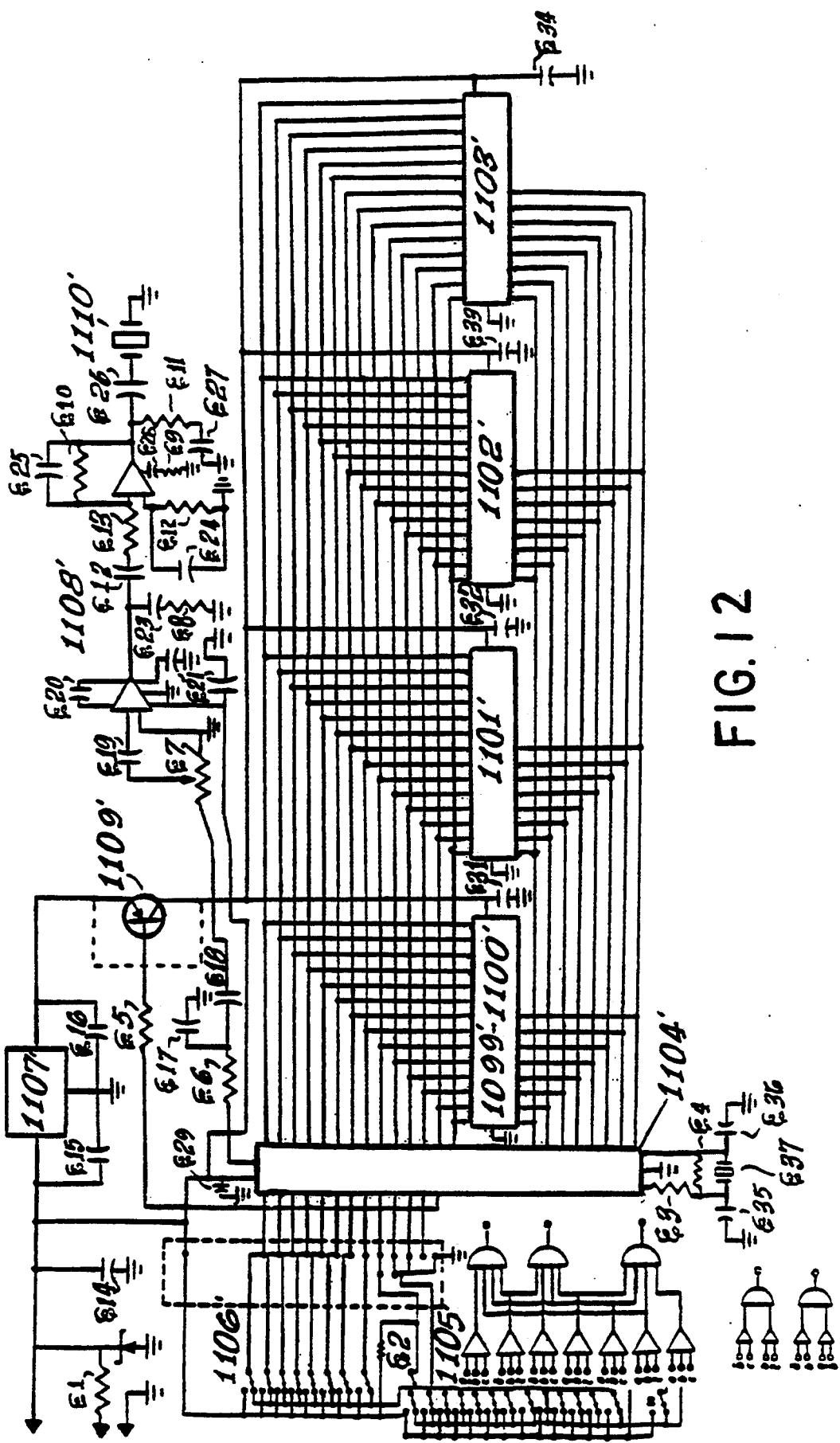
FIG. 12 describes in part the electronic disposition of the circuitry involved in each speech synthesis.

FIG. 12 describes in part the electronic disposition of the circuitry involved in the speech synthesis unit. FIG. 12 is representative of a basic schematic of a modified electronic speech synthesizer, which is typical of the type deployed in the (IVS) device. The extended vocabulary is in excess of 1,000 words, and more than 20 phrases which is as with preceding figures all components are commercially available by such manufactures as National Semiconductor and others. Numeral 1100 through 1102 depicts equivalent speech ROY Its, which contain relevant speech data, whereas the IC denoted by numeral 1103 represents the actual speech processor. An encoder signal digitizer and auto keying complex is described by numeral 1104 and the manual keying sequencer is indicated by numeral 1105. The systems resistor elements are denoted by alphanumeric values $\xi 1$ through $\xi 13$ and various capacitor Components are noted by $\xi 14$ through $\xi 36$. Numerals 1106, 1107 and 1108 describe a typical voltage regulator IC and two audio amp IC chips. Numeral 1109 denotes a typical transistor element. $\xi 37$ denotes a crystal oscillator, whereas numeral 1110 describes a piezoelectric wafer which is utilized as a speaker means.

Figure 13:
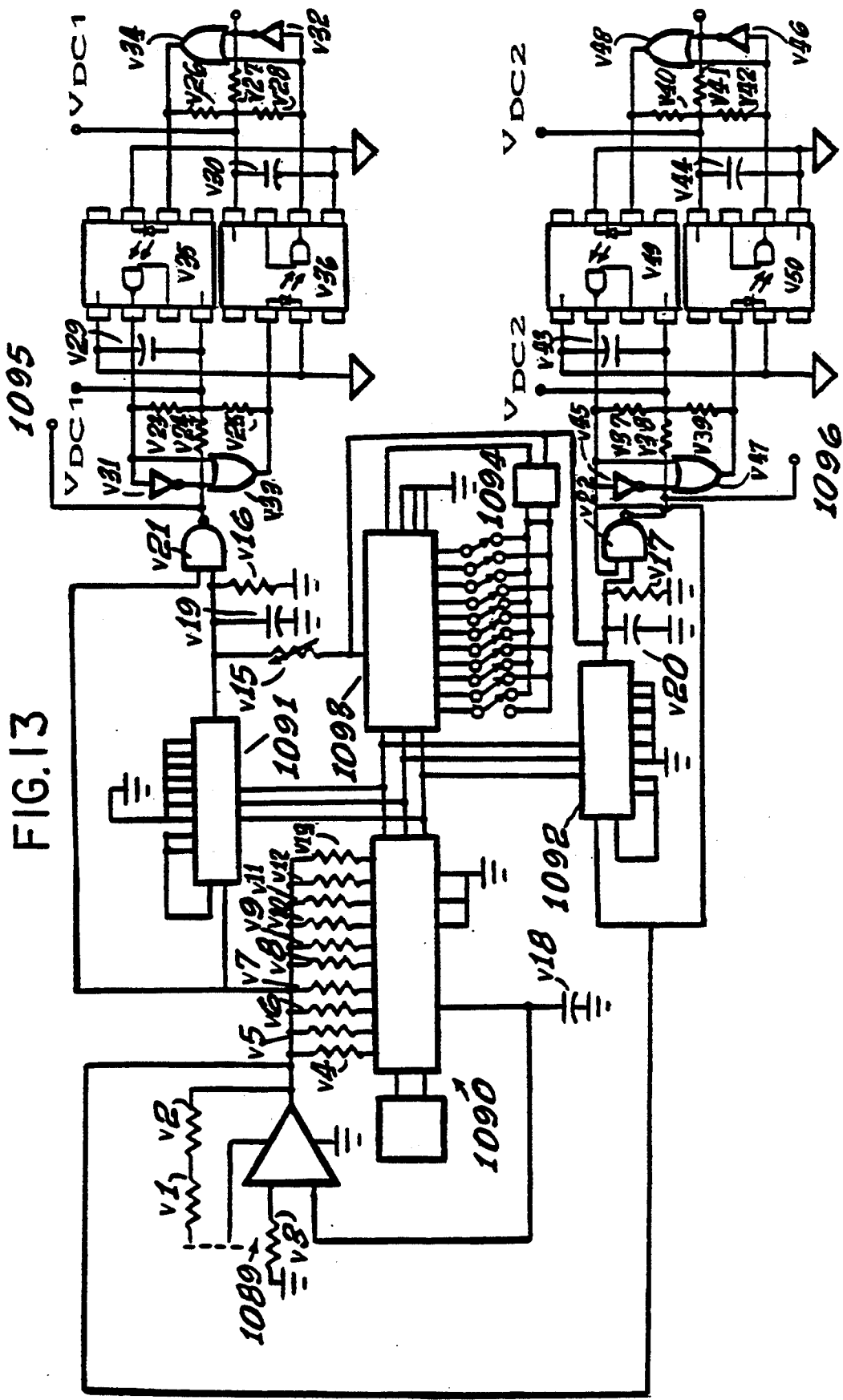
FIG. 13 describes in part the electronic disposition of the circuitry utilized to generate tones for manual keying, musical incantation and the likes.

FIG. 13 is a generalized schematic representation of a multiple tone generator typical of one of several deployed by the device. All component parts depicted in FIG. 13 are commerically available. Numeral designations of the tone generating system proper are as follows, a basic voltage regulator or governor is indicated by numeral 1089. An analog multiplexer is described by numeral 1090 and two binary counters which are indicated by numeral 1091 and 1092 respectively. The tone frequency generating IC is indicated by numeral 1093, which is adjacent to the key or switching elements, denoted by number 1094. The resistor elements are denoted by alphanumeric values V 1 through V 17 and the capacitors $\nu 18$, $\nu 19$ and $\nu 20$. The typical NAND (inverting AND) gate is denoted by $\nu 21$ and $\nu 22$. The frequency generated tone sequence can enter any one of four or all of the following systems denoted by numerals 1095 through 1098, which terminate in either a speaker system or equivalent piezoelectric means for audio sound to perceived by the user. Normal tonal sequences are conducted through lines 1095 and 1096; whereas alternate tone sequence or tonal sounds are provided by high speed duplex systems, if specified by either the user or the main computer via the keying means. Subsystems 1097 and 1098 are equivalent units. Numeral 1097 resistive elements are described by $\nu 23$ through $\nu 28$, whereas $\nu 29$ and $\nu 30$ denote the capacitance means. The invert means are defined by $\nu 31$ and ν32, whereas the logic or gate is designated by ν33 and ν34 respectively. The controlling IC s of 1097 are prescribed by ν35 and ν36. As mentioned earlier 1097 and 1098 are equivalent subsystems, therefore component ν23 through ν36 are equivalent to components ν37 through ν50.

Figure 14:
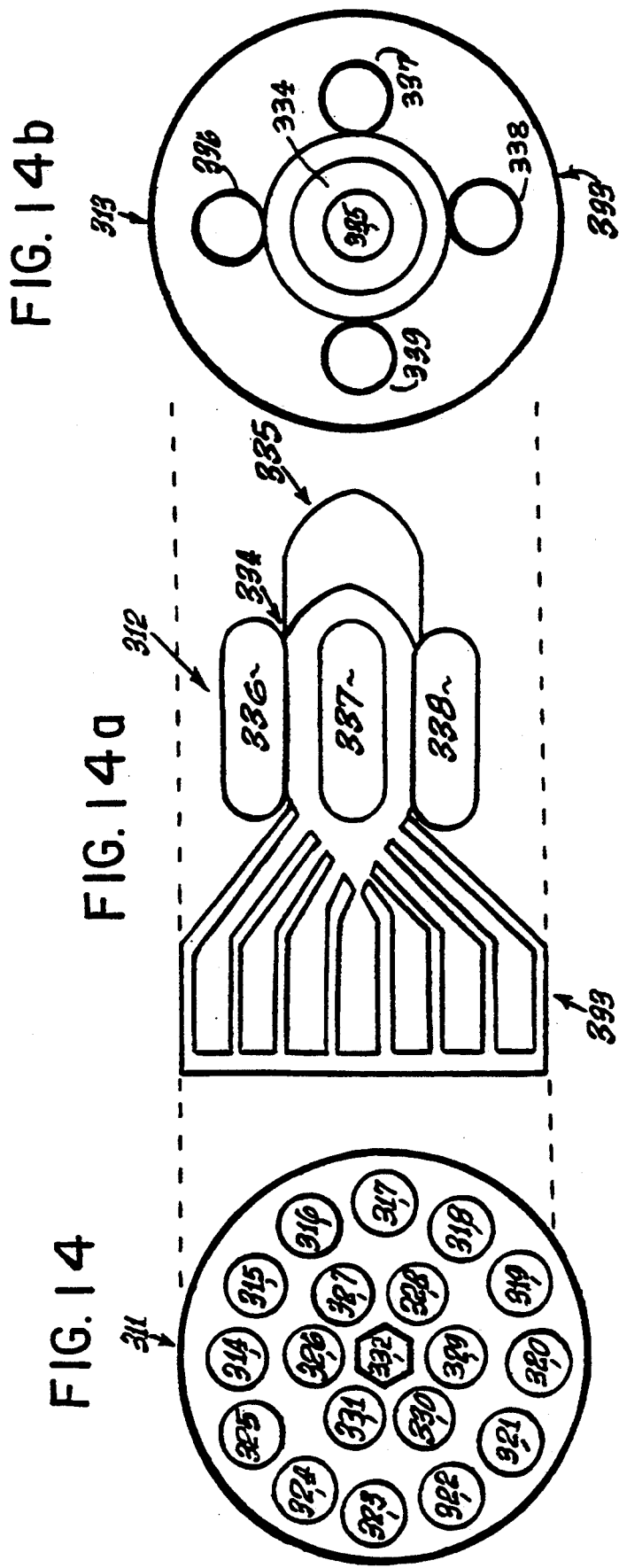
Figure 15:
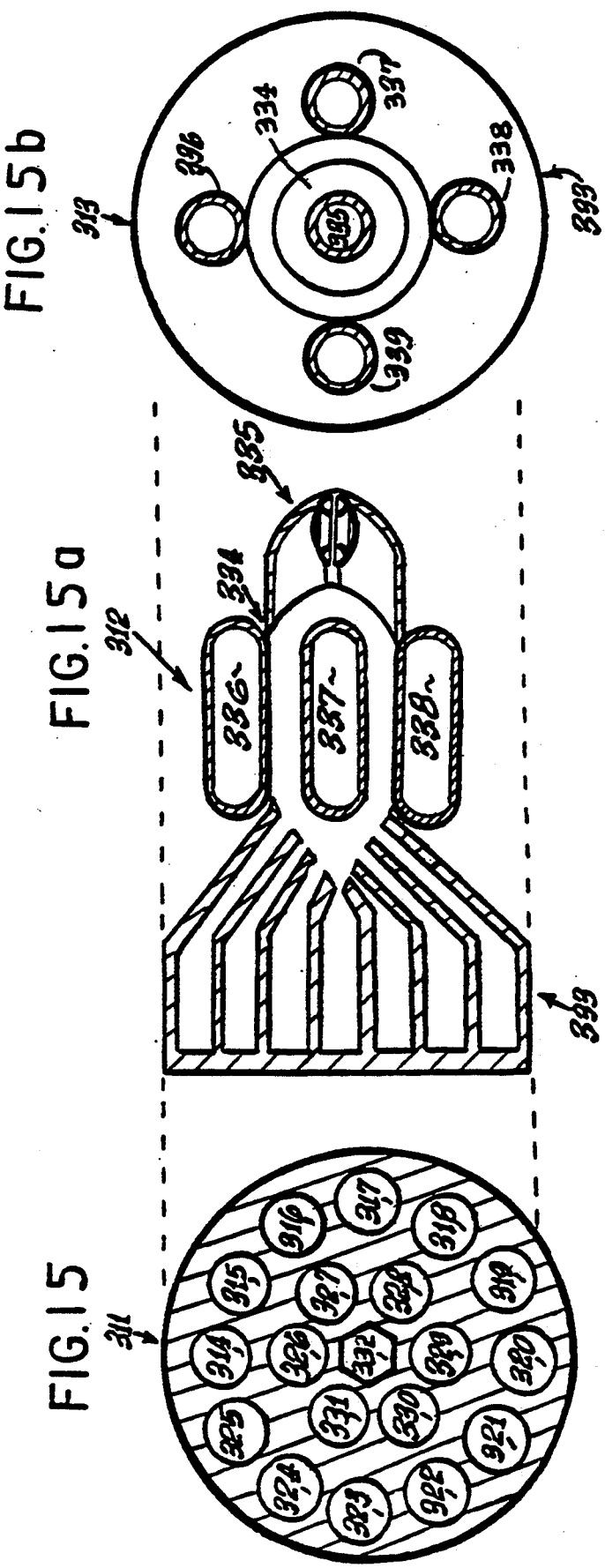

FIGS. 14, 14a and designate three perspective views of the olfactory emitter means. Numerals 311. 312 and 313 of said Figures define the aft section, a side elevation of the olfactory unit and forward perspective of the same said unit. Numerals 314 through 331 initially represents cylindrical enclosures wherein given scent wafers are volatilized in their respective chambers. A centrally located induction element number 332 supplies thermal energy to one or more specified chamber means as defined by numerals 314 through 331. The side elevation of the olfactory unit designates three separate and distinct subelements consisting of a structural casing means housing the volatilization chambers and induction, numeral 333, a central mixing chamber, numeral 334, wherein gaseous volatiles are mixed and a aerosol dispensor means defined by numeral 335. Three of four cylindrical containment units defined by elements 336. 337 and 338 house compressed atmospheric gases, water vapor and certain specified additives readying the dispersal agents as they exit from the central mixing chamber, 334 to the aerosol dispensor means, 335. The front view of the olfactory unit numeral 313, displays head on perspective of the central mixing chamber, 334, the aerosol dispersal means 335 and the entire complement cylindrical containment vessels are designated by units 336, 337, 338 and 339.

FIGS. 15 through 15*b* are sectioned views of the olfactory emitter means disclosed by FIGS. 14 to 14*b*. Numerals assigned to specific sectioned elements correspond to the very same said values designated in FIG. 14 through 14*b*.

FIGS. 16 to 16*b* are detailed pictorial representations of sectioned chambers housing volatilizable wafers, a radio-frequency means, thermal induction elements and other viable components. Volatilization wafers are emplaced in their sectioned volatilization chambers. Numerals 340 to 346 corresponds to volatilizable wafers each of which has superimposed over its central axis an imaginary dispersal radii, Sectioned elements 347 through 353 represents induction chambers from which the wafer undergoes vaporization. Each chamber means is caped and sealed with a suitable sinestered enclosure which allows the volatilized vapors to exit their respective chamber, Numeral 354 is typical of the sintered cap which seals each and every given chamber of the complement. The numeral 356 is assigned to a representative wafer means, whereas 352 to arbitrarily indicate height or length of the circumferential structure. Numbers 355, 357 disclose in brief miniature induction coils embodied within the chamber walls. A miniature radio-frequency element assists the volatilization process. Numerals 358, 359 denote portions of a primary radio-frequency emitter unit in coil format and elements 360, 361 are positive and negative current elements, respectively. Coolant channels 362, 363 conduct heat away from heat exchanger units 364, 365. Numbers 366, 367 discloses the outer containment case forming the housing in part of the radio-frequency unit.

*incorporated by reference U.S. Pat. No. 4,884,809

FIGS. 17, 17*a* and 17*b* are pictorial representations of a wafer element undergoing the process of volatilization. Eighteen individual wafers distinguished with separate orientation arrows are pictorially displayed in FIG. 17. FIG. 17*a* discloses three stages of primary dissociation prior to the volatilization process as defined by numerals 368, 369 and 370. FIG. 17*b* displays six stages of a single wafer undergoing electromagnetic field oscillation in a primary induction field. Numerals 371 through 376 describe in an illustrative manner as indicated by the clockwise and counter clockwise arrow which are displayed inconjunction with positive and negative dispersal signets and hatched regions.

FIGS. 18 through 18*b* are illustrations of the gustatory delivery means disclosing a side elevation, front and aft views. Numeral 377 is collectively assigned to the side elevation of the gustatory delivery means. Numbers 378, 379 and 380 designate three of eighteen loading receptacles for cartridges containing concentrated liqueurs of flavored substances, not shown here. Elements 381, 382 and 383 denote three of eighteen separate automated release mechanisms. Numerals 384, 385 and 386 represent three of eighteen separate and distinct release channels which conduct pressurized concentrates to mixing chamber 387, wherein more than one liqueurs are mixed. Spherical vessels 388, 389 and 390 contained aqueous dilution means, emulsifiers and additives. Numerals 391 describes an aerosol dispersal means which converts the supersaturated liqueur or fluid into a fine spray or mist. The fine spray or mist is focused into a directional beam by conduit 392. Numeral 393 is collectively assigned to the front section of the gustatory unit. Spherical units 388, 389, 390 and 394 refer to the full complement of the spherical vessels containing aqueous dilutants, additives and the like. The aerosol delivery means and conduit element are indicated by 391, 392 as previously indicated. Numeral 394 is assigned to define the aft section of the gustatory unit. Numerals 395 to 412 designate loading receptacles and discharge means contained in magazine 420.

FIGS. 19 through 19*b* designate three partially sectioned views of the mixing chamber, humidifier and aerosol dispersal means. All numeric values of said Figures exactly correspond to the sectioned elements of FIGS. 18 to 18*b*.

FIGS. 20 to 20*e* designate detailed sectioned views of the magazine, the cartridge loading means and a simplified electrical schematic of the solenoid release element. A single loading cartridge is indicated by numerals 413, 414 and 415 which describes the aft view, a side elevation and front view of the said cartridge. Numerals 416, 417 and 418 are assigned to a combination phillips hexogonal turn inset for turning the threaded orifice structure, numeral 418, into a given female receptacle. Each cartridge contains a given specified concentrate and is hermetically sealed by a non-reactive plug, numeral 417, and a soft seal gasket, number 419, to prevent leakage of contents once the seal is pierced. Numeral 420 is collectively assigned to a loading magazine which contains eighteen or more cartridges, one of which is left empty to reveal the receptacle structure, number 421 and female internal matching orifice. A partially sectioned view of the magazine, mixture chamber and the like is presented in a side elevation format designated collectively by a single value, numeral 422. Numerals 423, 424 and 425 are assigned to three of eighteen cylindrical cavities in which cartridges are inserted into. Cartridge 426 is equivalent to all other cartridges in respect to loading and unloading procedures. Essentially a clockwise turn of the cartridge, number 426 allows the male threaded terminus, number 427 into female threaded receptacle 428. The non-reactive seal, not shown is pierced by a fine bore pin, number 429, once the cartridges threaded portion 427, move far enough along the threaded extended receptacle or channel, number 428. Cartridges are simply replaced by turning them in a counter clockwise direction in order to disengage them from the holding receptacle structure. Three of eighteen automated solenoid release mechanisms utilized to control the flow of pressurized contents and their subsequent release are identified by the elements 430, 431 and 432. Three of eighteen separate channels are indicated by numerals 433, 434 and 435. The mixing chamber is defined by number 436. Multiples of three conduits taken at least six times are collective, united and forced through a single channel orifice in a precise manner to cause mixing by focused agitation as shown schematically by element 437. Three of the four spherical units containing additives, emulsifiers, distilled aqueous agents and the like are designated by elements 438, 439 and 440. The aerosol delivery means and conduit means are assigned values 441, 442, respectively. A brief schematical representation of the automated solenoid release mechanism is portrayed by numeral 443 which is collectively assigned to the concise circuit. Numerals 444, 445 and 446 designate the actual solenoid element, a plunger means and a passive return spring means. Elements 447, 448 and 449 describe a containment cylinder, an inlet juncture and exit Juncture, respectively. Elements 450, 451 and 452 describe a general amplifier unit with differential inputs and outputs, a central microprocessor means for sequencing of electrical impulses and circuits leading to electronic circuits utilized for timing of electronic impulses concerned with release intervals and associated processes. The transistive, resistive, diode and ground elements are defined by numerals 453, 454, 455 and 456.

FIGS. 21 through 21*d* disclose detailed sectioned views of the cartridge loading assembly and solenoid release mechanism. Numerals 457, 458 and 459 designate an enlarged portion of the cartridge means, a beveled sealant gasket and the threaded male portion of the cartridge. The threaded male portion of the cartridge, number 459 inserts into the female threaded orifice means 460, 461. A fine bore needle means, number 462 which pierces a seal, not shown, causes the cartridge to release its contents. The fine bored needle means, number 462 is fused to a juncture means indicated by numeral 463 which extends the fine bore through an exiting inlet channel, number 464. The contents of the cartridge, 457 flow from channel 464 to chamber 465. A plunger operated solenoid means numeral 466 controls the flow of content from chamber 465 to an exit tubule means as defined by element 467. The tubule means 467 is housed by the outlet juncture element, number 468. At the end of the plunger a cylindrical sealant means, number 469 moves either up or down in position to either release mobile fluid contents or to inhibit release therein by effectively blocking the inlet and outlet structures. The plunger means has a passive spring return element defined by numeral 470, which returns the plunger and sealant means, 466, 469 to a position conducive to blocking the discharge of the forementioned chambers contents. Both the plunger/sealant means, numbers 468, 469 and the spring element 470 are housed in the cylinder structure 471 in which they move. Cylindrical structure 471 is hermetically sealed at both ends with the spring structure being terminated at the bottom by a variable gasket means number 472 which is interdisposed between the spring element, number 470, and a secondary shell means defined by 473. A single numeric value 474 is assigned to a schematic portion of the channels, mixing chamber, dispensor means and the like unit. Proceding in linear fashion is a side view of one form of cartridge means illustrating the beveled gasket, threaded male portion and the like collectively defined by numeral 475. Numerals 476, 477 define a centrally located orifice structure defined by numeral 475. Numeral 476, 477 define a centrally located orifice structure defined by the threaded male portion of the catridge and a sealant. Numeral 477*a* of FIG. 21 is utilized to illustrate in a partial sectioned manner the operational union of a given cartridge and its respective receptacle.

Figure 22:
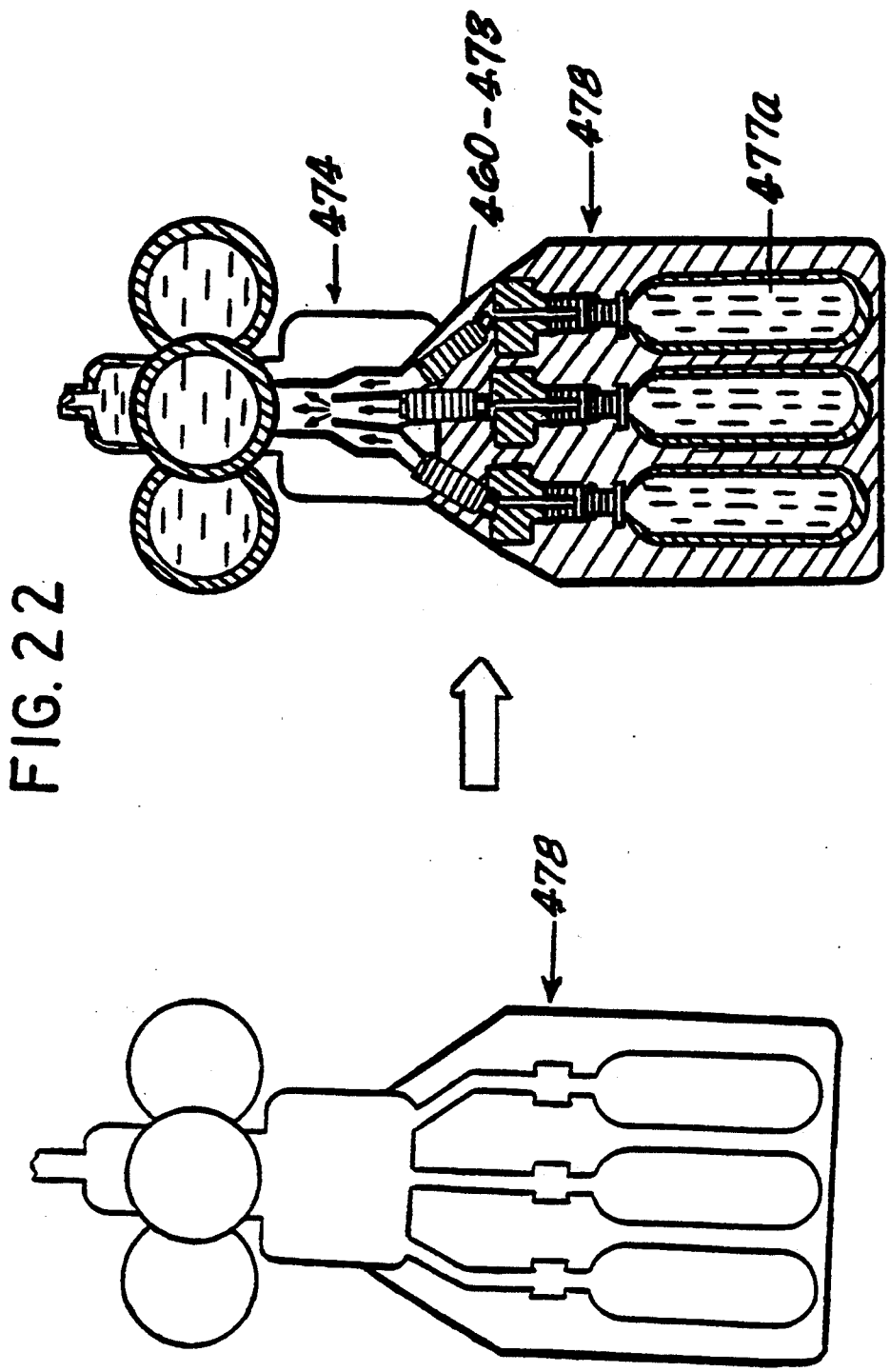

FIGS. 22 through 22*f* through are detailed sectioned views of the aerosol dispensor means utilized in the gustatory unit. Numerals 478, 479 refer collectively to the gustatory unit. Numeral 480 is assigned to one of two equivalent aerosol dispensor means. Numerals 481, 482, 483 refer to a primary mixing channel, a secondary mixing chamber and an automated aerosol aspirator. Numeral 484 describes a sectioned view of channel element 481. Numerals 485, 486 and 487 designate Primary inlet tubules which conduct additives, emulsifiers dilutants and the like to a centrally located mixing channel described by numeral 488. Numerals 489, 490 identify the inner-and outer casing elements for unit 481. Elements 491, 491*a* act as internal spacing units and are interdisposed between the inner and outer casing means, numbers 489, 490. Numeral 494 identifies the aerosol converter means, whereas numerals 492, 493 describe positive and negative conducting elements. Numerals 495, 496, 497 designate a discharge tubule a internal ionization grid utilized to disperse particles and a central discharge exit grid embedded into structure 483. Elements 498, 499 are portions of a non-conducting case 500 wherein elements 492, 493 are embedded; whereas numeral 500*a* defines an inner containment enclosure. Numerals 501 to 506 entails the full complement of porous or sinestered conducting tubules. Numerals 507 508 define in part unit 496 and once the grids are charged the aerosols are dispersed from the tubules are intermixed by internal heat convection and molecular agitation prior to dispersal. The mixture of aerosol suspended in chamber 509 are collectively defined by numeral 510.

Figure 23:
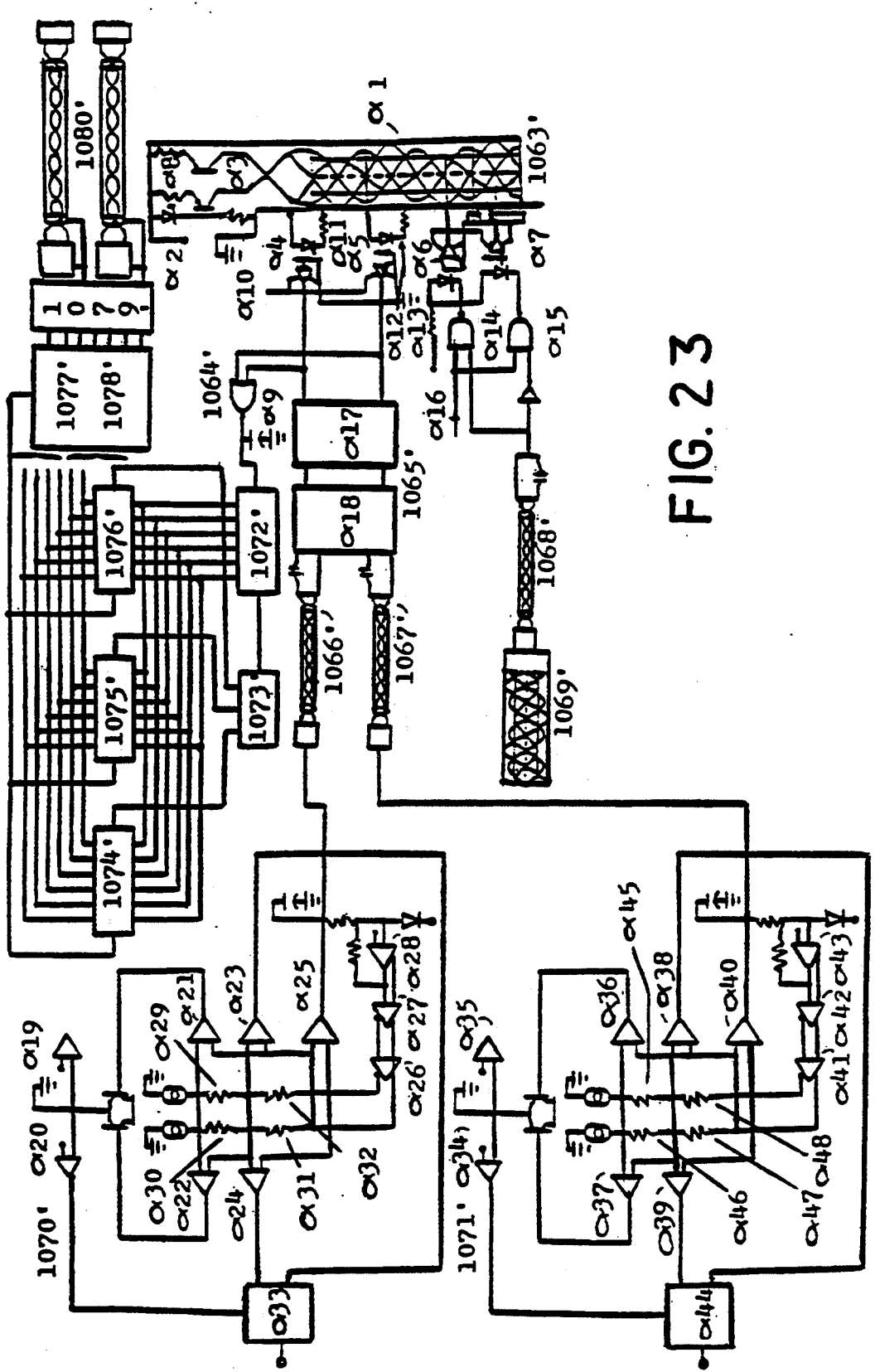
FIG. 23 is in effect a simplified variation of a partial block diagram and schematic version of an electro-optical converter means.

FIG. 23 is in effect a simplified variation of a partial block diagram and schematic version of an electro-optical converter means. FIG. 23 is a combination block diagram and a simplified schematic representation of only one of several equivalent optical electronic multiplexing stations associated with the preferred embodiment. Each electronic subsystem will be assigned a numerical equivalent and all pertinent component parts will be designated an alphanumeric or an equivalent numeric value. Each and every component structure or equivalent structure is readily available commerically from such sources as HewettePackard, Texas Instruments or other suitable manufactures. A generalized version of a multiplex station is illustrated by 1063, 1064 denotes logic gates. $\alpha 1$ is descriptive of a typical signal line, $\alpha 2$ defines the transmission line supply. Alphanumeric symbols $\alpha 3$, $\alpha 4$, $\alpha 5$ and $\alpha 6$, $\alpha 7$ collectively denote open collector outputs. $\alpha 8$ through $\alpha 13$ describes various resistive elements. The data is inputed via line $\alpha 14$ and $\alpha 15$ denotes an enable segment. The line status is denoted by $\alpha 16$. Numeral 1065 consists of two mutually exclusive or Flip Flop subsystems, as denoted by α17 and α18. Incorporated α17 is an independent wave interrupt sequence, whereas α18 consists of an exclusive or Flip Flop system with a Kalman filter. Numerals 1066 and 1067 consist of specially encoded optical electronic data output channels. Numerals 1069 and 1068 are indicative of a data influx channel with element 1068 being a data compression undergoing compression prior to systems entry. Numerals 1070 and 1071 describe two separate but equivalent block diagrams of a four chip hybrid receiver means, each of which acts as separate wave discriminaters. Each digitized signal is analyzed on the basis of electronic wave characteristics α19 denotes the link monitor output VREF whereas α20 describes the ALC Amp and VREF. α21 is indicative of a negative peak comparator, whereas α22 is indicative of a positive peak comparator. The logic low and logic high comparators are denoted by α23 and α24. The differental amplifier stage and the gain control stage are described by α25 and α26. The bias voltage preamp described by α27 and α28 explains the D.C. restorer amp. Elements α29 through α32 depict resistors. The element α33 is representative of an R-S Flip Flop data output means. Numeral 1071, as previously noted is equivalent to numeral 1070 and therefore elements α19 through α33 are equivalent to elements α34 through α48. The present status of each sisal enters element 1072, a mainline sequencer which sends its input data to a clock means, which is denoted by numeral 1073. The data processed by numerals 1072 and 1073 are collectively sent to numeral 1074 through numeral 1076, which consists of three equivalent short term storage multivibrator means. Numerals 1077, 1078 consists of a Kalman filter encoder means. Numeral 1079 depicts a hipbasic line. The digitized electronic signals are converted into their optical electronic binary equivalents, and is then sent to the main computer complex for further analysis, as noted by numeral 1080.

Figure 24:
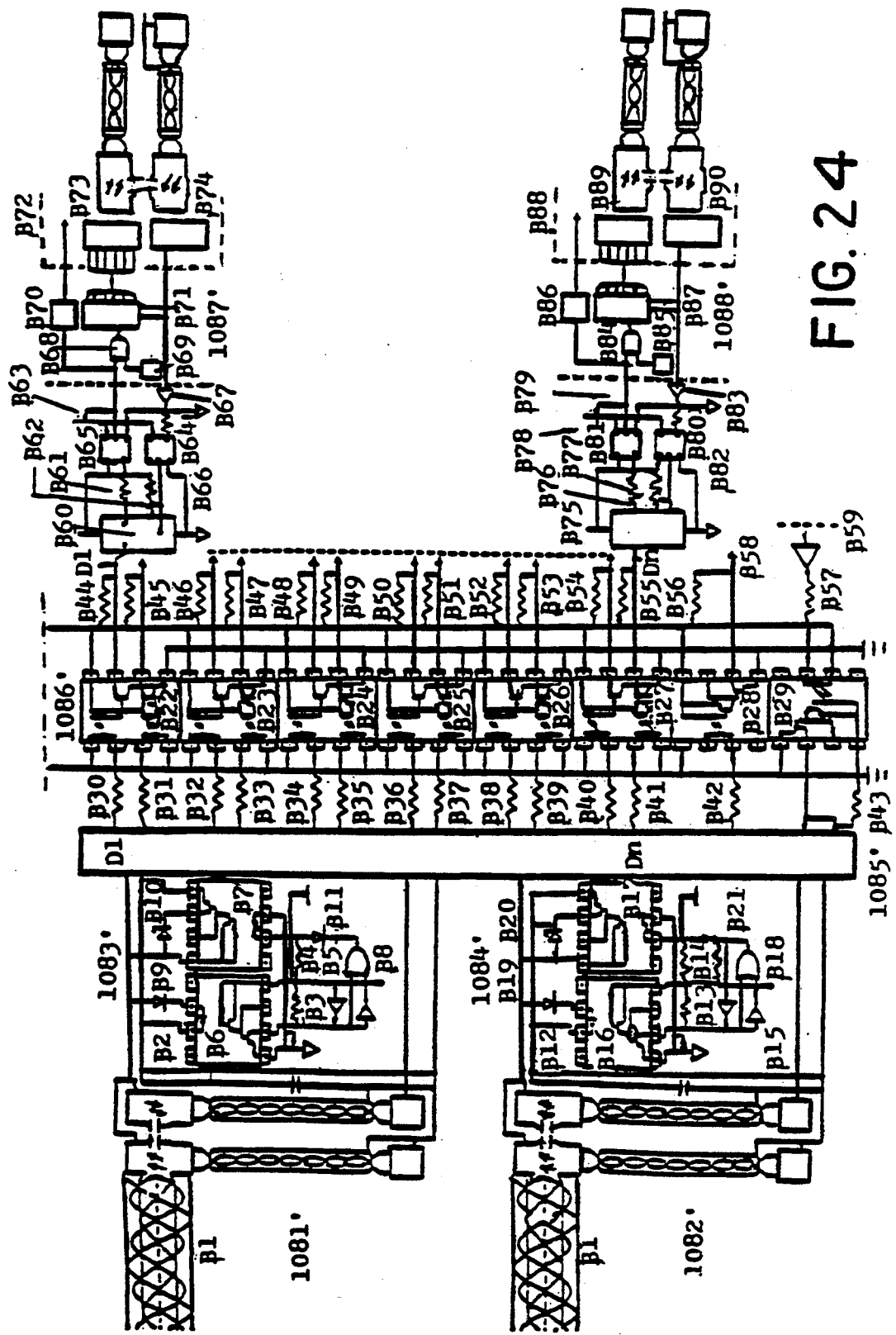
FIGS. 24, 25 depicts combination block diagrams and partial schematics of simple optical electronic analog digital converter units.
Figure 25:
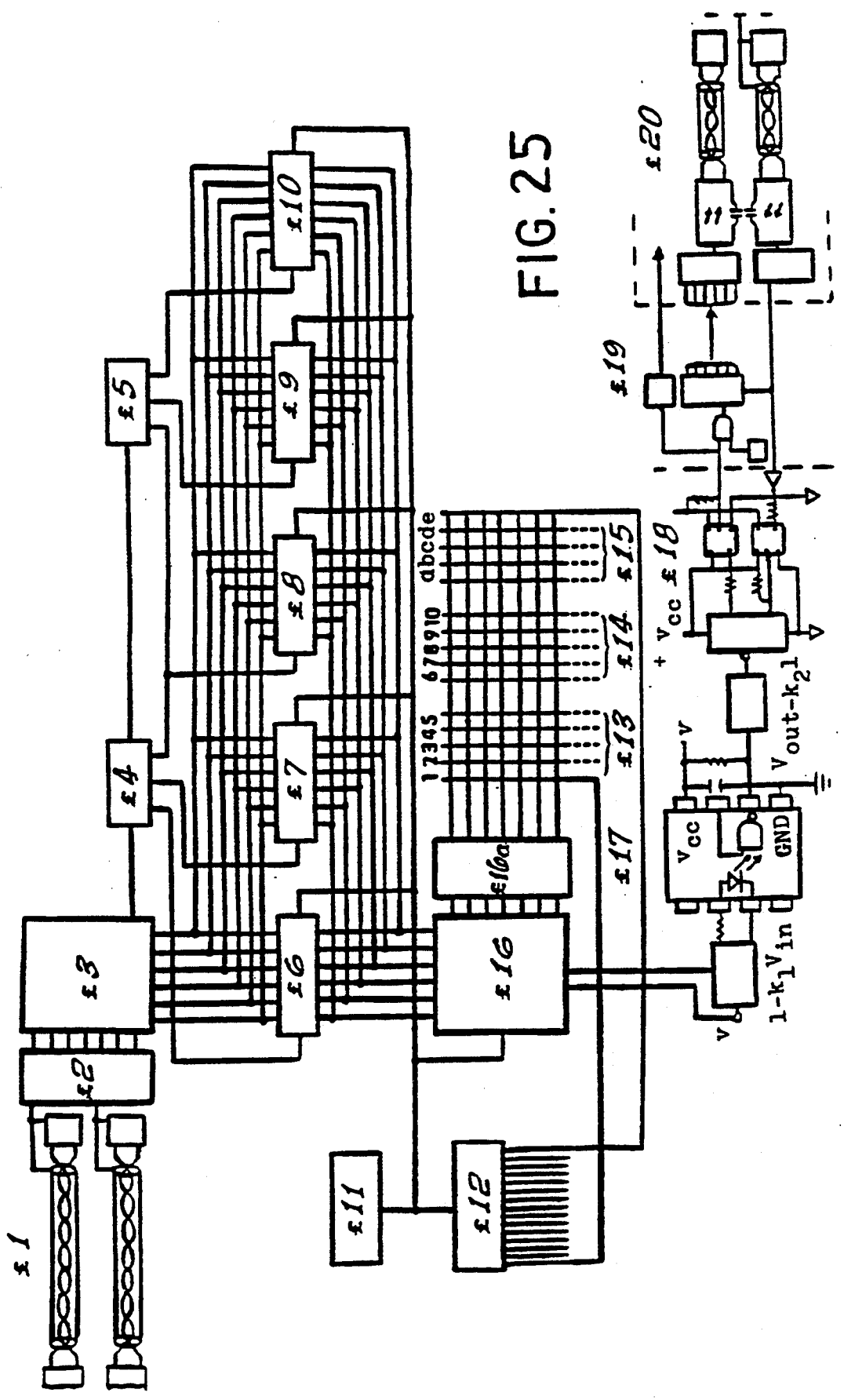

FIG. 24 depicts a combination block diagram and a partial schematic of an exemplary form of a singe optical electronic analog/digital converter unit. FIG. 24 like that of FIG. 25 is composed entirely of commerically available components each of which is assigned an alphanumeric value. Subsystems 1081 and 1082 are equivalent optical line driver and receiver means that receive a given transmission wavelength and or its reference beams. Numerals 1083 and 1084 are equivalent and indicative of common optoisolators. The resistor elements of 1083 are denoted by β1 through β5. The accompaning optical electronic IC means is described by β6 and β7, respectively. The effective ground and logic element is described by β8, β9, β10 and β11 describe other diode means, which are associated with the subsystems. Numeral 1083 is equivalent to numeral 1084, therefore all components of numeral 1083 are equivalent to those of 1082, such that components β1 through β10 are equivalent to components β11 through β21. Numeral 1085 represents an analog digital converter means IC β22 through β29 of numeral 1086, which describes the isolated analog/digital in terms of parallel data outputs. Components β30 through β57 denote resistor elements of numeral 1086 for the respective data outputs denoted by D1 through Dn. β58 denotes the start converter process, whereas β59 describes the termination of the converter process. Each data output is received by a digital/analog isolator system, two of which are denoted by numbers 1087 and 1088. Numeral 1087 and 1088 are equivalent to one another, and to all similar such units. A multivibrator means of numeral 1087 is denoted by β60. The resistive elements of subsystem 1087 are described by the alphanumeric values β61 through β64. There are two equivalent IC's denoted by β65 and β66. β67 is indicative of a logic inverter, β68 depicts a oscillator and β69 denotes a logic AND gate. The one shot means is denoted by β70 and the clock counter means is described by β71. The microprocessor system is described herein by β72 with an input port denoted by β73 and an output port indicated by β74 component elements β75 through β90 of numeral 1088 are equivalent to those elements β60 through β74 of numeral 1087.

FIG. 25 exemplifies a simplified combination block diagram and schematic representation of only one of several optical electronic analog/digital converter feedback units employed for sensory updates, servo scans and the like. Alphanumeric values are assigned to each subsystem in order to more clearly define a few basic component systems. Elements 1, 2 and 3 are indicative of the optical electronic sensory array, optical electronic encoder, and analog/digital interfacing and keying means. Alphanumeric values 4, 5 and ≢10 through 10 designates array selectors and a full complement of input storage buffers. Element 11, 12 and 13 through 15 denotes a clock/timing means, column drivers and display terminals. Element 16 collectively describes a VLSI chip containing data input transfer, a column selector, comparator encoder/decoder signal outflow means. Elements 17, 18, 19 and 20 designate a voltage to frequency converter, a monopulse multivibrator-drive means and a line driver receiver bidirectional means.

Figure 26:
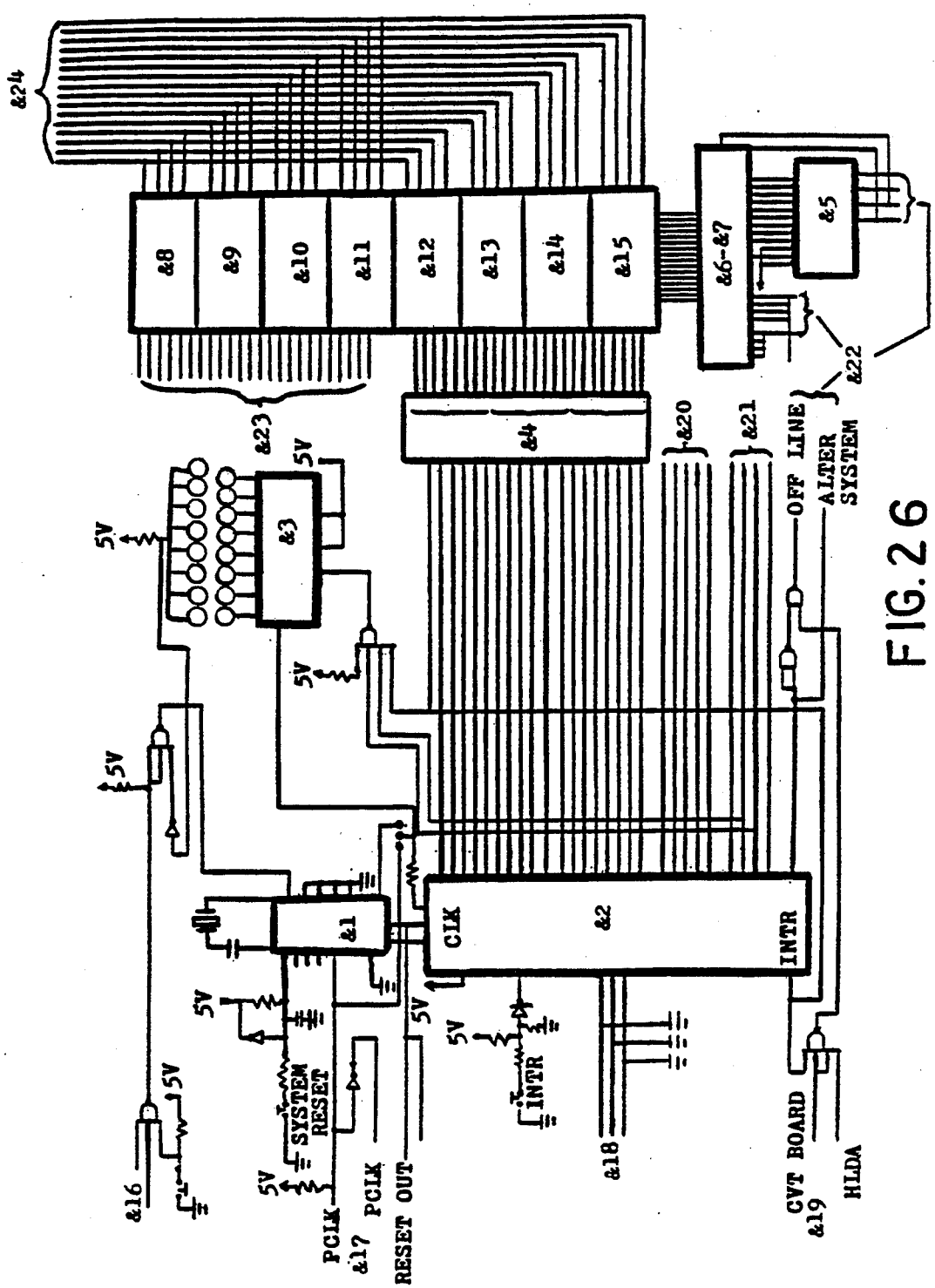
Figure 27:
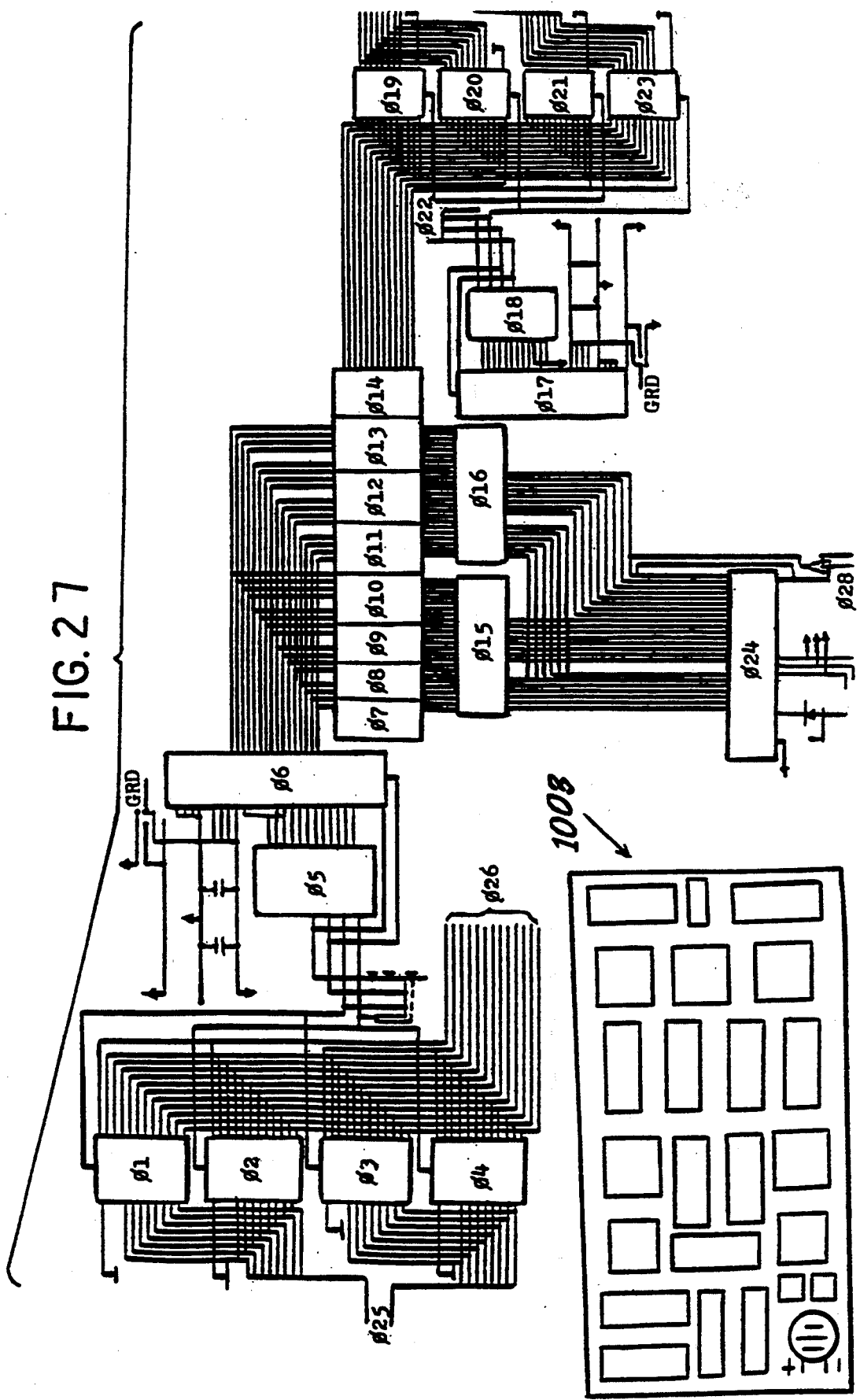
FIG. 27 discloses a simplified array of logic, elements utilized to assist or discern speech recognition, audio-/visual recall, interactive reply and the comparision of data or interrogation thereof.

FIG. 26 describes in part one of only several timing oscillator circuits or sequencer means deployed by the device. The partial design schematic which is depicted in FIG. 26 is a basic variation of a commerically available circuit, which can be provided by companies such as Intel, I.B.M. or others. The circuitry disclosed in FIG. 26 predisposes the operation of the logic circuit which is depicted in FIG. 27. The key integrated circuits in FIG. 26 are assigned the alphanumeric values &1 through &15. Elements &16 through &24 are indicative of I/O from other circuits. The capacitance, diode, resistive elements are readily understandable by those skilled in the art and are not assigned to alphanumeric values.

Figure 28:
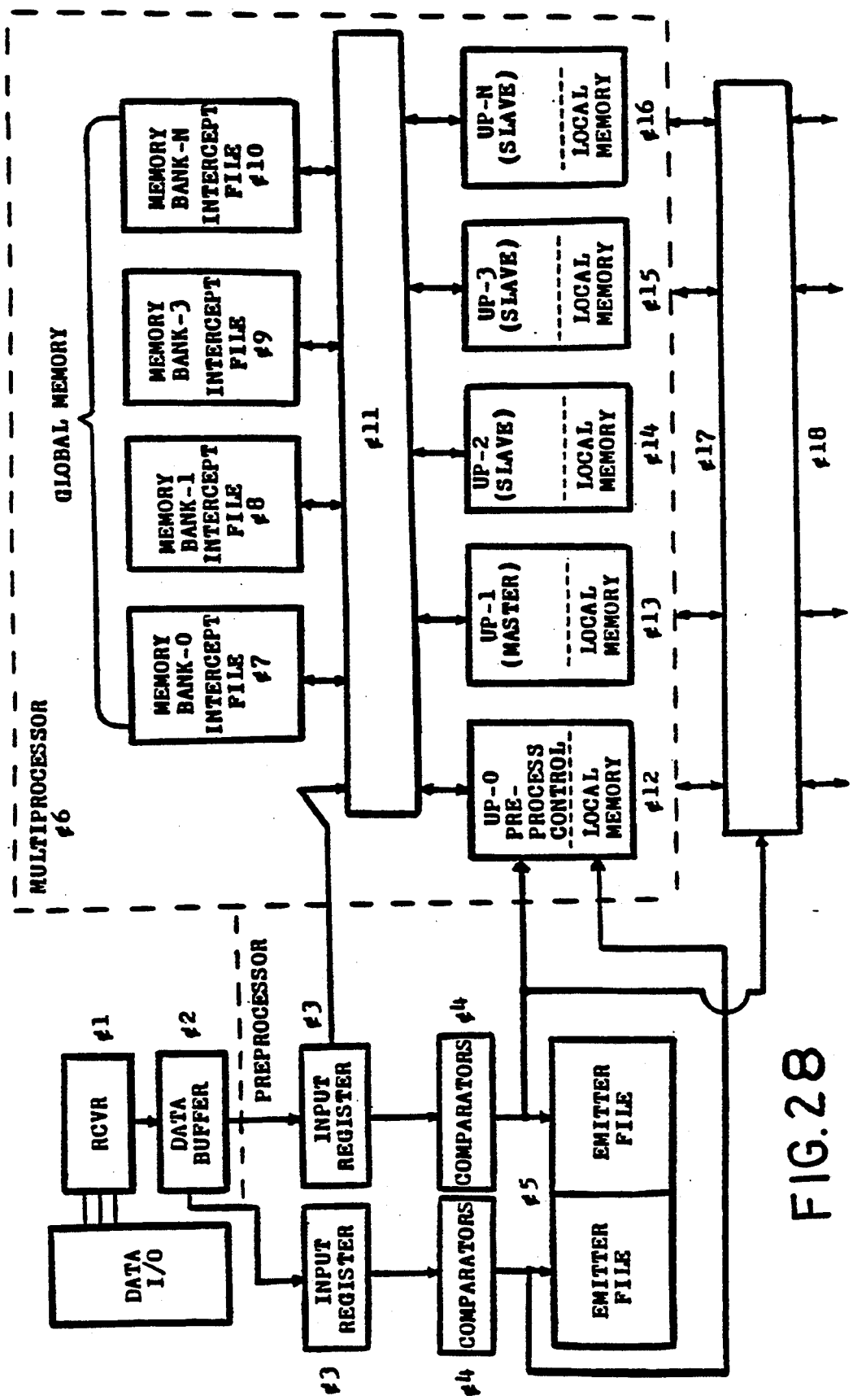
FIG. 28 entails a simplified schematic block diagram of-the global memory system.

FIG. 27 is indicative of a concise simplified schematic representation of a small portion of the logic circuit forming the basic embodiment of a single microcomputer means. The vital portion of the circuit employed as denoted in FIG. 28 is equivalent to a multitude of similar such circuitry utilizing VLSI/VHSIC technology. The separate I.C. elements are so constructed as to be repetitive providing a reliable microcomputer with an increased ability to calculate and implement information acquisition, and dissemination, pursuit vectors and the like. The I.C.'s are disposed on a single portion of the VLSI card which is replaceable in itself as well as each micro integrated circuit (I.C.) means. Each integrated circuit is designed by its own alphanumeric value and there are twenty-four I.C.'s depicted in the figure herein. The I.C.'s are listed by elements ∅1 through ∅24 with elements ∅15 and ∅16 acting as interrogators for logic elements ∅7 through ∅14. Comparator means for data are indicated in part by elements ∅1 through ∅4 and elements ∅19 through ∅23. Alphanumeric values ∅25, ∅26, ∅27 and ∅28 are indicative of origins of embarkation wherein data either enters from other circuits or leaves from the portion of the circuit depicted in FIG. 27 and bound for other circuits. The other portions of the-partial circuit diagram depicting capacitors, grid, resistive elements and the like are minor and straight forward to one skilled in the art and therefore are not assigned any alphanumeric values.

FIG. 28 entails a simplified schematic block diagram illustrating in brief the operations of a global memory system. The global memory incorporates within the structure of an element known as a multiprocessor a series of memory bank intercept files preprocess control, master and slave local memory elements, including ancillary systems. Data is inputed and outputed, received, registered collated and compared with existing data prior to being conveyed to existing emitter files and the preprocessor local memory element. The compact structure and close proximity of element embodied within the global memory system allow the rapid access, assessment and response to data without accessing huge stores of peripheral data. The simplified block diagram described in FIG. 28 illustrates in an exemplary fashion a microcomputer array processor element dispositied on a single VHSIC card. Information is received and encoded by element el, which sends the data to be buffered by ¢2. The data obtained from ¢2 is then conveyed to a series of serial input registers, as denoted by element ¢3. The data from ¢3 is sent to a comparator bank described by ¢4 which either processes the data by sending it :o an emitter file ¢5, or to a series of interrogator circuits. The microcomputer array processor .means is designated by value ¢6, which is contained within the embodiment of elements that are defined by a series of memory bank elements and intercept files denoted by elements ¢7 through ¢10; wherein element ¢10 is a memory bank consisting of a number of subelements carried out to some desired element and all of the elements, ¢7 through ¢10 form what is losely known as a global memory. Element ¢11 forms a typical memory request logic interrogator means and elements ¢12 through ¢16 form a preprocessor control local memory interrogator, a master control local memory and a series of slave memories with EEPROM capabilities. The processed data and preprocessed data are both entered directly into the systems computer controller means, as defined by embarkation point ¢17 and ¢18.

Embodied within the structure of the global memory system are integrated circuits or microprocessors which are responsible for manipulating the data fed into the microcomputer, in accordance with the operative set of instructions provided here by the user. The instructions are keyed by the user and are provided within the operative framework of a digitized list or sequence, forming a program which is encoded and stored into the memory elements of the microcomputer. Each instructional element of a sequence of instructions consists of a specified number of bits averaging 256 bits of information, which is stored in one or more registers collectively called a memory address. The number of addresses of instruction sequences to be employed by the system is stored in order to form the proper sequence in a program counter . A controller means usually receives the address of the new set of instructions from the program counter which obtains the digitized data stored in the aforementioned memory address and transfers the said data to the instruction register. The way by which data is conveyed is by three separate and distinct communication channels as designated by the, address bus, the control bus and the data bus, respectively. The instructional address placed in the program counter is entered in the address bus, which readies the storage means to yield or transmit the instructional data. A digitized signal or electrical impulse on the control bus enables the data to be transferred to the data bus means. An additional control signal conveyed to the instruction register is held while the controller means decodes it and issues further digitized control signals to perform . the given set of instructions. The instructions pertain to data stored in the data buffer and may be initiated by either some input device or in and-from the memory. If the instructions perform a given operation the results of the said operation may be stored temporarily in the accumulator means; wherein upon completion of the same said operation the results are sent back to the specified memory address. The ALO and accumulator means are associated with a set of condition codes also known as flags, which function as single bit registers with each unit indicating something about the results about a given operation held in the accumulator means. When subprograms and frequent subroutines are embodied within a given program, which requires several instructions in the same sequence that are conveyed to adjacent memory addresses, collectively defined as a stack means Said stack enhances the speeds in a given operation. The memory addresses forming the stack are separately addressed as if only a single memory location and the address accessed is stored in a means defined as the stack pointer. The stack pointer functions in a specific fashion as to allow the controller to use only a single address to call for the entire stack.

Figure 29:
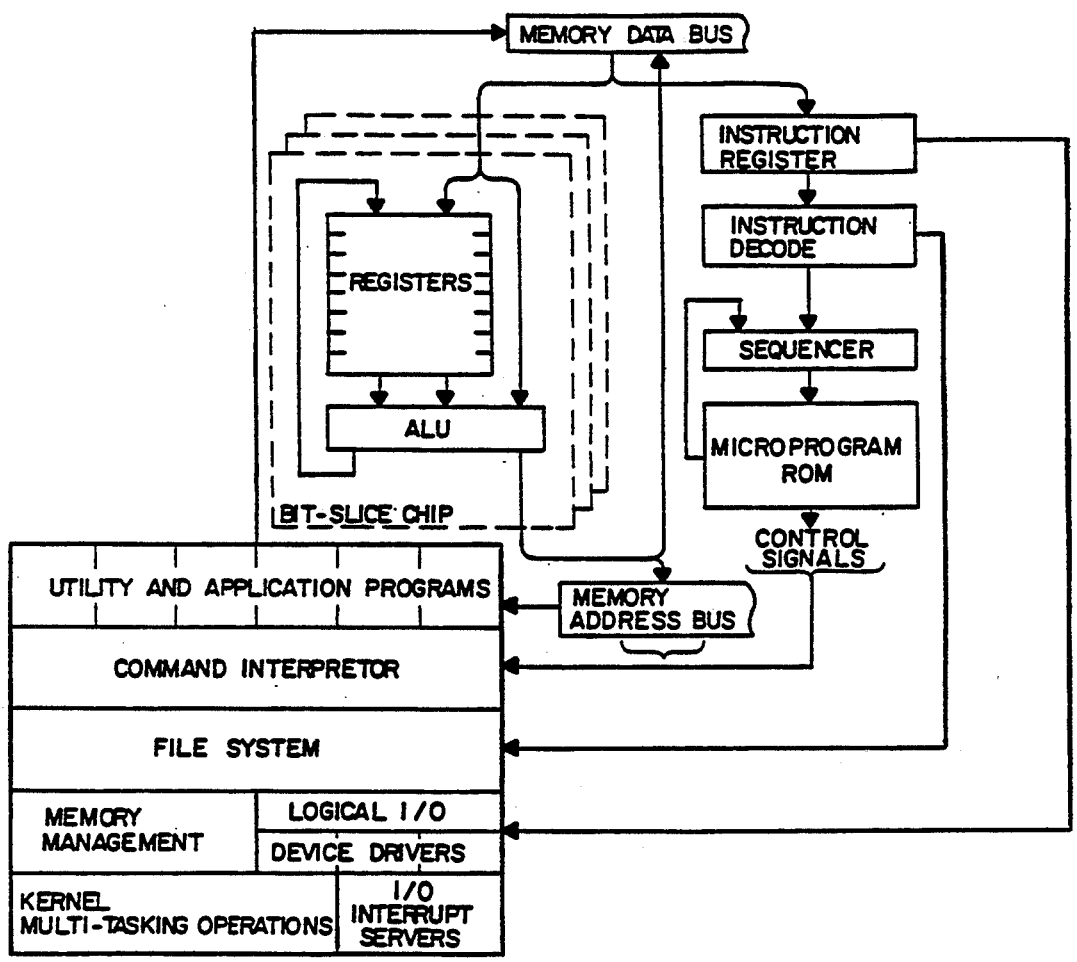
FIGS. 29, 30 describe in block diagram form the operation of the CPU structure.
Figure 30:
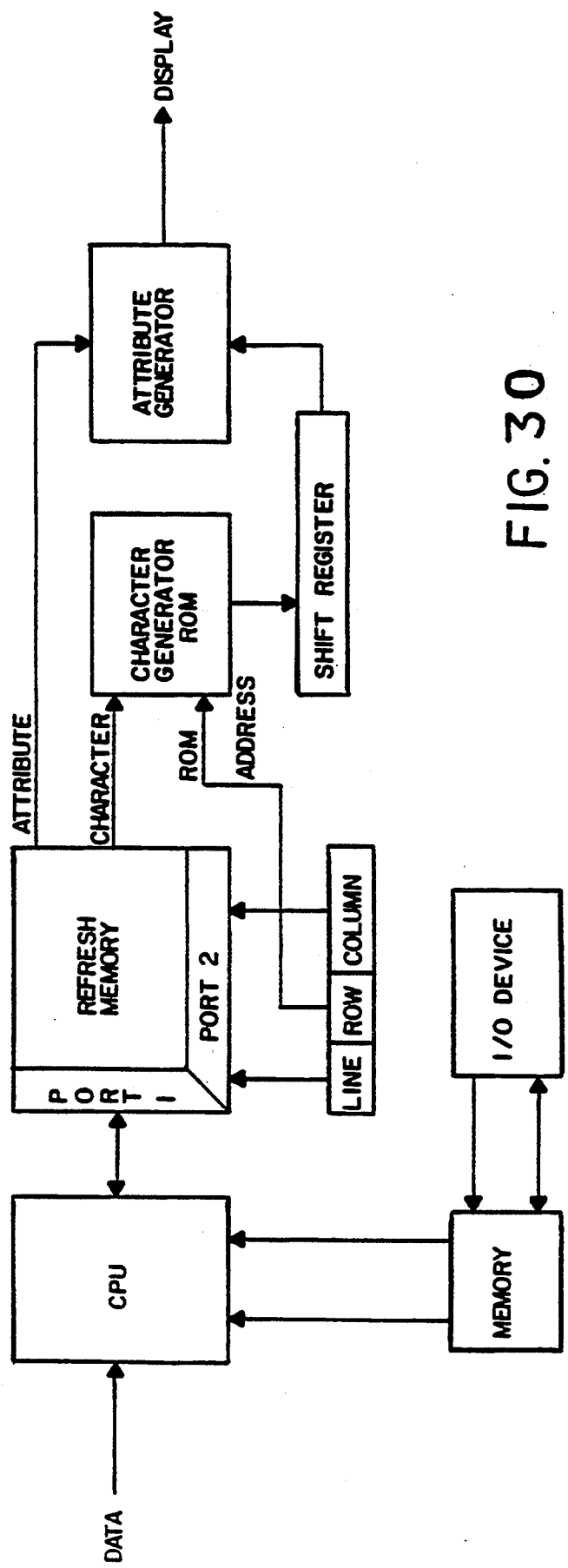

A series of other ancillary registers known as general purpose registers, which are used as required. The ancillary registors have or consist of a exact finite number of resistor elements n, begining with an accumulator and ending with a high order byte register and a lower order byte register means. Other means are disposed in the form of external connections including, a clock, power supply, data input/output means, analog/digital converters and other means. The CPU is implemented with secondary memory devices, which are defined by such means as read only memories (ROM's). Random access memories (RAM), charged coupled devices (CCD's)or other equivalent means embodied within such means as I.C.'s are etched or imprinted on a card along with the micro. processor. The above aforementioned operations of the central processing unit CPU and how the CPU transfers data are illustrated schematically by the FIGS. 29, 30. Numeric values are not assigned to the elements in the figures because each element is clearly defined and straight forward, consistant with the operation of conventional computer systems.

MATHEMATICAL EQUATIONS, FORMULAS AND OPERATIVE DIAGRAMS RELATED TO THE OPERATION OF THE INVENTION

The processing of informational data by the user interfacing with the automated interactive volumetric device can be understood on the basis of the physiological psychometric characteristics of the user, decision analysis, informational matrices and baysian statistics incorporated into expert systems. More often than not the user interface consists of a human being with an automated device rather than a computer or its equivalent and to this end the process of information exchange requires the consideration of human factors. The equations, mathematical formulas and diagrammic presentations contained herein correspond to generalizations and are oversimplifications of ongoing interactive processes readily understood by those skilled in the art.

Human factors will be restricted to mathematical representations of human channel capacity, physiological response associated with informational content and probabilistic density functions. The application of psychophysical parameters to informational theory in relation to different sensory channels provides a method of absolute identification. The aforementioned sensory channels corresponds to but is not limited to such biological sensory apparatus as those utilized for audition, gustatory differentiation, olfactory discrimination, visual determinants and somatosensory sensations. Each channel has parameters assigned to values corresponding to physiological, perceptual and psychological approximations of human norms which are unique values. The unique values correspond to responses which are attributed to each instance of a set of stimuli that vary along one or more specified dimensions. Certain specifiable dimensions relate to values assigned to characteristics or attributes with a given channel. The auditory channel has dimensional realms alluding to tone, pitch and volume or loudness. Visual dimensions correspond to spatial temporal parameters of height, length, width, color and textural patterns. Gustatory stimuli are based upon subjective variations in taste such as variations in acidity, bitterness salinity, sour or sweetness. Olfactory realms are vague alluding to variations in volatility and various subjective scents. Somato sensory dimensions relate to variances in pressure, point discrimination, textures, sizes and vibrational data. Informational measurements are assessed to stimulus (S), response (R) and to conditional uncertainties [U(S |R),U(R |S)], such that N stimuli and M responses are contained within the equation herein below:

$$U(S) = - \sum_{i=1}^{N} p(s_i) \log p(s_i)$$

$$U(R) = - \sum_{j=1}^{M} p(r_j) \log p(r_j)$$

$$U(R|S) = - \sum_{i=1}^{N} p(s_i) \sum_{j=1}^{M} p(r_j|s_i) \log p(r_j|s_i)$$

$$U(S|R) = - \sum_{j=1}^{M} p(r_j) \sum_{i=1}^{N} p(s_i|r_j) \log p(s_i|r_j)$$

and the informational data transmitted between a given stimulus and a corresponding response is typically defined by the expression

T=U(R)−(R|S)

or

T=U(S)−(S|R)

The temporal spatial spacing of stimuli is a crucial factor in the perceptual discrimination of the said stimuli which varies directly such physiological processes as reaction time, neurological recovery periods (i.e. ionic transports, the release, interaction and metabolism of neurohumeral substances) and recovery periods (replenishment of biochemicals and or their subsequent reformation). In the framework of an interactive device the number of stimuli can be gated such that the presentation of images, acoustical sounds and the like which approaches an asymptote of information transmission, at which point thereafter the channel capacity of various sensory systems will be exceeded. According to Norwich and others have established that the channel capacity can serve as an index of perceptual sensitivity which can be compared with other physiological and psychological indices. Accordingly, the presentation of images in rapid succession takes advantage of the apparant fusion of images due to the duration of biochemical interactions and or the subsequent replenishing of organic complexes such as retinine or intervals of recovery associated with retinal after images. Additionally,. an exemplary set of paired stimuli varying more than one attribute is far more discernible than a set varying in a single attribute. Visual stimuli, for example varying in intensity (apparant brightness) and apparant size, color, pulsation rate or other attributes is far more discernible than a set of stimuli varying in only one said attribute alone. Basic assumptions of Gaussian variability to represent to a response or physiological activity can be closely correlated with informational measurements such as U(R|S). Information transmission of data inevitably introduces uncertainty concerning stimuli strength, size or spatial disposition. Experimenters such as Shannon have deduced that the extent of uncertainty in a normal probability density function standard deviation i.e. $\sigma$ as illustrated in the equation contained herein below:

$$p(x) = \frac{1}{\sqrt{(2\pi)}\sigma} e^{-(x-\mu)^2/2e^2}$$

The uncertainty of p (x) becomes $$-\log p(x) = \log \sqrt{(2\pi)} \ \sigma + \frac{(x-\mu)^2}{2\sigma^2}$$

and by integration the average uncertainty of the entire distribution can be expressed as $$U(x) = \log \sqrt{(2\pi e)} \ \sigma.$$

If the conditional probabilities (R|S) are normally distributed, the stimuli are discrete and the number of response catagories involved in the process of absolute identification then $$U(R|S) = - \sum_{i=1}^{N} p(s_i) \int p(r|s_i) \log p(r|s_i) dr$$

and by substitution of $$U(x) = \log \sqrt{(2\pi e)} \ \sigma.$$

into the above equation yields $$U(R|S) = \sum_{i=1}^{N} p(s_i)[\log \sqrt{(2\pi e)} \ \sigma_{r|s_i}]$$

Assuming all stimuli are equally probable an the values $\sigma$ r/51 s; is constant for each separate and discrete stimulus $$U(R|S) = \frac{1}{N} \sum_{i=1}^{N} \log \sqrt{(2\pi e)} \ \sigma_{r|si} = \log \sqrt{(2\pi e)} \ \sigma_{r|s}$$

as information transmission is $$T = U(R) - U(R|S),$$

$$T = U(R) - \log \sqrt{(2\pi e)} - \log \sigma_{r|s}$$

The index of perceptual sensitivity, channel capacity and detectivity ($\sigma\tau$ s) can be computed on the basis of ($\sigma\tau|$s); which predicts the effects for other indices.

Figure 31:
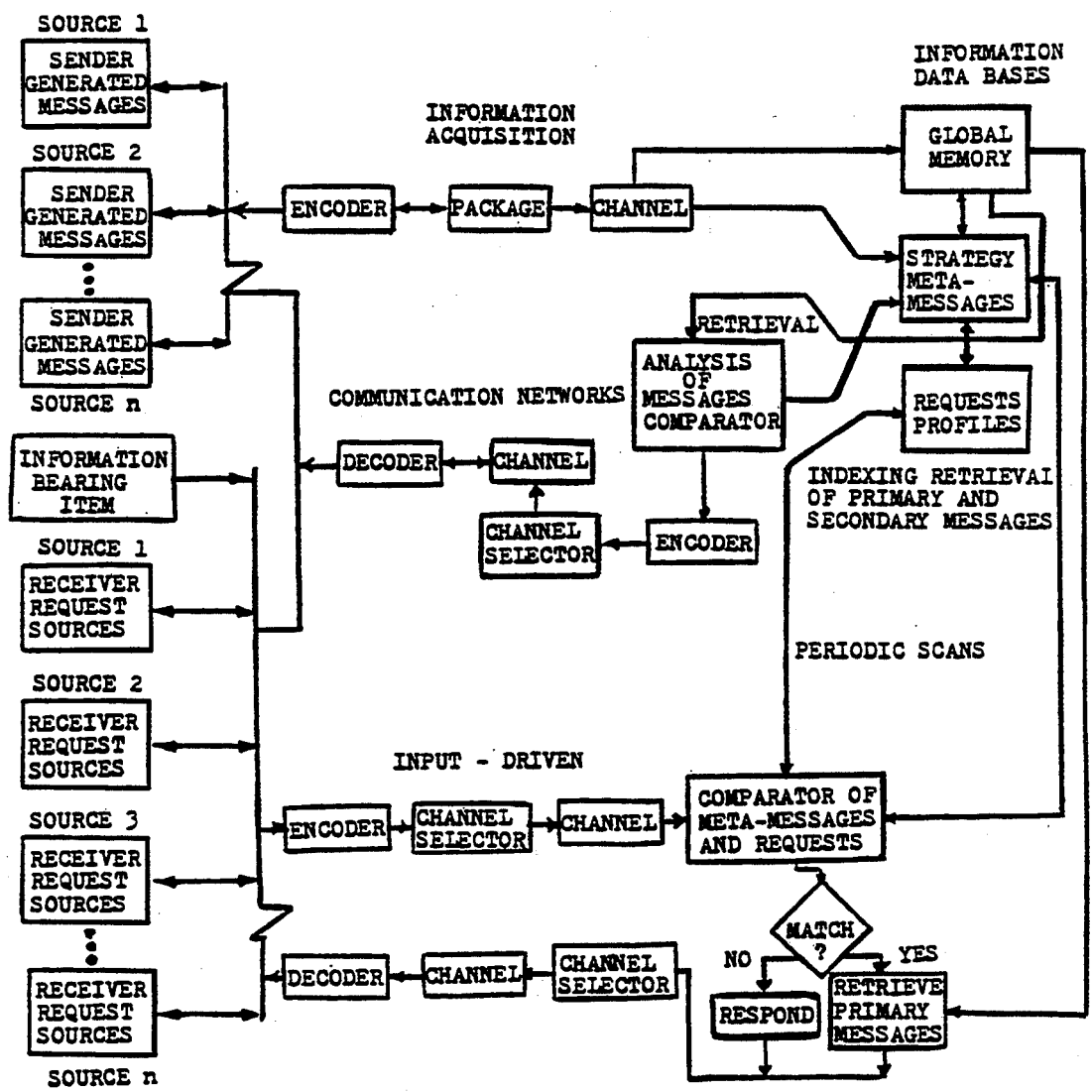
FIG. 31 diagrammatically describes a modified model by which information bearing data is communicated.

The interaction of the user, the IVS unit can be simply illustrated by a modified model for a multichannel directional informational communication means structured within the context of a priority demand global memory. All processes are clearly labeled and well understood by those skilled in the art in the diagrammatic model which is illustrated in FIG. 31 of the specification of this disclosure. Said Figure entails a block diagram illustrating the interface between the somato sensory information channels of the user and information processing channel of the IVS unit. Visual, acoustic, gustatory olfactory and mechanical input are channeled to and from the user to subsystems embodied within the IVS unit and from said unit to the user. Messages are generated by the sender as indicated by sources 1−n whereby data is encoded packaged and channeled to the global memory element described in FIG. 28 and other distinations corresponding to information acquisition. Information bearing items are processed additionally through information networks. The messages are acted upon by organizational networks in strategy analyses of same indexed encoded channeled and decoded prior to being recycled. Similarily sources 1 through n corresponding to receiver request sources are input driven encoded into a given channel and sent to comparator of meta-messages wherein data is periodically scanned, indexed and conveyed to strategy and global memory elements. Data from said comparator of meta-messages and requests is further dicotomized and sent to a determinant process wherein a positive match are retrieved primary messages then the channel selector means whereas the negative response is sent only to said channel selector through the proper channel to the decoder element prior to being recycled. Here both the user and the IVD unit means of processing or information networking are considered equivalent and indistinguishable.

Signal processing of informational data for variations in the analog theory involves Laplace transformations conjugated with variances of Fourier transformations. Analog signal processing of information is in understanding the conductance of pressure waves to acoustical sensors and somato sensory apparatus through indefinate mediums. Imaging processing compressional data alluding to speech recognition* and the like have a propensity towards digital Fourier Transformations, Fast Fourier Transformations end subject to gaussian distribution in an effort to limit noise. A list of typical equations is briefly compiled and contained herein below:

Laplace transform:
$g(t)$, a time function $$G(s) = L[g(t)] = \int_0^\infty g(t) \, e^{-st} dt$$

$s = \sigma + jw$(complex variable)

Fourier transform: if it exists:

$$G(w) = F(g(t)) = \int_{-\infty}^{\infty} g(t) \, e^{-jwt} dt$$

Inverse Fourier transform:

$$g(t) = \frac{1}{2\pi} \int_{-\infty}^{\infty} G(w) \, e^{jwt} dw$$

Fourier Series (periodic data):

$$g(t) = \sum_{-\infty}^{\infty} c_n e^{j2\pi nt/T} \quad \begin{array}{l} -\infty \leq t \leq \infty \\ n = 0 \pm 1, \ldots \end{array}$$

where:

$$C_n = \frac{1}{T} \int_{-T/2}^{T/2} g(t) \, e^{-j2\pi nt/T} dt$$

$T$ = period of repetitive signal

Z Transform (Discrete Data Set $g(kT)$)

$$G(Z) = Z[g(kT)] = \sum_{k=-\infty}^{\infty} g(kT) \, (e^{-ST})^k.$$

\* incorporated by reference U.S. patent application Ser. No. 873,809

The substitution $e^{ST}=Z$ maps the complex variable S into the complex variable Z and $$G(Z) = \sum_{K=-\infty}^{\infty} g(kT) \, Z^{-k}.$$

Then, to find the frequency response, set $Z=e^{jwT}$ $$G(Z - e^{jwT}) = \sum_{k=-\infty}^{\infty} g(kT) \, (e^{-jwT})^k$$

To compute the sampled spectrum directly, set $w = \pi r \Delta f$ and note that $T\Delta f = 1/N$. Then the Sampled Discrete Fourier Transform is expressed as:

$$G(r) = \sum_{k=0}^{\infty} g(kT) \, e^{-j\frac{2\pi rk}{N}}$$

where $w = \frac{2\pi r}{N1}$

Figure 32:
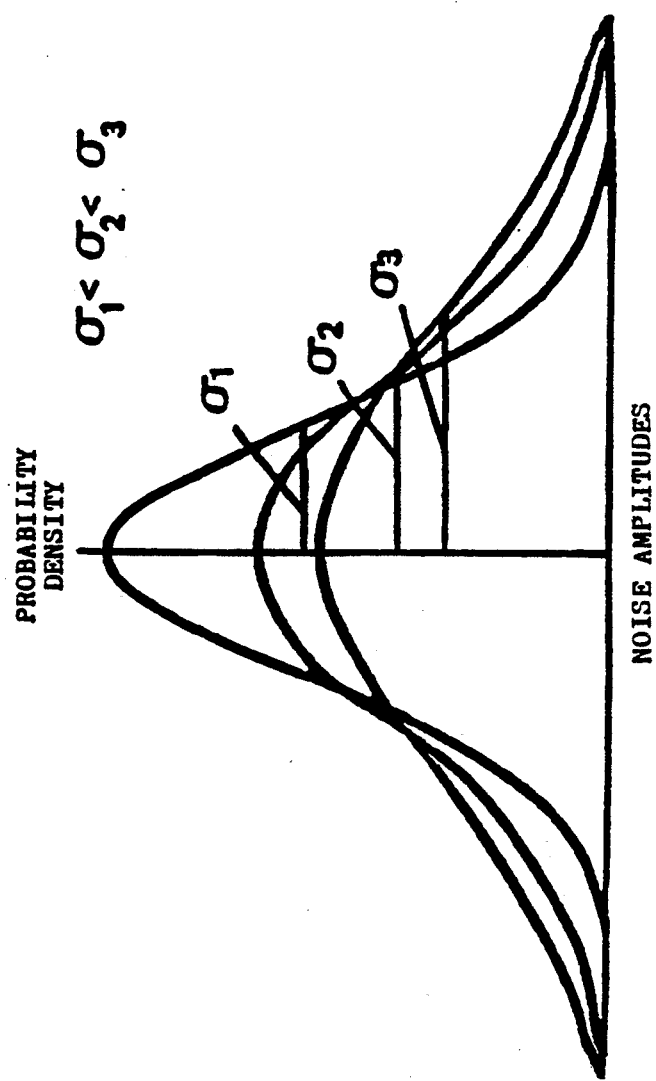
FIG. 32 is a graphical representation of a probability distribution indicative of a noise profile.

FIG. 32 is a graphical representation of the noise profile. FIG. 32 more specifically is the probability distribution of noise amplitudes in relation to the probability density. The aforesaid profile illustrates the existance of three intervals and the variance taken at $\sigma_1$, $\sigma_2$ and $\sigma_3$. The curves generated by the probability distribution of noise amplitudes is bell shaped and normal.

The degradation of data or entropy to some degree is tantamount to signal processing and the information theory. Shannon entropy (Renyi's entropy of order $\alpha$, entropies of degree $\alpha$, $\beta$ etc.) have been considered in part and a more general measure of uncertainty is preferrable. One of a number of events $\{A_1, A_2, \ldots, A_n\}$ occurs based on the probability distribution $\{P_1, P_2, \ldots, P_n\}$. Information is carried not only by numeric values pi but also by the fact that each value pi is associated to a specific event Ai. When the probabilities are discernible but it is uncertain how they are distributed on $\{A_1, A_2, \ldots, A_n\}$ then the corresponding entropy will be symmetric in $\{P_1, P_2, \ldots, P_n\}$. Shannon's entropy $$-\sum_{i=1}^{n} p_i \log p_i$$

is useful in such application as probablistic coding, communication or statistical mechanics where the probablities are given but how they are associated to events is not relevant. The general form for entropies where the events and their corresponding probabilities are not necessarily symmetric uncertainty is defined by the function $I_n(A_1, A_2, \ldots, A_n; P_1, P_2, \ldots, P_n)$ and the entropies in accordance to Azel is defined by $$I_n = -a \sum_{i=1}^{n} p_i \log p_i + \sum_{i=1}^{n} p_i g(A_i)$$

where a is an arbitrary real constant g an arbitrary real valued function of the said events. A special case involving a more general formula concerns the amount of uncertainty associated with a random vector or finite stochastic process useful in code recognition sequences. Here it is assumed that $n_1 = n_2 = \ldots = n_m = n$ and for each $i = 1, 2, \ldots, n$; and for each $i = 1, 2, \ldots, n$; $\alpha_i^{(1)} = \alpha_i^{(2)} = \ldots = \alpha_i^{(m)} = b_i$ and that $(b_1, b_2, \ldots, b_n)$ provides one of the infinitely numerous equivalent representation of a given alphabet $(\alpha_1, \alpha_2, \ldots, \alpha_n)$. the range of the random vector is the set of all $m''$ string of letters in a given alphabet. The uncertainty will be about the message of length m(string of m letters) that has been transmitted over a channel. The corresponding entropy might very well depend upon the choices and or represent of a given alphabet and if one is e allowed to eliminate the set of strings with zero probability which does not effect entropy (i.e. expansibility) then the following equation $$I_{n_1 n_2 \ldots n_m}(X_1, X_2, \ldots, X_m) =$$

$$-a \sum_{j_1 j_2 \ldots j_m} \pi_{j_1 j_2 \ldots j_m} \log \pi_{j_1 j_2 \ldots j_m} +$$

$$\sum_{r=1}^{m} \sum_{j_r=1}^{n_r} F_{r,j_r}(a_1^{(r)}, a_2^{(r)}, \ldots, a_{n_r}^{(r)}) p_{j_r}^{(r)} +$$

$$G_m(a_1^{(1)}, \ldots, a_{n_1}^{(1)}, a_1^{(2)}, \ldots, a_1^{(m)}, \ldots, a_{n_m}^{(m)}; \text{supp}(\Pi X))$$

reduce to $$I = -a \sum_{j_1 j_2 \ldots j_m} \pi_{j_1 j_2 \ldots j_m} \log \pi_{j_1 j_2 \ldots j_m} + b$$

with a, b real constants, $\alpha \geq$. where $$\pi_{j_1 j_2 \ldots j_m} = \text{Prob}(X_1 = \alpha_{j_1}^{(1)}, X_2 = \alpha_{j_2}^{(2)}, \ldots, X_m = \alpha_{j_m}^{(m)})$$

and the joint probability distribution of the system $(X_1, X_2, \ldots, X_m)$, $j_r = 1, 2, \ldots, n_r$, $r = 1, 2, \ldots m$. $X = (X_1, X_2, \ldots, X_m)$, The concept that entropy is always conditional upon what is known is derived from statistical mechanics which can be verified through thermodynamic effects. Intensity, vibrational frequency, volatility and thermal kinetic parameters are all deducable both in practice and theory from the laws of thermodynamics. Let the set of probability densities lie f on $R_n$ then $$I_n(f) = -a \int_{R_n} f \log f d\mu + b \cdot n + c \log \mu(A_f)$$

where f is any probability density s. t. $f \log f$ is integrable, and $A_f = \{x \in R_n | f(x) > 0\}$; $\mu$ is the Lebesgue measure and $a$, $b$, $c$ are real numbers, with $a \geq 0$, $c \geq 0$. The two extra terms $b \cdot n$ and $c \log(A_f)$ appeared; they were not completely unexpected. $I\pi(f)$ measures the amount of uncertainty (due to the chaotic motion of the system) one has in locating the point x, in the phase-space A that represents the actual position and velocity of each particle of a mechanical system, knowing A the phase space
B the exact number m of particles in the system (n=6.m)
C the probability density f.

According to $I_\eta(f)$, $I_\eta$ has its maximum for $$f = 1/\mu(A_f)$$

and $$\max I_\eta = (a+c) \log \mu(A_f) + b \cdot \pi.$$

If one assumes that max $I_\eta$ is also the measure of the amount of uncertainty when only A, B are given, then $$a \log \mu(A_f) + a \int_{R_n} f \log f d\mu = :G(f)$$

will be the information gain by the knowledge of $C_r$ and $I_\eta(f)$ can be written as, $$I_\eta(f) = \max_{f} I_\eta - G(f).$$

Yet, to be more realistic, assumption B should be dropped and replaced with (grand canonical ensemble, known as the absolute value B'', which is the relative number of particles in a system where B' the number of particles in the system is random, the probabilities $p_m = \text{prob}$ {number of particles=m, m 0.1, . . . }, are known.

By imposing certain intuitively natural conditions, the following representation has been derived $$I(p_m, f_m, m = 0, 1, \ldots) =$$

$$-\sum_{m=1}^{\infty} p_m \int_{R_{6m}} f_m \log f_m d\mu + b \sum_{m=1}^{\infty} p_m m +$$

$$c \sum_{m=1}^{\infty} p_m \log \mu(A_{f_m}) - d \sum_{m=0}^{\infty} p_m \log p_m.$$

one skilled in the art can readily see that all the different "information" are present in this formula, namely A' the phase spaces $\{A_{f_m}, m = 1, 2, \ldots\}$
B' the sequence of probabilities $\{p_m, m = 0, 1 \ldots\}$
C' the probability densities $\{f_m, m = 1, 2, \ldots\}$ on the respective phase-spaces $\{A_{f_m}\}$. Similar consideration to those in connection with $I_\eta(f)$ could be made here, note, however, that the last term on the r.h.s. of $I(p_m, f_m, m=0, 1, \ldots)$ has (since $d \geq 0$) has (when $d \neq 0$) no maximum.

Optical spectra signals and spatial temporal data information can be arranged, when digitized, into an information matrix in connection with analysis of laser light.

$$J = \delta\left[\left(\frac{\partial ln L}{\partial b}\right)\left(\frac{\partial ln L}{\partial b}\right)^1\right] = \delta\left[\frac{\partial^2 ln L}{\partial b \partial b^1}\right]$$

J is designated the information matrix (Fisher)

$$Y = Ub + \eta$$

$$p(\eta) = \frac{1}{(2\pi)^{k/2}|N|^{\frac{1}{2}}} \exp[-\tfrac{1}{2}\eta^1 N^{-1}\eta]$$

An application of the Cramer-Rao in equality yielding the likelihood function.

$$L\{y;b\} = \frac{1}{(2\pi)^{k/2}|N|^{\frac{1}{2}}} \exp[-\tfrac{1}{2}(y - Ub)^1 N^{-1}(y - Ub)]$$

$$ln L\{y;b\} = C - \tfrac{1}{2}(y - Ub)N^{-1}(y - Ub)$$

$$\frac{\partial ln L}{\partial b} = +U^1 N^{-1} U$$

$$J = \delta[U^1 N^{-1} U] = U^1 N^{-1} U$$

the convariance is restricted to $$\text{Cov } [B] \geq [U'N^{-1}U]^{-1}$$

For an a priori guess of J the expectation operator cannot be dropped if u is a stochastic signal (n is white noise) then $$N^{-1} = \frac{1}{\sigma_\eta^2} I \text{ and}$$

$$J = \frac{1}{\sigma_\eta^2} \delta[U^1 U]$$

$B = \{B_\alpha, B_1\}$ in the case where $U_o$ & $U$, represents the same sequence of samples sifted in time over a single discrete sampling interval $$\delta\{U^1 U\} = k \begin{bmatrix} \psi_{\mu\mu}(0) & \psi_{\mu\mu}(1) \\ \psi_{\mu\mu}(1) & \psi_{\mu\mu}(0) \end{bmatrix} = k\sigma_u^2 \begin{bmatrix} 1 & p \\ p & 1 \end{bmatrix}$$

the minimum covariance is given by $$\text{cov } [B] = \frac{\sigma_\eta^2}{k\sigma_\mu^2} \frac{1}{1-p^2} \begin{bmatrix} 1 & -p \\ -p & 1 \end{bmatrix} = c \begin{bmatrix} 1 & -p \\ -p & 1 \end{bmatrix}$$

for $p \neq 0$ the off diagonal expression is equivalent to a correlation between errors $B_o$ & $B_1$, and by means of a sample transformation, it is possible to observe the variance of the vector components $T\beta$;

$$T\beta = \frac{1}{\sqrt{2}} \begin{bmatrix} 1 & 1 \\ -1 & 1 \end{bmatrix} \begin{bmatrix} B_0 \\ B_1 \end{bmatrix} = \frac{1}{\sqrt{2}} \begin{bmatrix} B_0 + B_1 \\ -B_0 + B_1 \end{bmatrix} = Y$$

$$\text{cov}[Y] = \frac{c}{2} \begin{bmatrix} 1 & 1 \\ -1 & 1 \end{bmatrix} \begin{bmatrix} 1 & -p \\ -p & 1 \end{bmatrix} \begin{bmatrix} 1 & -1 \\ 1 & 1 \end{bmatrix} =$$

$$c \begin{bmatrix} 1-p & 0 \\ 0 & 1+p \end{bmatrix}$$

The continuous input of digitized signals is broken down into discrete matrix patterns which are reconverted into a series of overlapping fields, formine a single image of a given quadrant, in accordance with the foregoing. A program incorporating the foregoing controls, the operation of the system and method of the invention, whereby the characteristics of laser light employed by the invention are controlled to perform the respective functions.

Figure 16:
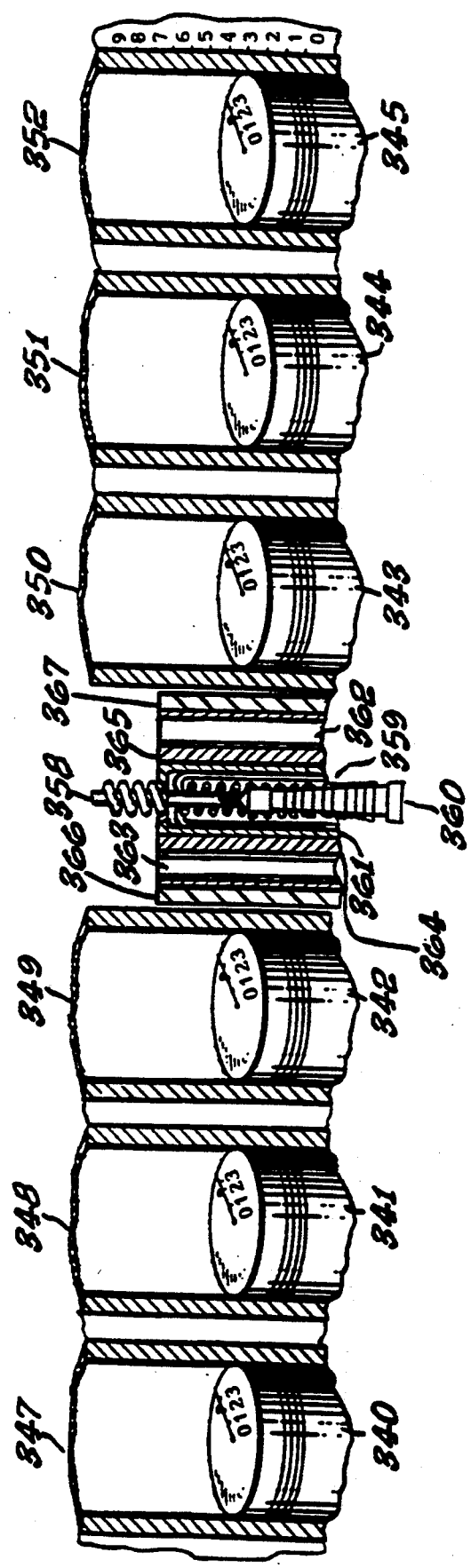
FIGS. 16, 16a and 16b are pictorial representations of sectioned chambers housing volatilizable wafers, a radio-frequency means, thermal induction elements and other components.
Figure 16B:
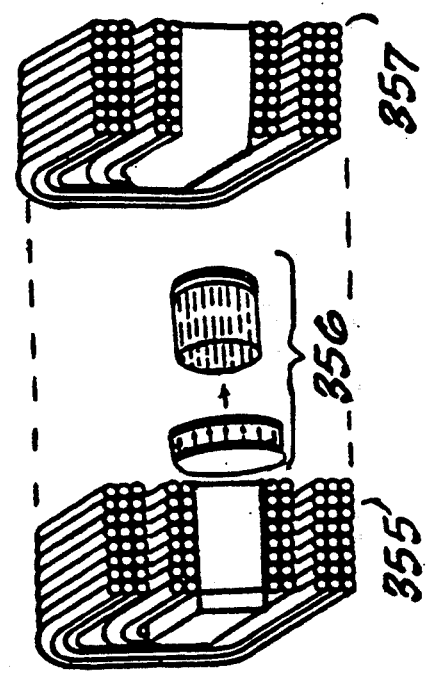
Figure 16A:
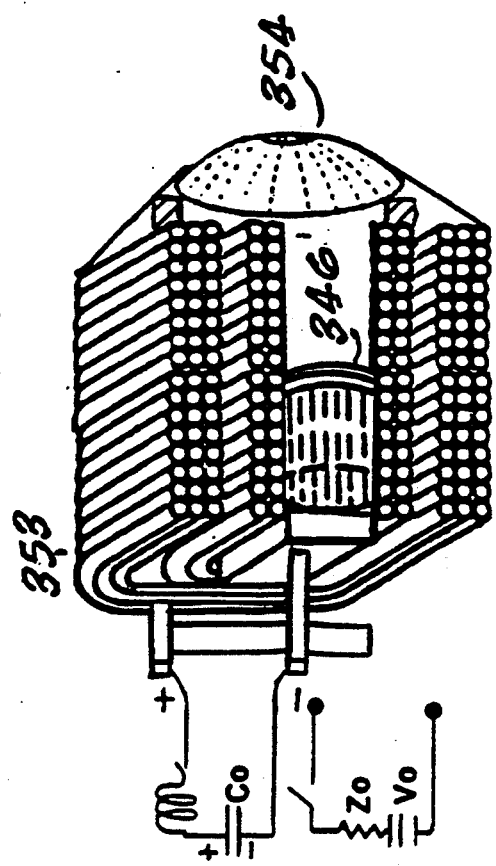
Figure 18:
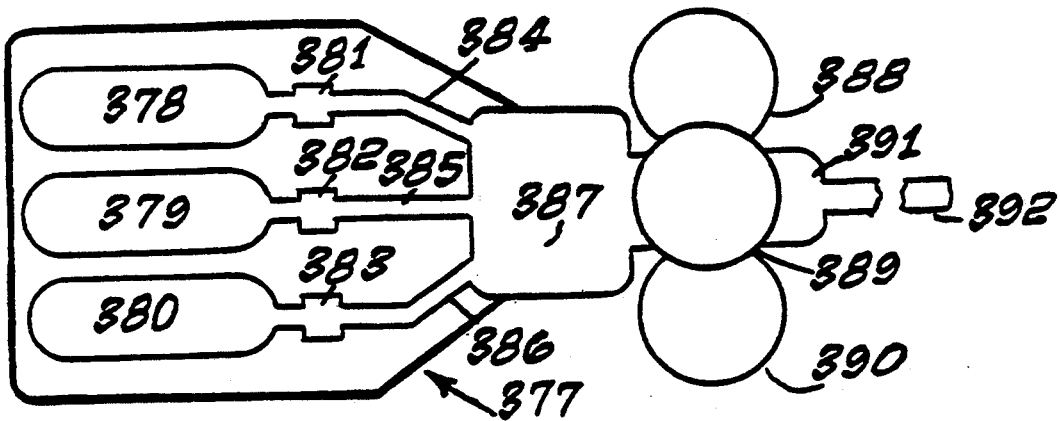
FIGS. 18 to 18b are representations of the gustatory delivery means disposing a side elevation, front and aft views.
Figure 18A:
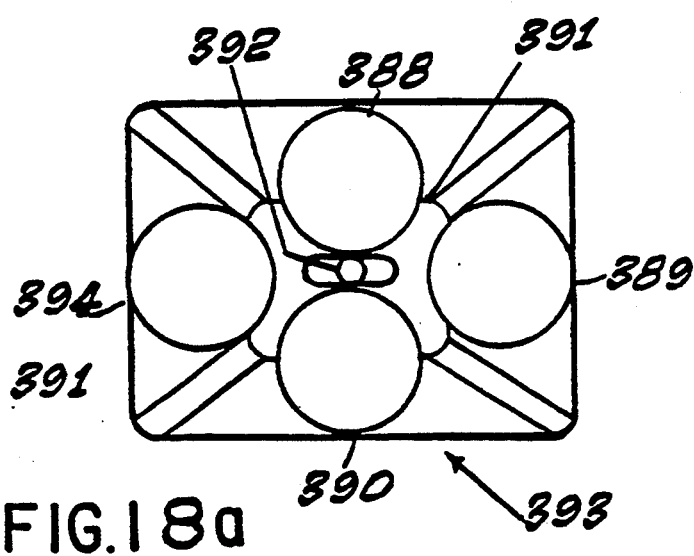
Figure 18B:
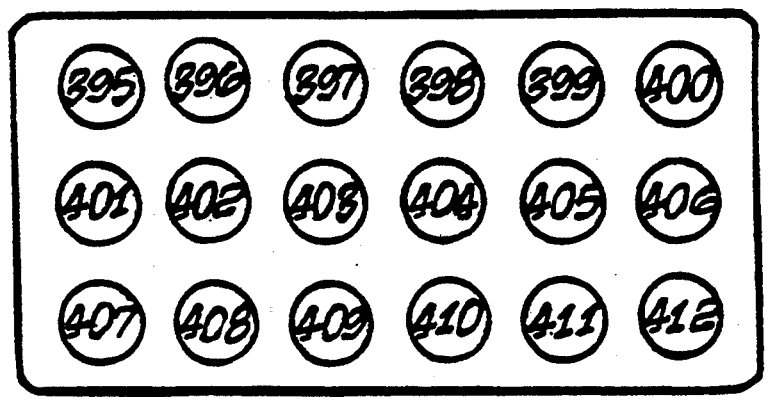
Figure 19:
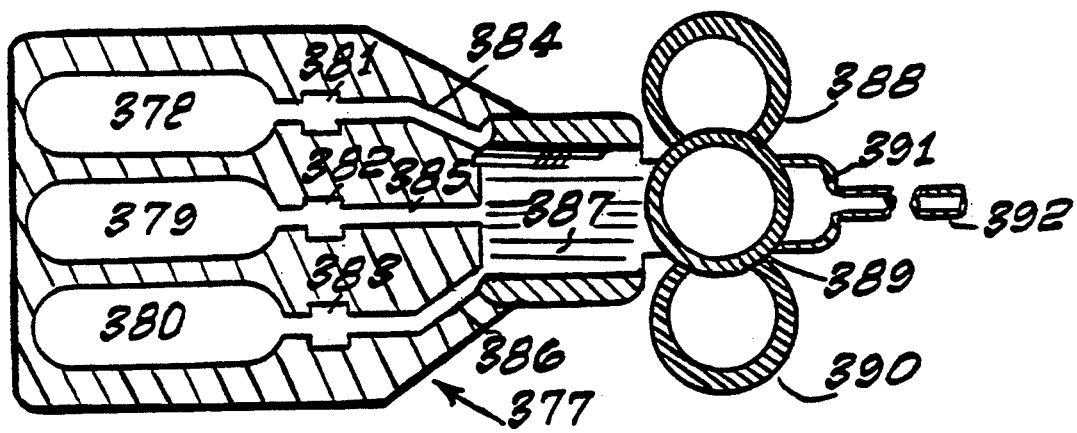
FIGS. 19 through 19b describe perspective sectioned views of the mixing chamber, humidifier and aerosol dispersal means.
Figure 19A:
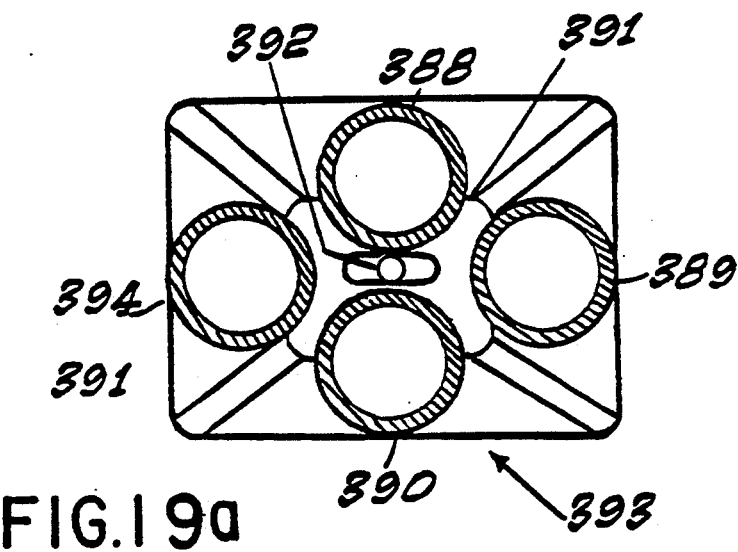
Figure 19B:
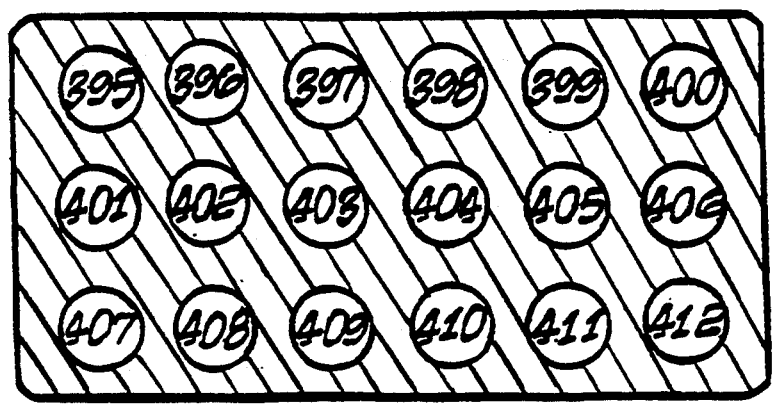
Figure 20D:
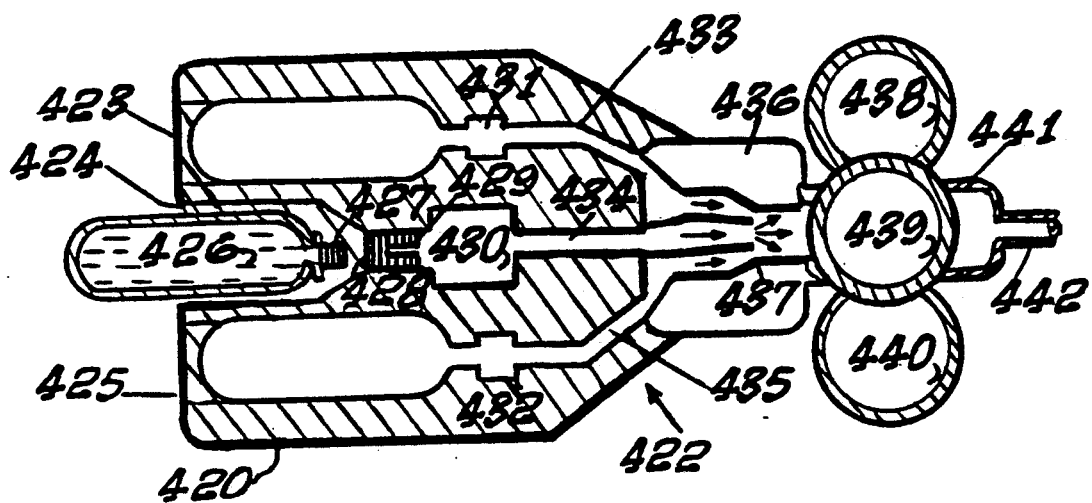
FIGS. 20 through 20e are sectioned views of the magazine, cartridge loading means and a simplified electrical schematic of the solenoid release element.
Figure 20E:
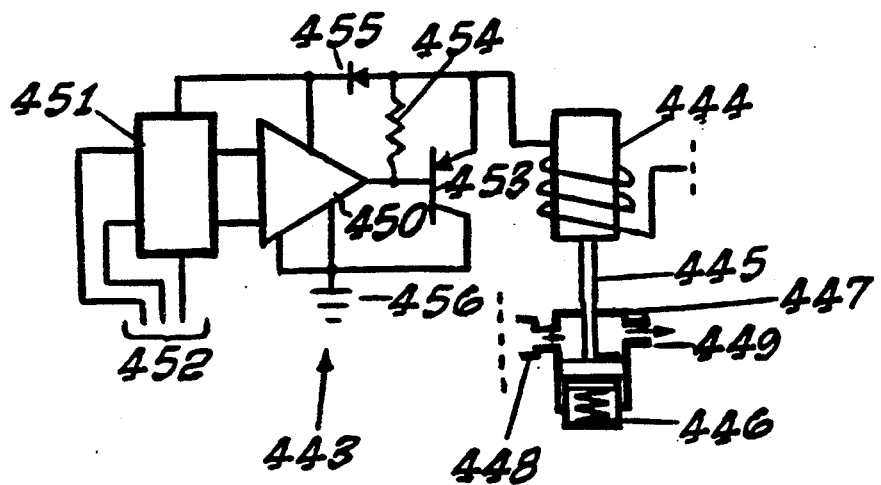
Figure 33:
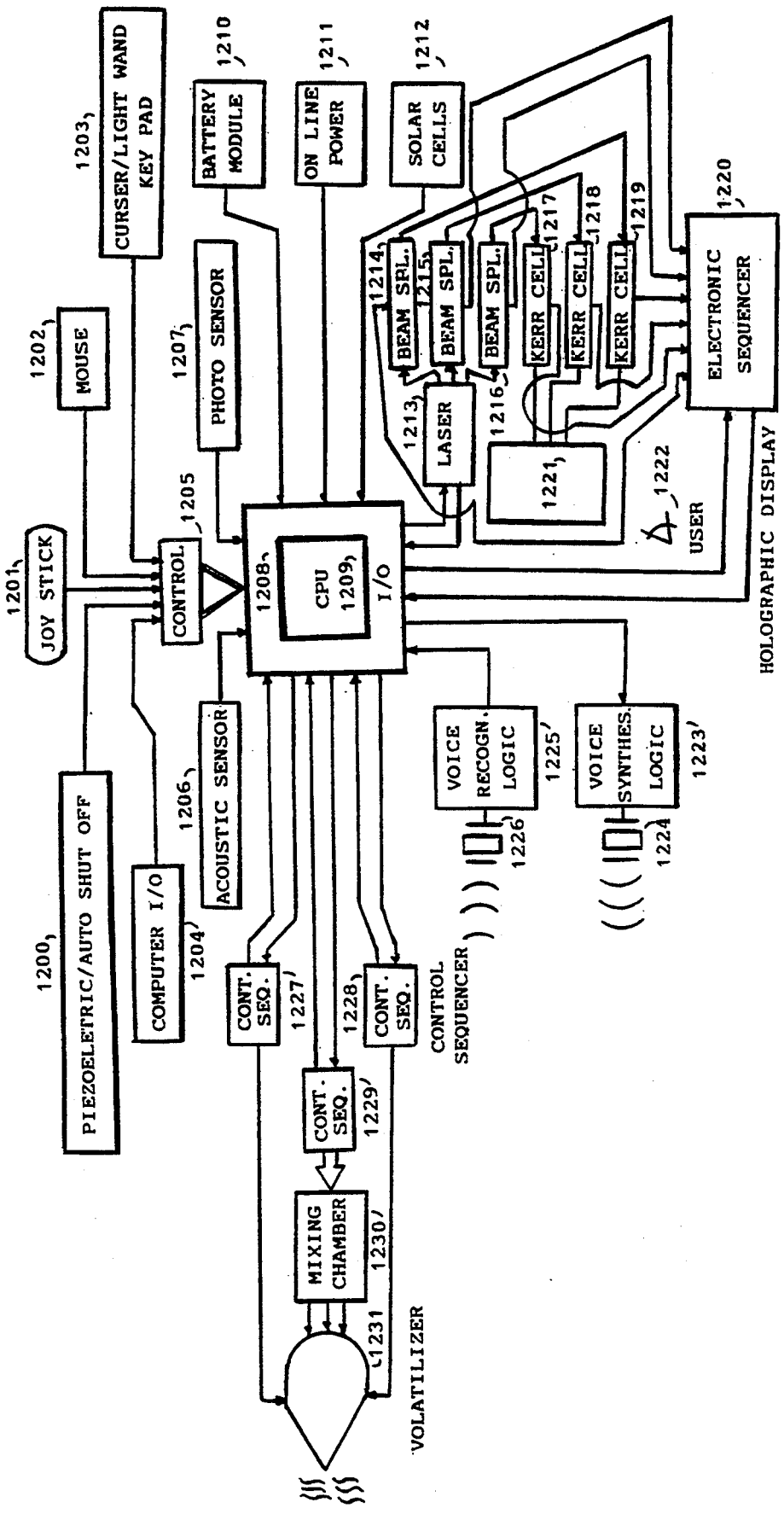
FIG. 33 is a concise block diagram illustrating the operation of the IVS device relative to the internal subsystem embodied within the aforementioned device.

FIG. 33 is a concise block diagram illustrating the operation of the IVS device relative to the internal subsystem embodied within the aforementioned device. User based manual access elements are described by the piezoelectric/auto shut off element, numeral 1200, joy stick element 1201 mouse unit 1202 and by numeral 1203, which collectively entails the curser/light wand and key pad element. The status and presentation of data may be altered, revised or updated by an on line computer, as indicated by element 1204. Elements 1200 through 1204 collectively input into controller element 1205 which conveys data into an electro-optical processing bridge described by number 1208. The aforementioned electro-optical (optical electronic) bridge is bidirectional conveying information to and from the CPU number 1209, of the IVS unit. Additionally, data from acoustical sensors, number 1206, and photoelectric sensors described by numeral 1207 is conveyed through bridge element 1208 to CPU 1209. Power is conveyed to each automated subsystem through said bridge element 1208 as indicated by power sources 1210, 1211 and 1212. The power may be stored within battery elements embodied within battery module element 1210 or obtained from a panal emboding a full complement of solar cells described by numeral 1211 or power may be obtained from an on line power as described by numeral 1212. The power level, frequency, wavelength and other electronic characteristics of laser element 1213 are conveyed by CPU, 1209 through bridge means 1208. The output of laser element 1213 is conveyed to electronic beam splitter elements 1214 through 1216, which modulates said laser emissions and direct said emissions to kerr cell elements 1217, 1218 and 1219. The aforementioned kerr cell elements 1217 through 1219 which interphases with separate and distinct holographic emulsion plates embodied within holographic display means described by means 1221. The outputs-of elements 214 through 1219 are regulated by electronic sequencer element 1220 which receives command signals from CPU 1209 through bridge means 1208. The operational status of elements 1214 through 1219 are monitored through sensor, not shown, and conveyed through electronic sequencer means 1220 which transmits data through the electro-optical bridge element 1208 to CPU 1209, optical data is conveyed from holographic display element 1221 to the user, 1222. Acoustical data is received from the outside world or the user by piezoelectric means 1224. Analog acoustical signals enter piezoelectric means 1226 are then digitized prior to being conveyed to voice recognition logic means previously described in FIGS. 12.31 and is assigned the numeric value 1225. The user device acoustical interface is completed when impulses from CPU 1209, through bridge 1208, which is then acted upon by voice synthesizer logic means 1223 described previously in FIG. 12. Digital acoustic signals are conveyed from element 1223 to piezoelectric elements 1224 wherein said signals are transduced from a digital to analog arm. Various tastes and scents are manufactured within the mixing chamber thermal convection unit wherein wafers undergo volatilization and in ancillary systems as described previously in FIG. 16 and new represented schematically by elements 1227 through 1231. Electronic command signals are conveyed from the CPU, number 1209 through the bridge element, number 1208 to the control sequencers 1227, 1228, and 1229, which communicates the types, chemical composition and volume or amounts of volatiles available from stores embodied within . the IVS device through a network of feedback sensors present but not shown in the block diagram. Control signals or commands from the CPU, number 1209, are relayed through the control sequensors, numbers 1227 through 1230 wherein given specified quantities of volatile substances are released into the mixing chamber and ancillary systems wherein various olfactory scents and gustatory substances are amalgamated or chemically combined prior to being released to volatizer unit 1231. Volatilizer unit 1231 operate to disperse various olfactory and gustatory substance to the user obtained either from the mixing chamber 12-30, and/or ancillary systems or directly from the control sequencer means described by numerals 1227, 1228. The activities or outputs of each subsystems embodied within the unit or coordinated through commands conveyed from the CPU such that the presentation of acoustical output, gustatory olfactory systems are synchronized with the visual holographic presentation of data to the user.

Figure 34:
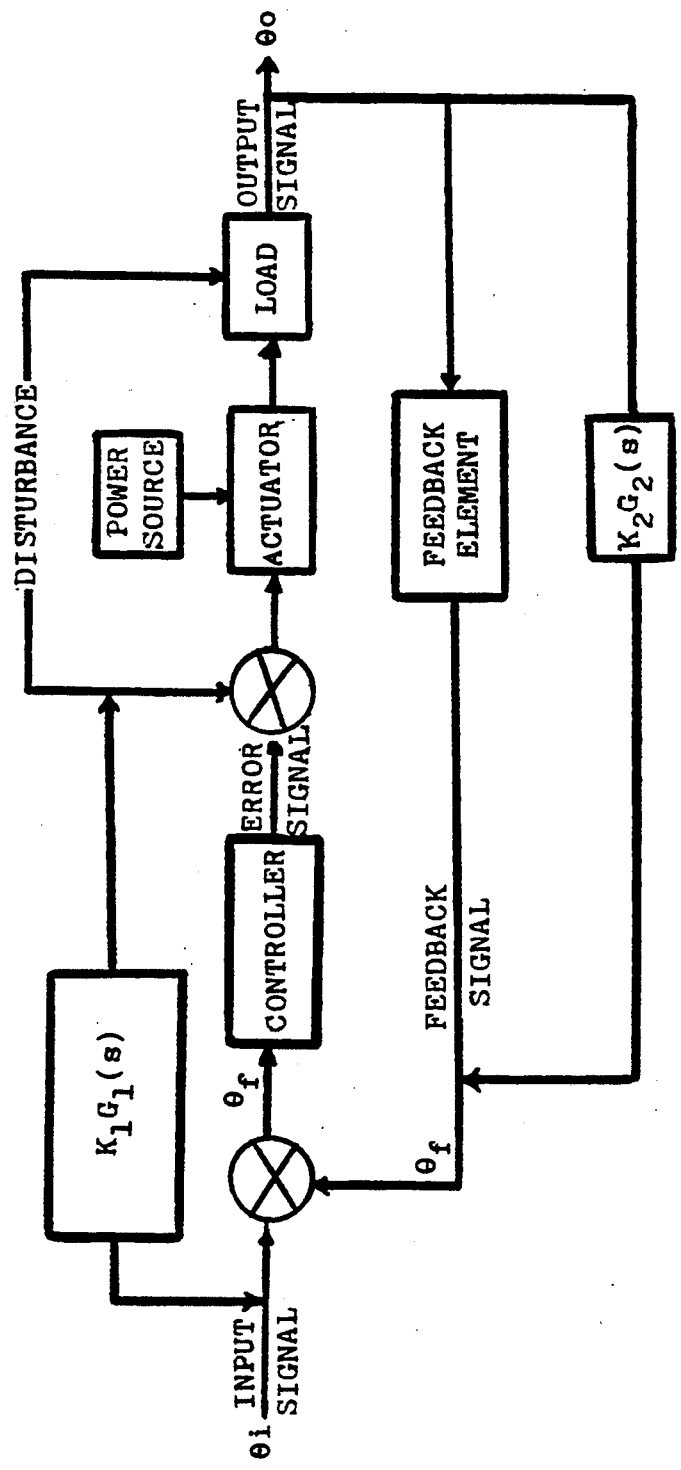

Fibres 34, 35 disclose in brief block diagram fashion the mechanism by which automated systems embodied within the IVS unit perceive deviations or disturbances and the means by which compensatory actions are instituted within the contexts of a sensor based feedback loop. The assemblage of automated systems embodied with the IVS device are necessarily interactive and must act in a compensatory fashion to correct for deviations originating from the user, environmental factors or disturbances generated from internal operation provided within the IVS unit. The typical feedback loop associated with operative systems, subsystems and processes embodied with the invention are clearly illustrated in FIGS. 34, 35, wherein discrepencies or disturbances are detected by sensors, $\theta i$, which sends collectively their digitized signals to comparators, which act as error detectors. Error signals, $\theta E$, are sent to controller means which elicits actuator means; which are additionally provided with power sources that generate loads leading to an output signal, $\theta o$. Error signals are detected as deviations and appropriately compensated for either by increasing the output of one or more systems, or diminishing the said output, or modifying the output in some prescribed fashion. The forward transfer functions are described by $K_1G_1(S)_1$, $K_2G_2(S)$ The feedback signals are defined by element $\theta_f$. From the above illustration one skilled in the art can readily understand and appreciate the operation of mechanisms embodied within the operative framework of feedback loops and variations FIG. 35 clearly discloses block diagrams for the operation of a closed loop servomechanism and a more general closed loop controller means. The type of closed loop system illustrated in FIGS. 34, 35 are equivalent to the type of means embodied within the miniature solenoid arrays and other systems which are embodied within Said IVS unit.

Figure 36:
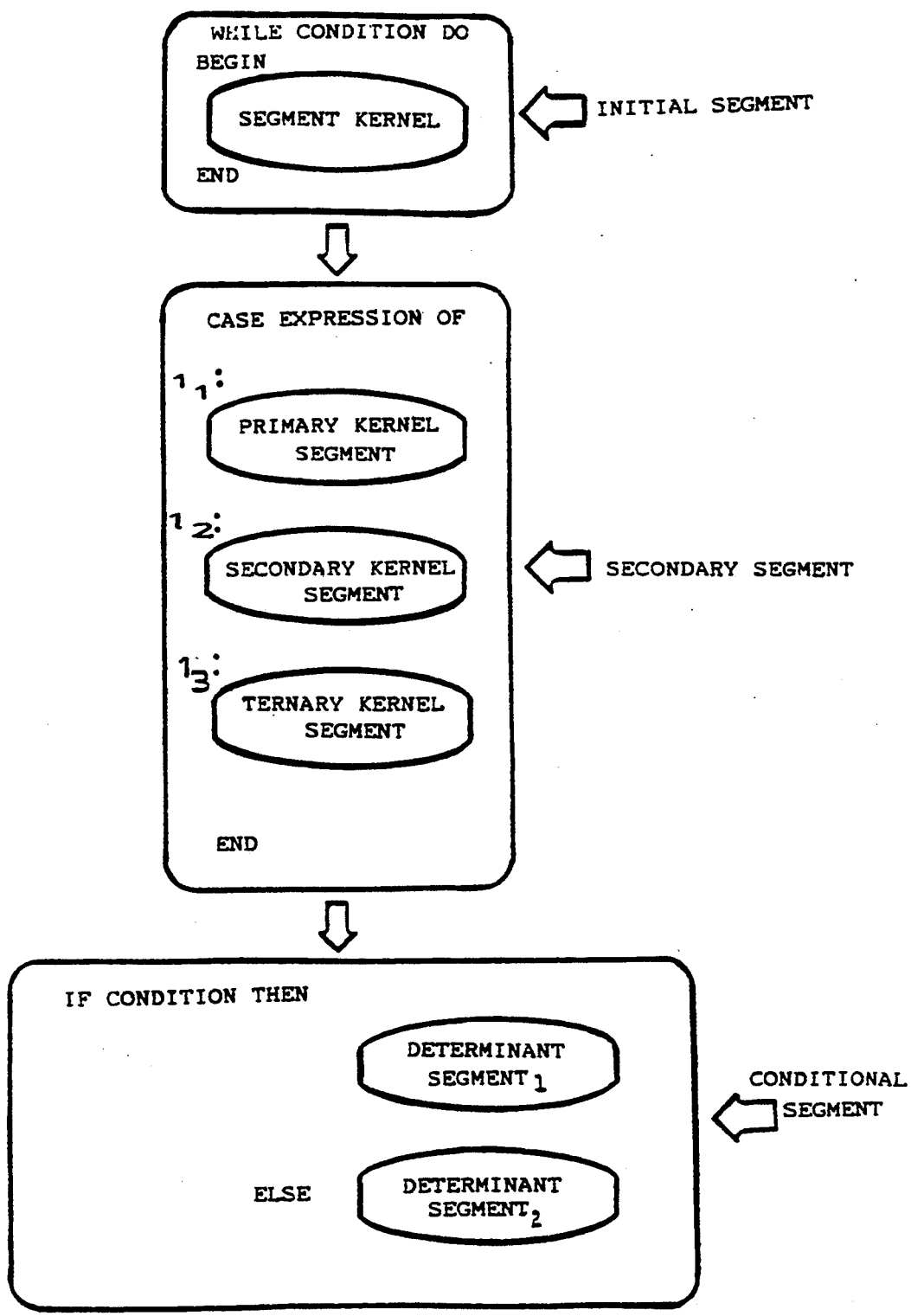
FIGS. 36, 36a, illustrate in a concise schematic manner how data is arranged for processing and presentation.
Figure 36A:
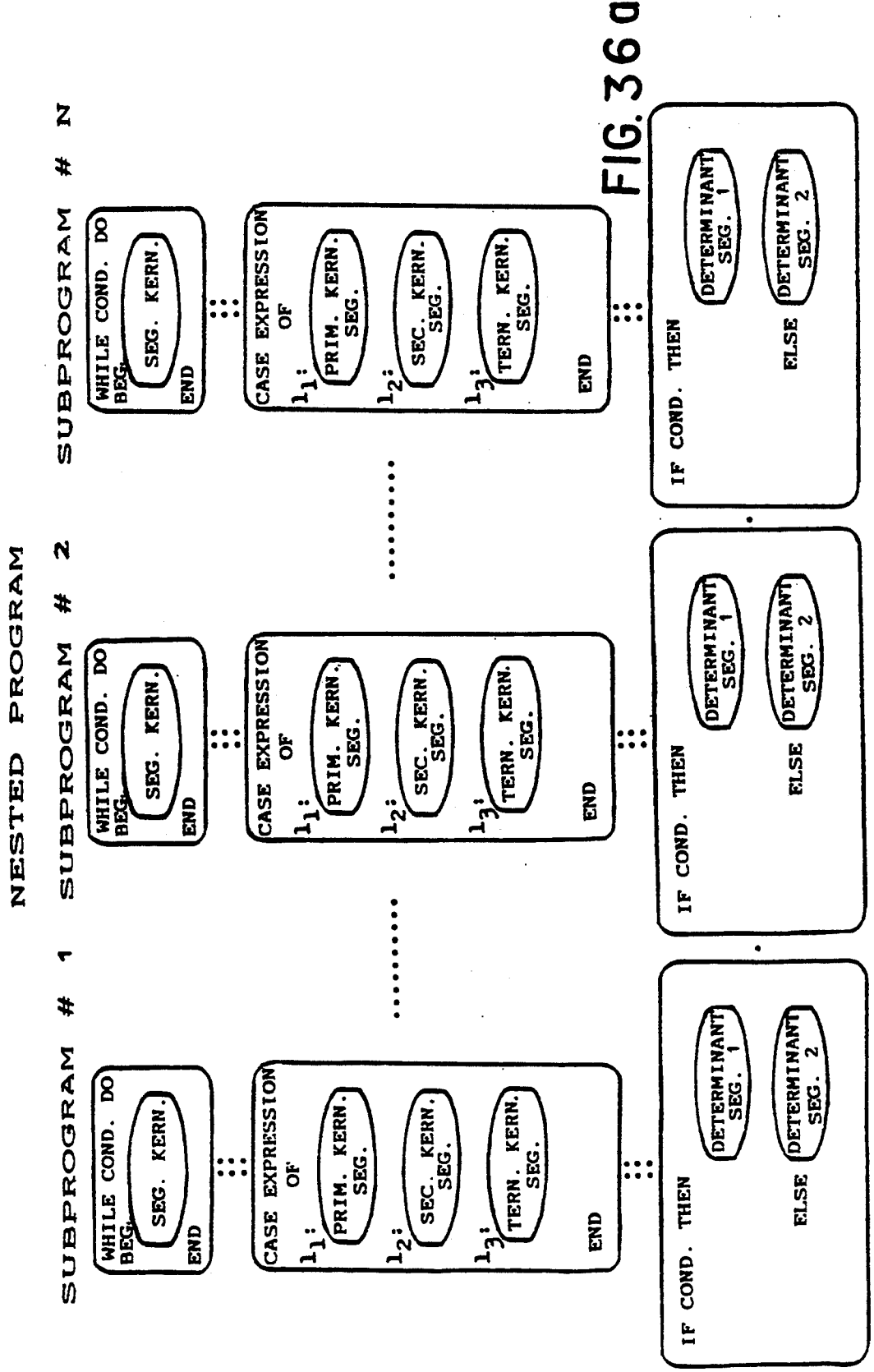

FIGS. 36, 36a illustrate in a concise schematic manner how data is arranged for processing and subsequent presentation. The Kernel for Multi- Tasking Operations alluded to in FIG. 29 consists of smaller segment Kernels which more readily lend themselves to processing and subsequent analysis. Subprograms are arranged into initial segments, secondary segments and conditional segments, as indicated in FIG. 36. Additionally, subprograms are compilled and linked together to form Nested Programs.

Figure 37:
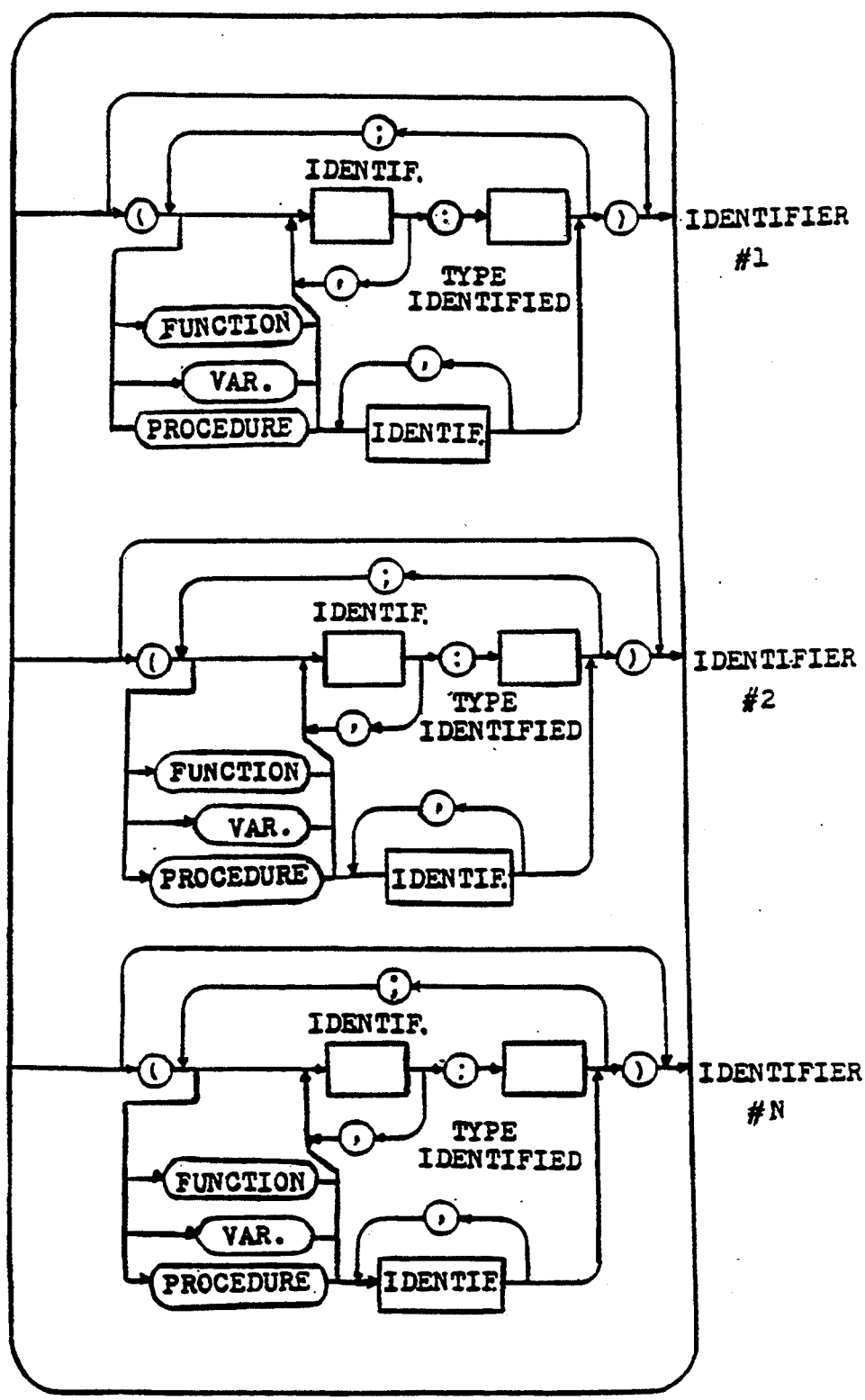
FIG. 37 illustrates schmatically the way in which data retieved from sensors is initially identified.

Information embodied within each said Kernel segment consists of data continuously retrieved and entered from an array of different sensory elements and ancillary systems. The data entering from different sensory elememts is first identified, classified based on type of function, variations are analyzed and the procedure taken within a given program is determined. Each segment of data entering from a given type of sensor are arranged in the form of identifiers starting from identifier #1 and terminating in identifier #N. Acoustical data, electrical data from electrodes, or electro-optical data entering from laser spectroscopy and microelectrophoresis are arranged in the form of identifiers #1 through #N and displayed to the user in the same fashion as schematically illustrated in FIG. 37

Data is continuously entered and retrieved to be displayed to the user. Inorder not to overload the data processing capacity of the CPU programs incorporating data reduction techniques are encoded ans subsequently incorporated into the program formats embodied within said CPU. Said data reduction techniques involve filtering first order linear approximations Best fit, clustering, prunning, second order curve fit and the maximum likelihood techniques all well known by those skilled in the art. FIG. 38 exemplifies the second order curve fit means of data reduction. Data retrieved continuously is arranged in the form of polynomials and data is matched based on a simple x,y relationship as indicated in FIG. 17. A simple match of data with digitized values of data encoded in the memory of CPU is sufficient to identify analog signals retrieved from acoustical generating sources (such as asculation, simple verbal commands and systolic/diastolic beats) and/or optical source emitter.

FIG. 39 is a concise block diagram illustrating a combination of clustering and prunning techniques utilized for the specific purpose of reducing the large volume of data accumulated by sensors embodied within the aforesaid IVS device. Data enters as separate and distinct observations. Said observations are processes with existing observations which preceded said incoming observations. All like observations arriving from equivalent sensors are compiled or arranged in clusters, such that, for every given catagory there exists a given cluster. The number of clusters are reduced by merging, filtering, redundancy elimination, prunning techniques and deletion. The branching of data differs statistically from clustering of data; however the results are equivalent. The number of said branches derived from observations are redunced by prunning techniques. Branches of redundant and/or non-sequitur observations are eliminated.

Although various alterations or modifications may be suggested by those skilled in the art, it is the intention of the inventors to embody within the patent warranted hereon all changes and modifications as reasonably and properly come within the scope of contributions to the art, without departing from the spirt of the invention.

What is claimed is:

1. A holographic display system comprising:

a plurality of laser light sources, wherein each of said laser light sources produces a laser light beam, a plurality of Kerr units, wherein each of said Kerr units comprises input ports and output ports, means for directing said laser light beams from said laser light sources to said input ports of said Kerr units, wherein each of said Kerr units further comprises multiple light channel means which connect said input ports to said output ports and wherein said laser light beams are directed from said input ports to said output ports of each of said Kerr units through said multiple light channel means, inside of which the wavelength of said laser light beams is selectively shifted, wherein said input ports and output ports of said Kerr units each comprise at least one hollow cell which comprises an entrance and exit surface, wherein each of said hollow cells is filled with an optically active medium which exhibits the Kerr effect when a voltage is applied thereacross, and wherein each of said cells comprises polarizers on said entrance and exit surfaces, a holographic plate upon which is disposed a plurality of thin film holographic emulsions, a plurality of fiber optic connecting means which connect said output ports of said Kerr unit to said holographic plate for directing said laser light beams from said Kerr unit to said holographic plate, a diffusing means, disposed adjacent said plurality of thin film holographic emulsions for directing said laser light beams from said fiber optic connecting means to the edges of said thin film holographic emulsions, central control means coupled to said plurality of laser light sources and said Kerr units for selectively controlling said laser light sources and said lens elements of the input ports and output ports of said Kerr unit, a source of electrical power which is coupled to each of said plurality of laser light sources and to said central control means.

2. The holographic display of claim 1, wherein said means for directing laser light beams further comprises light modulating means.

3. The holographic display of claim 1, wherein said multiple light channel means are filled with organic dyes.

4. The holographic display of claim 1, wherein said multiple light channel means comprise doped optical fibers.

5. The holographic display of claim 1, wherein at least six thin film emulsions are disposed upon said holographic plate.

6. The holographic display of claim 1, wherein said thin film holographic emulsions and said holographic plate are attached to each other by an adhesive.

7. The holographic display of claim 1, wherein said optically active medium is nitrobenzene.

8. The holographic display of claim 1, wherein said diffusing means is polyacrylic silicate.

* * * * *